(12) United States Patent  
Umebayashi

(10) Patent No.: US 8,366,818 B2  
(45) Date of Patent: Feb. 5, 2013

(54) PHOTOCURABLE COMPOSITION

(75) Inventor: Tsutomu Umebayashi, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 211 days.

(21) Appl. No.: 12/748,349

(22) Filed: Mar. 26, 2010

(65) Prior Publication Data  
US 2010/0247797 A1   Sep. 30, 2010

(30) Foreign Application Priority Data  
Mar. 27, 2009   (JP) .................. 2009-078189

(51) Int. Cl.  
*C09D 11/00* (2006.01)
(52) U.S. Cl. ............ 106/31.13; 427/457; 427/496; 427/508; 427/511; 427/384; 427/514
(58) Field of Classification Search .......... 427/457, 427/496, 511, 508, 514, 384; 106/31.13  
See application file for complete search history.

(56) References Cited

U.S. PATENT DOCUMENTS

2006/0152143 A1*   7/2006   Nakaya et al. ............ 313/504  
2008/0239045 A1*   10/2008   Umebayashi et al. ...... 347/102

FOREIGN PATENT DOCUMENTS

| EP | 1 650 208 A1 | 4/2006 |
| EP | 1 914 279 A2 | 4/2008 |
| EP | 1 944 173 A1 | 7/2008 |
| JP | 05-100423 A | 4/1993 |
| JP | 06-322012 A | 11/1994 |
| JP | 11-071364 A | 3/1999 |
| JP | 11-256085 A | 9/1999 |
| JP | 2004-043634 A | 2/2004 |

OTHER PUBLICATIONS

Demet Karaca Balta, et al., "Thioxanthone-Anthracene: A New Photoinitiator for Free Radical Polymerization in the Presence of Oxygen", Macromolecules, 2007, pp. 4138-4141, vol. 40.  
Demet Karaca Balta et al., "Host/guest complex of B-cyclodextrin/-thia pentacene-14-one for photoinitiated polymerization of acrylamide in water" , Journal of Photochemistry and Photobiology (2008) vol. 200 No. 2-3, pp. 377-380.  
European Search Report dated Jun. 25, 2010.

* cited by examiner

*Primary Examiner* — Robert S Walters, Jr.  
(74) *Attorney, Agent, or Firm* — Sughrue Mion, PLLC

(57) ABSTRACT

A photocurable composition is provided that includes a compound represented by Formula (I) below,

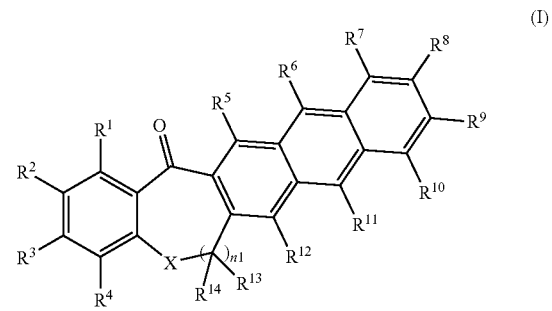

in Formula (I), X denotes O, S, or $NR^a$, n1 denotes 0 or 1, and $R^1$ to $R^{14}$ and $R^a$ independently denote a hydrogen atom, a halogen atom, or a monovalent substituent, at least one of $R^1$ to $R^{14}$ and $R^a$ not being a hydrogen atom). There is also provided an inkjet recording method that includes ($a^1$) a step of discharging the photocurable composition onto a recording medium and ($b^1$) a step of curing the photocurable composition by irradiating the discharged photocurable composition with light.

15 Claims, 2 Drawing Sheets

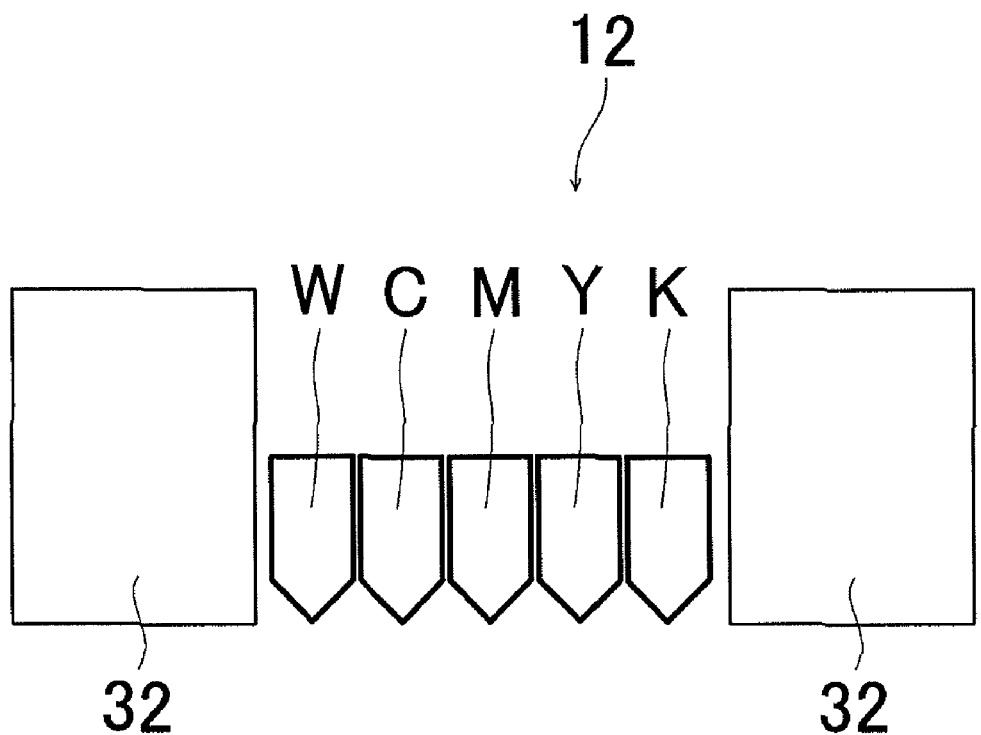

PHOTOCURABLE COMPOSITION

BACKGROUND OF THE INVENTION

1. Field of the Invention

The present invention relates to a photocurable composition.

2. Description of the Related Art

Photopolymerization techniques are useful techniques that are used in various applications. As compositions that are used in photopolymerization techniques, those below can be cited.

Specific examples thereof include colored or non-colored paints, varnishes, powder coatings, printing inks, inkjet recording inks, UV inks, printing plates, adhesives, dental compositions, gel coats, electronic photoresists (e.g. electroplating resists, etching resists), both liquid and dry films, compositions for producing soldering resists, compositions for producing color filters for use in various types of display devices, compositions for forming structures in processes for producing plasma display panels, electroluminescent display devices, and LCDs, composite compositions, resists such as photoresists, color filter materials, black matrixes, compositions for sealing electric and electronic components, magnetic recording materials, micromechanical components, waveguides, optical switches, plating masks, etching masks, color test systems, glass fiber cable coatings, compositions for producing screen printing stencils, compositions for producing three-dimensional materials by stereolithography, image recording materials, in particular image recording materials for holographic recording, microelectronic circuits, compositions as decolorant materials for image recording materials employing microcapsules, and compositions for forming a dielectric layer in sequential lamination of printed circuit boards.

JP-A-5-100423 and JP-A-6-322012 discloses a UV curing composition comprising a thioxanthone. Furthermore, JP-A-11-256085 discloses an inkjet recording ink composition comprising a thioxanthone.

On the other hand, JP-A-11-71364 discloses a photocuring composition comprising an anthracene compound, and JP-A-2004-43634 discloses an ink jet recording ink composition comprising an anthracene.

Non-patent document: Balta, D. K.; Arsu, N.; Yagci, Y.; Jockusch, S.; Turro, N. J., Macromolecules, 2007, 40 (12), pp. 4138-4141, discloses 5-thia-pentacene-14-one as an initiator which generates an active radical in the presence of oxygen.

BRIEF SUMMARY OF THE INVENTION

However, the conventional methods do not always have high photosensitivity and, in particular, sensitivity to UV light (250 nm to 400 nm), which is abundant in generally used exposure light sources, is not sufficient. Degradation of sensitivity due to environmental effects, such as a curing reaction being terminated as a result of deactivation of active species caused by oxygen molecules or water molecules, can be cited as a particularly serious problem. In particular, in an ink composition for inkjet recording, since most of the ink composition is formed from a polymerizable compound monomer (monomer) for reasons of discharge stability, incomplete curing becomes marked as a result of degradation of sensitivity due to environmental effects.

5-Thiapentacen-14-one, which is described in Non-Patent Document: Balta, D. K.; Arsu, N.; Yagci, Y.; Jockusch, S.; Turro, N. J., Macromolecules, 2007, 40 (12), pp. 4138-4141, is promising as a compound that suppresses polymerization inhibition due to oxygen molecules, but because of low solubility in a polymerizable compound, etc. it is not sufficient for preventing degradation of sensitivity due to environmental effects. In particular, when application to an ink for inkjet recording is considered, 5-thiapentacen-14-one, which is an insoluble component, seriously affects discharge stability.

The present invention has been accomplished in light of the above-mentioned circumstances, and it is an object thereof to provide a photocurable composition that has excellent storage stability under a high temperature environment and under a low temperature environment.

Furthermore, it is another object of the present invention to provide a photocurable composition that achieves a balance between high curing sensitivity and stable discharge properties and that is particularly suitable as an ink composition for inkjet recording.

The above-mentioned objects have been accomplished by means described in (1) or (13). (2) to (12), which are preferred embodiments, are also shown below.

(1) A photocurable composition comprising a compound represented by Formula (I) below,

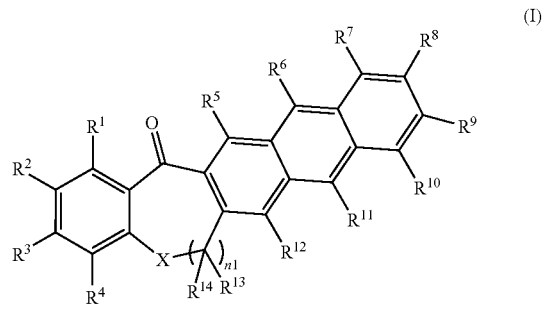

in Formula (I), X denotes O, S, or $NR^a$, n1 denotes 0 or 1, and $R^1$ to $R^{14}$ and $R^a$ independently denote a hydrogen atom, a halogen atom, or a monovalent substituent, at least one of $R^1$ to $R^{14}$ and $R^a$ not being a hydrogen atom, (2) the photocurable composition according to (1), wherein the compound represented by Formula (I) above is a compound represented by Formula (II) below,

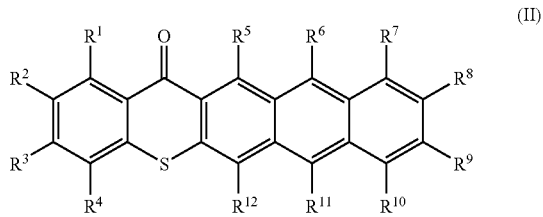

in Formula (II), $R^1$ to $R^{12}$ independently denote a hydrogen atom, a halogen atom, or a monovalent substituent, at least one of $R^1$ to $R^{12}$ not being a hydrogen atom, (3) the photocurable composition according to (1), wherein it comprises two or more types of compounds represented by Formula (I) above, (4) the photocurable composition according to (1), wherein the compound represented by Formula (I) above has a content of 0.1 to 15.0 wt %, (5) the photocurable composition according to (1), wherein it comprises as a photopolymerization initiator at least an acylphosphine oxide compound or an α-aminoacetophenone compound, (6) the photocurable composition according to (1), wherein it comprises as a photopolymerization initiator at least one type of acylphosphine oxide compound and at least one type of α-aminoacetophenone compound,
(7) the photocurable composition according to (1), wherein it comprises a colorant,
(8) the photocurable composition according to (1), wherein it comprises a dispersion of an organic pigment and a polymeric dispersant,
(9) the photocurable composition according to (1), wherein it comprises a (meth)acrylate compound as a polymerizable compound,
(10) the photocurable composition according to (1), wherein it comprises as a polymerizable compound a monofunctional radically polymerizable monomer having an alicyclic structure and/or an aromatic monofunctional radically polymerizable monomer,
(11) the photocurable composition according to (10), wherein the monofunctional radically polymerizable monomer having an alicyclic structure is a compound represented by Formula (A2),

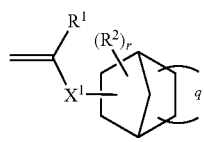

(A2)

in Formula (A2), $R^1$ denotes a hydrogen atom, a halogen atom, or an alkyl group having 1 to 4 carbon atoms, $X^1$ denotes a divalent linking group, $R^2$ denotes a substituent, r denotes an integer of 0 to 5, and q denotes a cyclic hydrocarbon structure,
(12) the photocurable composition according to (10), wherein the aromatic monofunctional radically polymerizable monomer is a compound represented by Formula (A5),

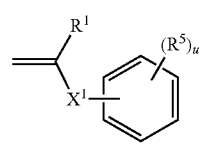

(A5)

in Formula (A5), $R^1$ denotes a hydrogen atom, a halogen atom, or an alkyl group having 1 to 4 carbon atoms, $X^1$ denotes a divalent linking group, $R^5$ denotes a substituent, u denotes an integer of 0 to 5, the u $R^5$s may be identical to or different from each other, the plurality of $R^5$s may be bonded to each other to form a ring, and the ring may be an aromatic ring,
(13) an inkjet recording method comprising, ($a^1$) a step of discharging the photocurable composition according to (1) onto a recording medium, and ($b^1$) a step of curing the photocurable composition by irradiating the discharged photocurable composition with light.

BRIEF DESCRIPTION OF DRAWINGS

FIG. 2 An enlarged schematic diagram of an inkjet recording head unit part 12 of the inkjet recording system 10 shown in FIG. 1.

EXPLANATION OF REFERENCE NUMERALS AND SYMBOLS

Figure 1:
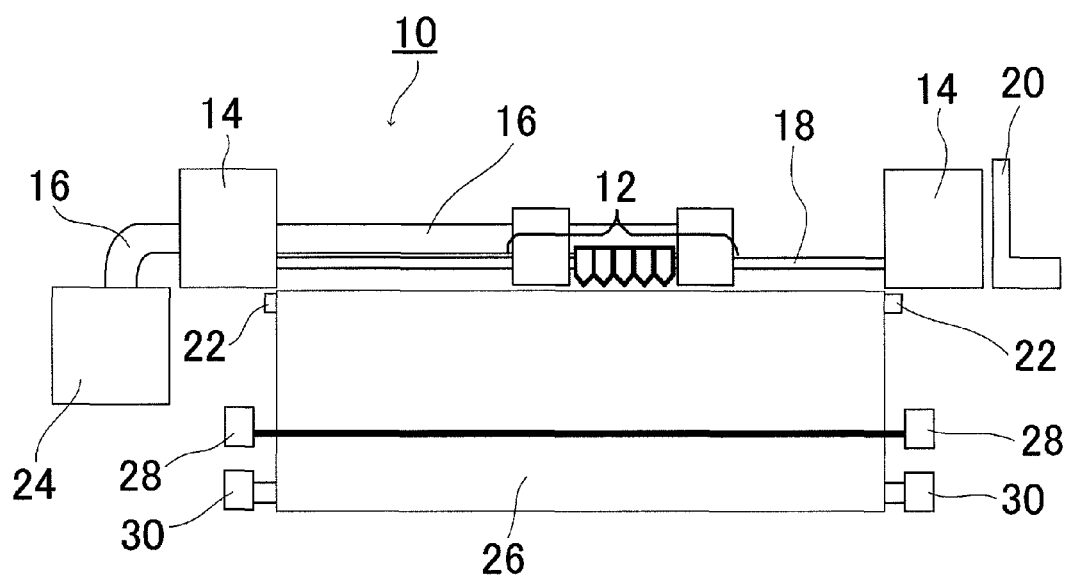
FIG. 1 A schematic diagram illustrating one example of an inkjet recording system that can be used in the present invention.

10: inkjet recording system
12: ink jet recording head unit part
14: head maintenance/cleaning box
16: head reciprocation power part
18: head fixing shaft
20: controlling personal computer
22: recording medium suction stage
24: ink tank
26: recording medium
28: recording medium transport roller
30: recording medium wind-up roller
32: UV irradiation metal halide lamp
W: ink jet head for white ink composition
C: ink jet head for cyan ink composition
M: ink jet head for magenta ink composition
Y: ink jet head for ink composition of the present invention
K: ink jet head for black ink composition

DETAILED DESCRIPTION OF THE INVENTION

The present invention is described in detail below. In the present invention, unless otherwise specified, the description 'A to B', which indicates a range of values, means 'not less than A, not more B', that is, the range includes both limit values: A and B.
(1) Photocurable Composition
The photocurable composition of the present invention comprises a compound represented by Formula (I) below,

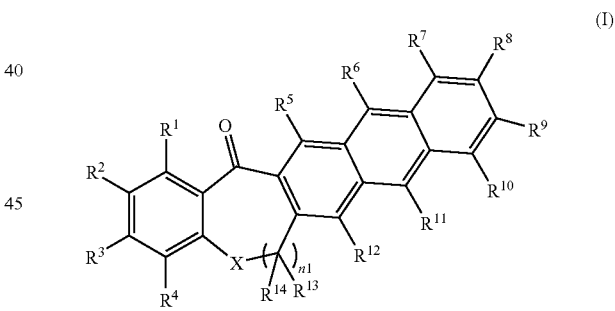

(I)

in Formula (I), X denotes O, S, or $NR^a$, n1 denotes 0 or 1, and $R^1$ to $R^{14}$ and $R^a$ independently denote a hydrogen atom, a halogen atom, or a monovalent substituent, at least one of $R^1$ to $R^{14}$ and $R^a$ not being a hydrogen atom.

The photocurable compound of the present invention may be used for various applications as described above, may suitably be used as an ink composition, and may particularly suitably be used as an ink composition for inkjet recording.

The photocurable composition of the present invention is a photocurable composition that is curable by light.

The 'light' referred to in the present invention is not particularly limited as long as it is light (also called 'actinic radiation') that can provide energy allowing an initiator species to be generated in an photocurable composition by the irradiation, and broadly includes α rays, γ rays, X rays, ultraviolet rays (UV rays), visible rays, and electron beams and, among these, ultraviolet rays and electron beams are preferable from the viewpoint of curing sensitivity and the availability of equipment, and ultraviolet rays are particularly preferable. The photocurable composition of the present invention is therefore preferably a photocurable composition that is curable upon exposure to ultraviolet rays.

The photocurable composition of the present invention comprises a compound represented by Formula (I) above (hereinafter, also called 'compound (I)').

In the photocurable composition of the present invention, with regard to the compound (I), one type may be used on its own or two or more types may be used in combination. Among them, from the viewpoint of preventing precipitation at low temperature it is preferable to use two or more types of compound (I) in combination.

The concentration of compound (I) above contained in the photocurable composition, relative to the total weight of the photocurable composition, is preferably 0.1 to 15.0 wt %, more preferably 0.2 to 12.0 wt %, and yet more preferably 0.5 to 10.0 wt %. When the amount added is in the above-mentioned range, good curability can be obtained.

The photocurable composition of the present invention preferably comprises a photopolymerization initiator.

The concentration of the photopolymerization initiator added is, relative to the total weight of the photocurable composition, preferably 0.1 to 20.0 wt %, more preferably 0.5 to 18.0 wt %, and yet more preferably 1.0 to 15.0 wt %. It is appropriate that the amount of the photopolymerization initiator added is in the above-mentioned range since the curability is excellent and the surface tackiness is suppressed.

The photocurable composition of the present invention preferably comprises as the photopolymerization initiator at least one type of compound selected from the group consisting of an acylphosphine oxide compound and an α-aminoacetophenone compound. The photocurable composition may comprise one of the acylphosphine oxide compound and the α-aminoacetophenone compound, or may comprise both in combination. From the viewpoint of the curing sensitivity being synergistically enhanced, the combination of these photocurable initiators and the compound (I) is preferable, and the combination of the acylphosphine oxide compound, the α-aminoacetophenone compound and the compound (I) is more preferable.

The concentration of the at least one type of compound selected from the group consisting of an acylphosphine oxide compound and an α-aminoacetophenone compound contained in the photocurable composition is, relative to the total weight of the photocurable compound, preferably 0.1 to 20.0 wt %, more preferably 0.5 to 18.0 wt %, and yet more preferably 1.0 to 15.0 wt %. When the amount added is in the above-mentioned range, good curability can be obtained.

The photocurable composition of the present invention preferably comprises at least a polymerizable compound. From the viewpoint of image fixation when the photocurable composition is used as an ink composition, the concentration of the polymerizable compound added to the photocurable composition, relative to the total weight of the photocurable composition, is preferably at least 40 wt % but no greater than 98 wt %, more preferably at least 50 wt % but no greater than 95 wt %, and particularly preferably at least 60 wt % but no greater than 90 wt %. It is preferable for the amount of polymerizable compound added to be in the above-mentioned range since the curability is excellent and the viscosity is appropriate.

As a polymerizable compound contained in the photocurable composition, a (meth)acrylate compound is suitably used.

(A) Compound (I)

The photocurable composition of the present invention comprises a compound (compound (I)) represented by Formula (I) below,

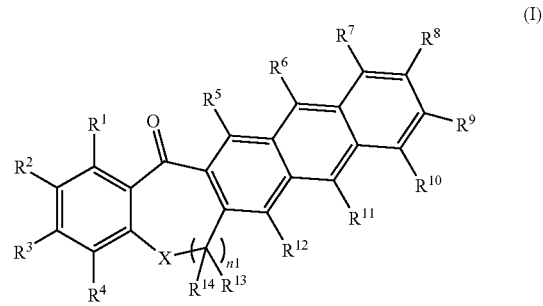

in Formula (I), X denotes O, S, or NR$^a$, n1 denotes 0 or 1, and R$^1$ to R$^{14}$ and R$^a$ independently denote a hydrogen atom, a halogen atom, or a monovalent substituent, at least one of R$^1$ to R$^{14}$ and R$^a$ not being a hydrogen atom.

X in Formula (I) is preferably O or S, and more preferably S.

In Formula (I), n1 is preferably 0.

Furthermore, at least two of R$^1$ to R$^{14}$ and R$^a$ are not a hydrogen atom.

Examples of the monovalent substituent denoted by R$^1$ to R$^{14}$ and R$^a$ in Formula (I) include an aliphatic group (e.g. an acyclic or cyclic hydrocarbon group such as an alkyl group, an alkenyl group, an alkynyl group, a cycloalkyl group, or a cycloalkenyl group), an aromatic group, a heterocyclic group, a cyano group, a hydroxy group, a nitro group, an amino group, an alkylamino group, a dialkylamino group, an alkoxy group, an aryloxy group, an amide group, an arylamino group, an ureido group, a sulfamoylamino group, an alkylthio group, an arylthio group, an alkoxycarbonylamino group, a sulfonamide group, a carbamoyl group, a sulfamoyl group, a sulfonyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a sulfinyl group, a phosphonyl group, an acyl group, a carboxyl group, and a sulfo group. In the present invention, an alkoxy group, an alkyl group, and a halogen atom are preferable, and an alkyl group and a halogen atom are more preferable.

These monovalent substituents may be further substituted with the above-mentioned substituent or halogen atom. For example, an alkyl group may be substituted with a halogen atom to form a haloalkyl group or may be substituted with a carboxy group to form a carboxyalkyl group.

Preferred examples of the alkyl group in the monovalent substituents include an alkyl group (a lower alkyl group) having 1 to 4 carbons such as a methyl group, an ethyl group, a propyl group, an n-butyl group, a sec-butyl group, and a t-butyl group.

Similarly, preferred examples of the alkoxy group in the monovalent substituents include an alkoxy group (a lower alkoxy group) having 1 to 4 carbons such as a methoxy group, an ethoxy group, a hydroxyethoxy group, a propoxy group, an n-butoxy group, an isobutoxy group, a sec-butoxy group, and a t-butoxy group.

Examples of the halogen atom include a fluorine atom, a chlorine atom, a bromine atom, and an iodine atom, preferably a fluorine atom, a chlorine atom, and a bromine atom, more preferably a fluorine atom, and a chlorine atom.

Among $R^1$ to $R^{14}$ and $R^a$, the number of groups that are not hydrogen atoms is preferably 1 to 10, more preferably 1 to 4, yet more preferably 1 to 3, and particularly preferably 2 or 3.

Furthermore, among $R^1$ to $R^{14}$ and $R^a$, the position of a group that is not a hydrogen atom is not particularly limited, but it is preferably one or more positions selected from the group consisting of $R^1$ to $R^5$, $R^7$ to $R^{10}$, $R^{12}$ to $R^{14}$, and $R^a$, more preferably one or more positions selected from the group consisting of $R^1$ to $R^4$, $R^7$ to $R^{10}$, $R^{13}$, $R^{14}$, and $R^a$, yet more preferably one or more positions selected from the group consisting of $R^1$ to $R^4$ and $R^7$ to $R^{10}$, and particularly preferably one or more positions selected from the group consisting of $R^2$, $R^3$, $R^8$, and $R^9$.

A compound represented by Formula (I) above is preferably a compound represented by Formula (II) below,

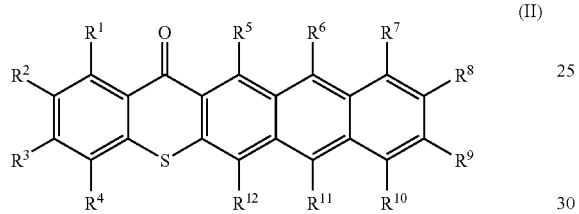

(II)

in Formula (II), $R^1$ to $R^{12}$ independently denote a hydrogen atom, a halogen atom, or a monovalent substituent, at least one of $R^1$ to $R^{12}$ not being a hydrogen atom.

$R^1$ to $R^{12}$ in Formula (II) have the same meanings as those of $R^1$ to $R^{12}$ in Formula (I) above, and preferred ranges are also the same.

At least two of $R^1$ to $R^{12}$ in Formula (II) are preferably not hydrogen atoms.

Furthermore, among $R^1$ to $R^{12}$ in Formula (II), the number of groups that are not hydrogen atoms is preferably 1 to 10, more preferably 1 to 4, yet more preferably 1 to 3, and particularly preferably 2 or 3.

Moreover, among $R^1$ to $R^{12}$ in Formula (II), the position of a group that is not a hydrogen atom is not particularly limited, but it is preferably one or more positions selected from the group consisting of $R^1$ to $R^5$, $R^7$ to $R^{10}$, and $R^{12}$, more preferably one or more positions selected from the group consisting of $R^1$ to $R^4$ and $R^7$ to $R^{10}$, and particularly preferably one or more positions selected from the group consisting of $R^2$, $R^3$, $R^8$, and $R^9$.

That is, a compound having the halogen atom or the lower alkyl group at one or more positions selected from the group consisting of $R^2$, $R^3$, $R^8$ and $R^9$ is particularly preferable.

Preferred specific examples of the compound represented Formula (I) which are suitably used in the present invention are shown below, but the present invention should not be construed by being limited thereto. In some of the structural formulae in the present invention, a hydrocarbon chain is represented by a simplified structural formula in which symbols for carbon (C) and hydrogen (H) are omitted. And Me, Bu$^t$, and Pr$^i$ mean a methyl group, a tert-Buthyl group and an iso-propyl group, respectively.

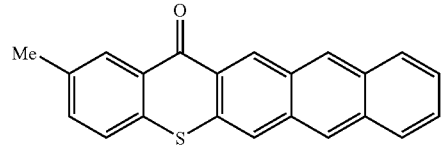
(I-1)

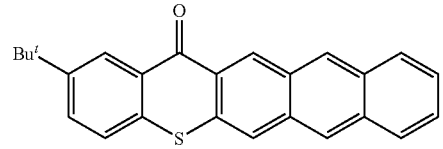
(I-2)

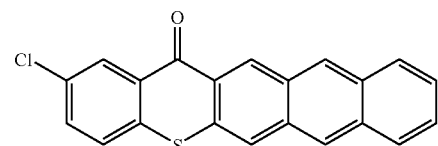
(I-3)

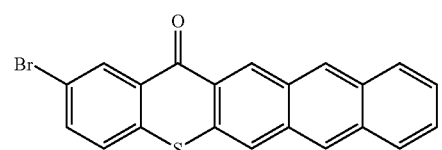
(I-4)

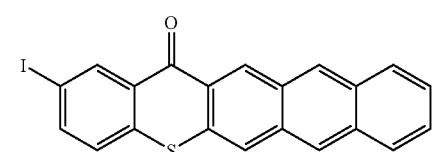
(I-5)

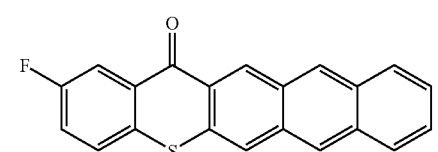
(I-6)

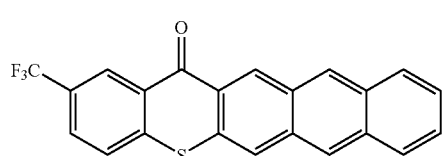
(I-7)

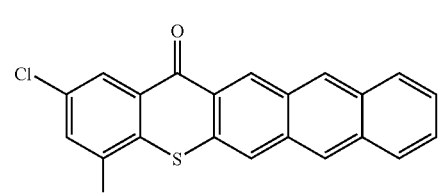
(I-8)

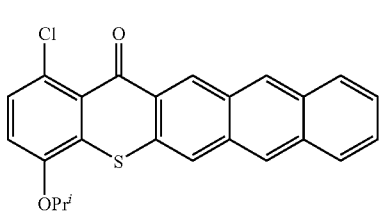
(I-9)

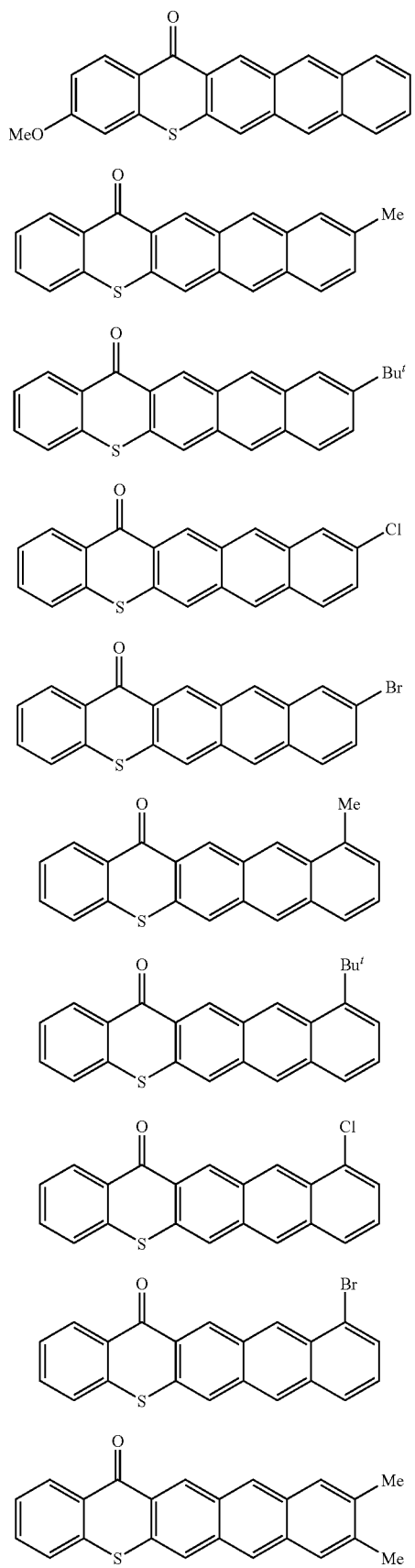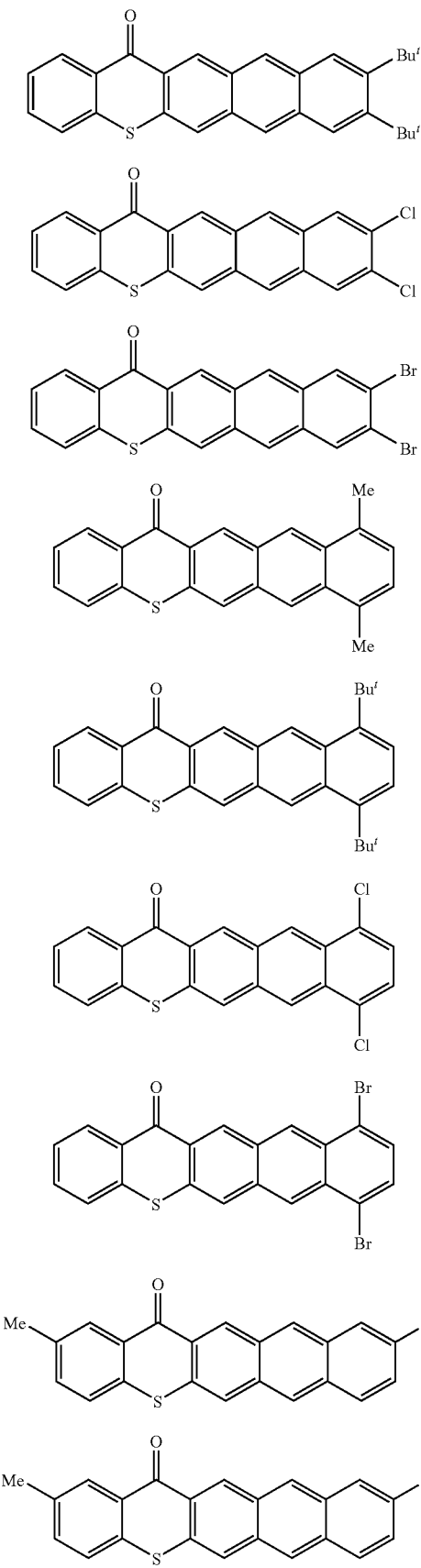

(I-29)
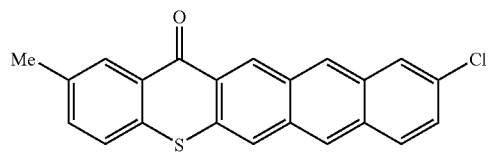
(I-30)
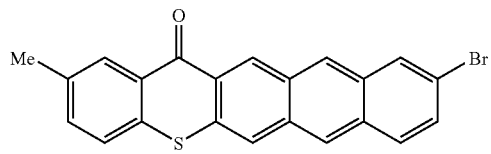
(I-31)
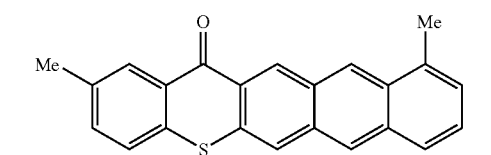
(I-32)
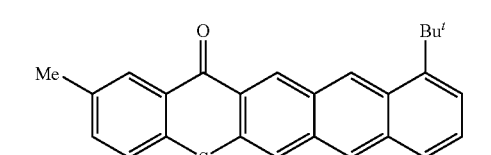
(I-33)
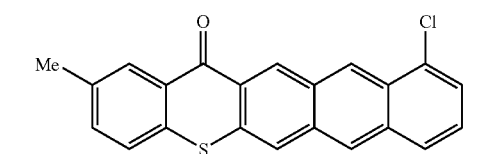
(I-34)
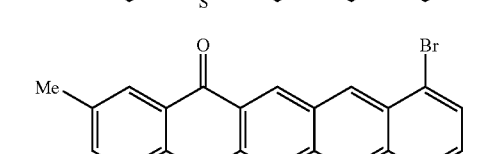
(I-35)
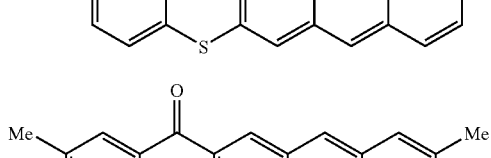
(I-36)
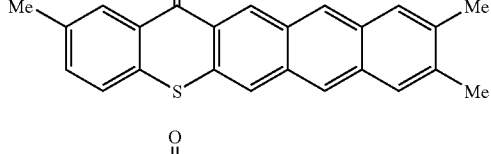
(I-37)
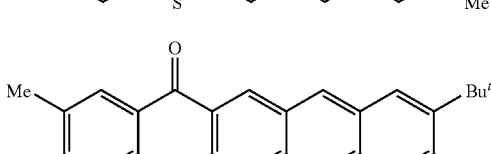
(I-38)
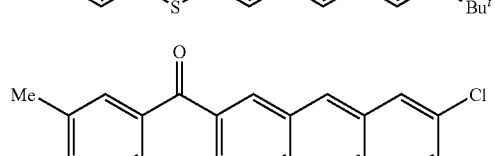
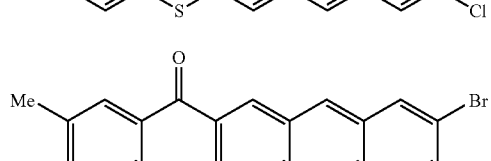
(I-39)
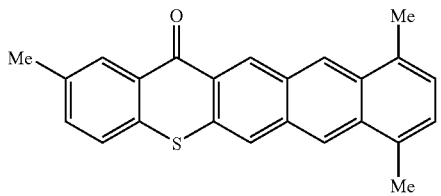
(I-40)
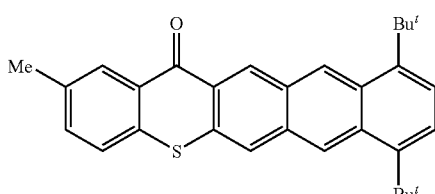
(I-41)
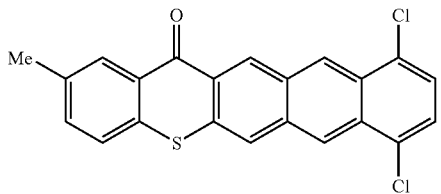
(I-42)
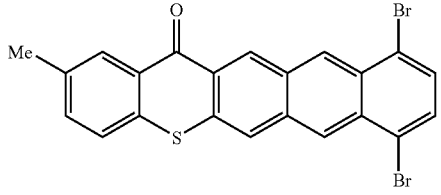
(I-43)
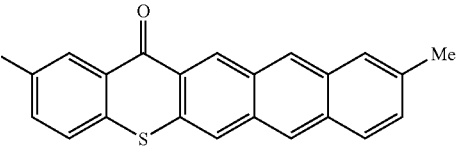
(I-44)
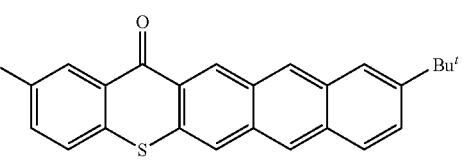
(I-45)
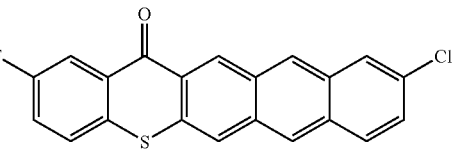
(I-46)
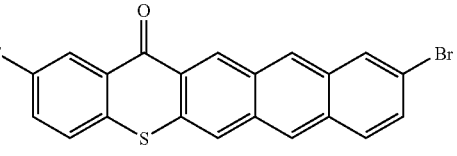
(I-47)
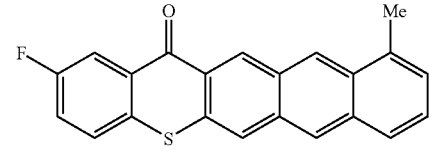

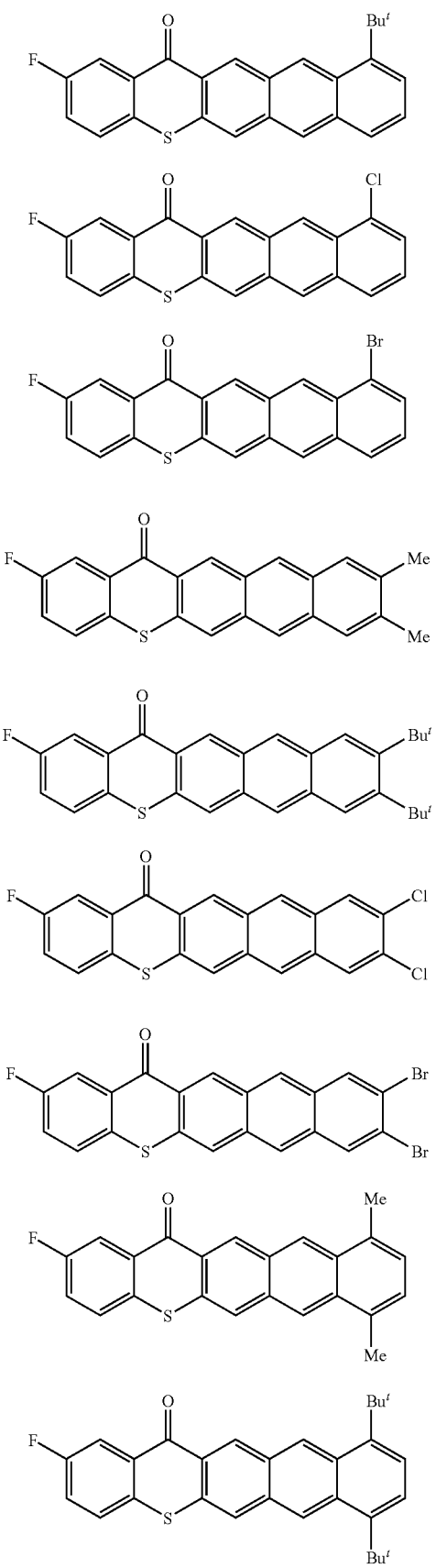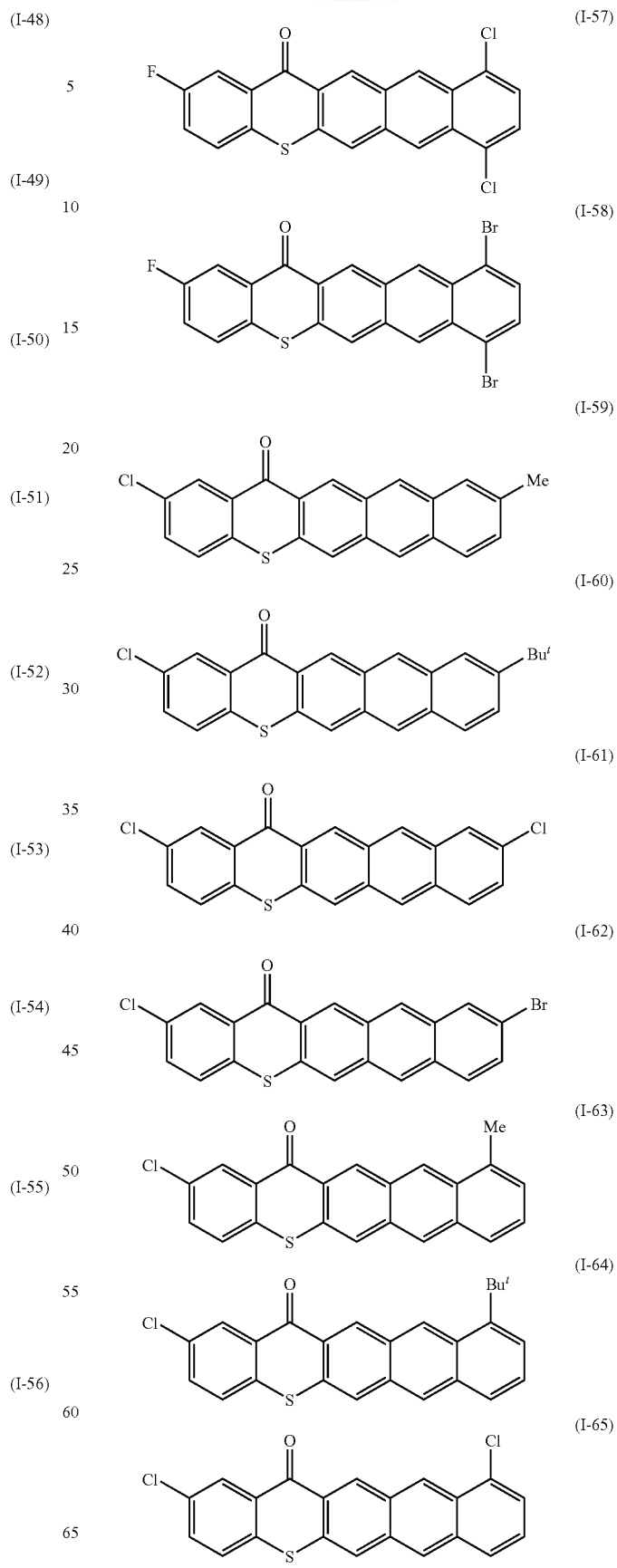

-continued
(I-66) 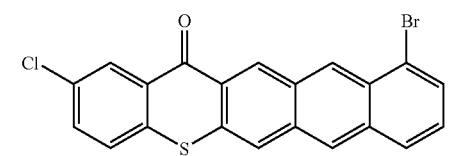
(I-67) 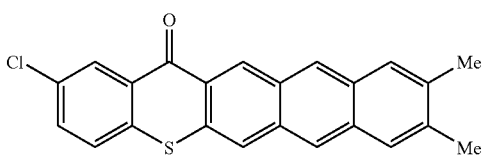
(I-68) 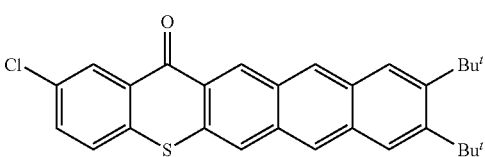
(I-69) 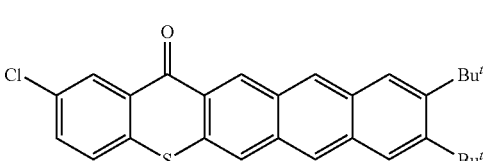
(I-70) 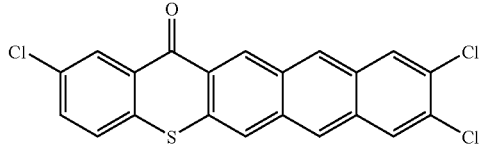
(I-71) 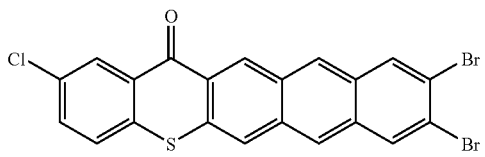
(I-72) 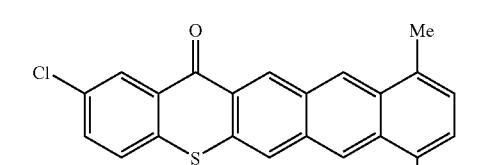
(I-73) 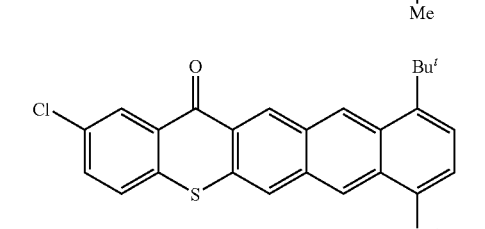
-continued
(I-74) 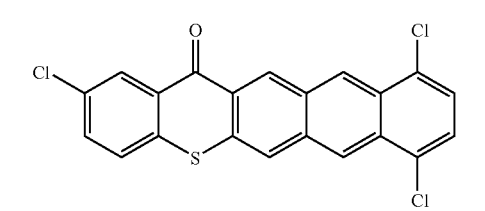
(I-75)
(I-76)
(I-77)
(I-78)
(I-79)
(I-80)
(I-81)
(I-82)

-continued

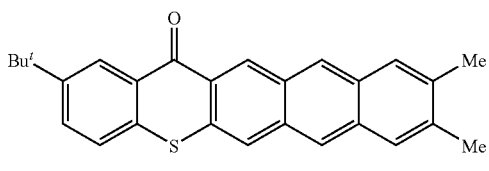
(I-83)

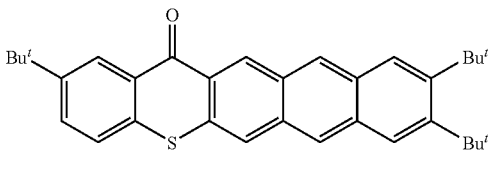
(I-84)

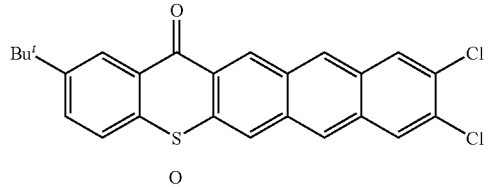
(I-85)

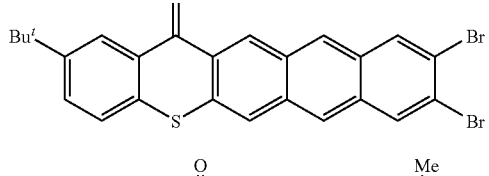
(I-86)

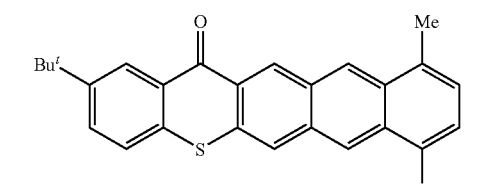
(I-87)

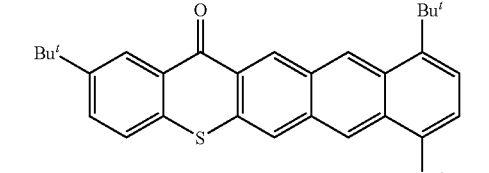
(I-88)

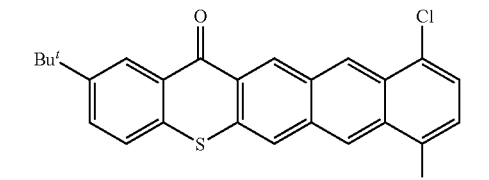
(I-89)

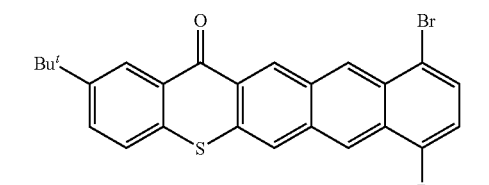
(I-90)

The method for synthesizing a compound represented by Formula (I) is not particularly limited; for example, there are a method in which an anthracene is reacted with a salicylic acid, a 2-sulfanylbenzoic acid, or a 2-aminobenzoic acid under acidic conditions or in the presence of a Lewis acid, a method in which the 2-position of an anthracene is substituted with a group having a terminal carboxy group and intramolecular cyclization is carried out, etc.

(B) Polymerizable Compound

The photocurable composition of the present invention preferably comprises a polymerizable compound.

As the polymerizable compound, a radically polymerizable compound and a cationically polymerizable compound can be cited, and it is preferable to use a radically polymerizable compound as the polymerizable compound.

Radically Polymerizable Compound

As the radically polymerizable compound, it is preferable to use a compound having an ethylenically unsaturated bond. Specific examples thereof include (meth)acrylic acid, (meth)acrylic acid esters, (meth)acrylamide compounds, and vinyl compounds (e.g. aliphatic vinyl compounds, aromatic vinyl compounds, an N-vinyl compounds).

Among these, various (meth)acrylates may be used preferably as the compound having an ethylenically unsaturated bond.

Examples thereof include monofunctional monomers such as isoamyl acrylate, stearyl acrylate, lauryl acrylate, octyl acrylate, decyl acrylate, isoamylstyl acrylate, isostearyl acrylate, 2-ethylhexyl diglycol acrylate, 2-hydroxybutyl acrylate, 2-acryloyloxyethylhexahydrophthalic acid, butoxyethyl acrylate, ethoxy diethylene glycol acrylate, methoxydiethylene glycol acrylate, methoxypolyethylene glycol acrylate, methoxypropylene glycol acrylate, phenoxyethyl acrylate, tetrahydrofurfuryl acrylate, isobornyl acrylate, 2-hydroxyethyl acrylate, 2-hydroxypropyl acrylate, 2-hydroxy-3-phenoxypropyl acrylate, 2-acryloyloxyethylsuccinic acid, 2-acryloyloxyethylphthalic acid, 2-acryloyloxyethyl-2-hydroxyethylphthalic acid, a lactone-modified flexible acrylate, t-butylcyclohexyl acrylate, and corresponding methacrylate versions of these acrylate monomers.

Furthermore, examples thereof include polyfunctional monomers such as triethylene glycol diacrylate, tetraethylene glycol diacrylate, polyethylene glycol diacrylate, dipropylene glycol diacrylate, tripropylene glycol diacrylate, polypropylene glycol diacrylate, 1,4-butanediol diacrylate, 1,6-hexanediol diacrylate, 1,9-nonanediol diacrylate, neopentyl glycol diacrylate, dimethyloltricyclodecane diacrylate, bisphenol A EO (ethylene oxide) adduct diacrylate, bisphenol A PO (propylene oxide) adduct diacrylate, neopentyl hydroxypivalate glycol diacrylate, polytetramethylene glycol diacrylate, trimethylolpropane triacrylate, EO-modified trimethylolpropane triacrylate, pentaerythritol triacrylate, pentaerythritol tetraacrylate, dipentaerythritol hexaacrylate, ditrimethylolpropane tetraacrylate, glycerolpropoxy triacrylate, caprolactone-modified trimethylolpropane triacrylate, pentaerythritolethoxy tetraacrylate, caprolactone-modified dipentaerythritol hexaacrylate, and corresponding methacrylate versions of these acrylate monomers.

In addition to the above, a polymerizable oligomer may be added in the same manner as for a monomer. Examples of the polymerizable oligomer include an epoxy(meth)acrylate, an aliphatic urethane(meth)acrylate, an aromatic urethane (meth)acrylate, a polyester(meth)acrylate, and a straight chain (meth)acrylic oligomer.

As the radically polymerizable compound, it is preferable to use a radically polymerizable monomer having a cyclic structure, and as the radically polymerizable monomer having a cyclic structure, it is preferable to use a monofunctional radically polymerizable monomer having an alicyclic structure and/or an aromatic monofunctional radically polymerizable monomer.

The monofunctional radically polymerizable monomer having an aliphatic cyclic structure and the aromatic monofunctional radically polymerizable monomer are preferably monofunctional radically polymerizable monomers represented by Formula (A1) below. The monofunctional radically polymerizable monomer having an aliphatic cyclic structure is a monofunctional radically polymerizable monomer having an alicyclic hydrocarbon group that may contain a heteroatom, and the aromatic monofunctional radically polymerizable monomer is a monofunctional radically polymerizable monomer having an aromatic group. Furthermore, the monofunctional radically polymerizable monomer is a monomer having only one polymerizable ethylenically unsaturated bond, and preferred examples of a group having a polymerizable ethylenically unsaturated bond include an acryloyloxy group, a methacryloyloxy group, an acrylamide group, a methacrylamide group, a vinyl group, and a vinyloxy group.

The radically polymerizable monomer having an aliphatic cyclic structure has a radically polymerizable group in addition to the aliphatic cyclic structure, and an ethylenically unsaturated bond present within the aliphatic cyclic structure does not correspond to the polymerizable ethylenically unsaturated bond.

(A1)

In Formula (A1) above, $R^1$ denotes a hydrogen atom, a halogen atom, or an alkyl group having 1 to 4 carbons, $X^1$ denotes a single bond, an ether bond (—O—), an ester bond (—C(O)O— or —OC(O)—), an amide bond (—C(O)NH— or —NHC(O)—), a carbonyl bond (—C(O)—), an optionally branched alkylene group having no greater than 20 carbons, or a second divalent linking group in which a combination thereof are bonded, and it is preferable for $X^1$ to be the first divalent linking group alone or one having an ether bond, an ester bond, and/or an alkylene group having no greater than 20 carbons when it has the second divalent linking group.

$R^2$ is an aromatic group such as a monocyclic aromatic group or a polycyclic aromatic group, or an alicyclic hydrocarbon group; the aromatic group and the alicyclic hydrocarbon group may have a halogen atom, a hydroxy group, an amino group, a siloxane group, or a substituent having no greater than 30 carbons, and the ring structure of the aromatic group and the alicyclic hydrocarbon group may contain a heteroatom such as O, N, or S.

In Formula (A1) above, $R^1$ is preferably a hydrogen atom or an alkyl group having 1 to 4 carbons, more preferably a hydrogen atom or a methyl group, and particularly preferably a hydrogen atom.

Furthermore, $X^1$ is preferably one having an ester bond (—C(O)O—).

That is, in the present invention, the monofunctional radically polymerizable monomer having an aliphatic cyclic structure and the aromatic monofunctional radically polymerizable monomer are preferably an acrylate (acrylic acid ester) or a methacrylate (methacrylic acid ester).

The content of the monofunctional radically polymerizable monomer having an alicyclic structure and the aromatic monofunctional radically polymerizable monomer is preferably 1.0 to 80.0 wt % of the photocurable composition, more preferably 5.0 to 70.0 wt %, and yet more preferably 10.0 to 60.0 wt %. When the content is in the above-mentioned range, good curability and flexibility of a cured coating can be obtained.

It is also possible to use in combination a monofunctional radically polymerizable monomer having an alicyclic structure and an aromatic monofunctional radically polymerizable monomer, and it is also preferable to use either one thereof. In the present invention, a mode in which the two types are used in combination is more preferable.

The content of the monofunctional radically polymerizable monomer having an alicyclic structure is preferably 1.0 to 30.0 wt % of the photocurable composition, more preferably 5.0 to 20.0 wt %, and yet more preferably 10.0 to 20.0 wt %. When the content is in the above-mentioned range, good curability and flexibility of a cured film can be obtained.

Furthermore, the content of the aromatic monofunctional radically polymerizable monomer is preferably 10.0 to 60.0 wt % of the photocurable composition, more preferably 25.0 to 50.0 wt %, and yet more preferably 30.0 to 45.0 wt %. When the content is in the above-mentioned range, good curability and flexibility of a cured film can be obtained.

Monofunctional Radically Polymerizable Monomer Having Aliphatic Cyclic Structure $R^2$ of Formula (A1) may be an alicyclic hydrocarbon group. Furthermore, it may be a group having an alicyclic hydrocarbon group containing a heteroatom such as O, N, or S.

The alicyclic hydrocarbon group may be a group having a cycloalkane with 3 to 12 carbons.

Specific examples of the alicyclic hydrocarbon group containing a heteroatom such as O, N, or S include groups formed by removing at least one hydrogen from pyrrolidine, pyrazolidine, imidazolidine, isooxazolidine, isothiazolidine, piperidine, piperazine, morpholine, thiomorpholine, diazole, triazole, and tetrazole.

The alicyclic hydrocarbon group and the heterocycle-containing alicyclic hydrocarbon group may have a substituent, and the substituent is preferably a halogen atom, a hydroxy group, an amino group, a thiol group, a siloxane group, an optionally substituted hydrocarbon group having a total of no greater than 30 carbons, a heterocyclic group containing a heteroatom such as O, N, or S, or an oxy group (=O) as a divalent substituent.

The monofunctional radically polymerizable monomer having an aliphatic cyclic structure is preferably a compound having a norbornane skeleton represented by Formula (A2) below,

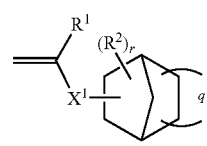

(A2)

in Formula (A2) it is preferable that $R^1$ denotes a hydrogen atom, a halogen atom, or an alkyl group having 1 to 4 carbons, and $X^1$ denotes a divalent linking group, and preferably an ether group (—O—), an ester group (—C(O)O— or —OC(O)—), an amide group (—C(O)NR'—), a carbonyl group (—C(O)—), a nitrogen atom (—NR'—), an optionally substituted alkylene group having 1 to 15 carbons, or a divalent group in which two or more thereof are combined. R' denotes a hydrogen atom, a straight-chain, branched, or cyclic alkyl group having 1 to 20 carbons, or an aryl group having 6 to 20 carbons. $R^2$ denotes a substituent, r denotes an integer of 0 to 5, q denotes a cyclic hydrocarbon structure, the cyclic hydrocarbon structure may comprise a carbonyl bond (—C(O)—) and/or an ester bond (—C(O)O—) in addition to a hydrocarbon bond, the r $R^2$s may be identical to or different from each other, and one carbon atom in the norbornane skeleton may be replaced by an ether bond (—O—) and/or an ester bond (—C(O)O—).

In Formula (A2), $R^1$ is preferably a hydrogen atom or an alkyl group having 1 to 4 carbons, and more preferably a hydrogen atom or a methyl group.

The end of $X^1$ in Formula (A2) that is bonded to the vinyl group is preferably an ester group or an amide group via which a carbonyl carbon of $X^1$ is bonded to the vinyl group, and is more preferably an ester bond. One having the structure $H_2C=C(R^1)$—C(O)O— is particularly preferable. In this case, another moiety of $X^1$ that is bonded to the norbornane skeleton may be a single bond or one freely selected from the groups above.

The vinyl moiety containing $R^1$ and $X^1$ ($H_2C=C(R^1)$—$X^1$—) may be bonded to any position of the alicyclic hydrocarbon structure. The 'alicyclic hydrocarbon structure' means the norbornane structure and the cyclic hydrocarbon structure of q of Formula (A2).

From the viewpoint of improving affinity with a colorant, the end of $X^1$ bonded to the alicyclic hydrocarbon structure in Formula (A2) is preferably an oxygen atom, and more preferably an ethereal oxygen atom, and $X^1$ in Formula (A2) is yet more preferably —C(O)O(CH$_2$CH$_2$O)$_p$— (p denotes 1 or 2).

The $R^2$s in Formula (A2) independently denote a substituent that may be bonded to any position on the alicyclic hydrocarbon structure. Furthermore, the r $R^2$s may be identical to or different from each other.

The r $R^2$s may independently be a monovalent or polyvalent substituent; the monovalent substituent is preferably a hydroxy group, a substituted or unsubstituted amino group, a thiol group, a siloxane group, or an optionally substituted hydrocarbon group or heterocyclic group having a total of no greater than 30 carbons, and a divalent substituent is preferably an oxy group (=O).

The substitution number r for $R^2$ denotes an integer of 0 to 5.

q in Formula (A2) denotes a cyclic hydrocarbon structure whose opposite termini may substitute any positions of the norbornane skeleton; it may be a monocyclic structure or a polycyclic structure, and it may contain a carbonyl bond (—C(O)—) and/or an ester bond (—C(O)O—) as well as the hydrocarbon bonds in the cyclic hydrocarbon structure.

The monomer represented by Formula (A2) above is preferably a monomer represented by Formula (A3) or Formula (A4). The unsaturated bond in the cyclic hydrocarbon structure of Formula (A4) has low radical polymerizability, and in the present invention a compound represented by Formula (A4) is considered as a monofunctional radically polymerizable monomer.

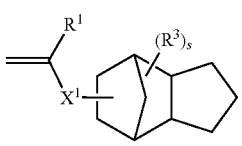

(A3)

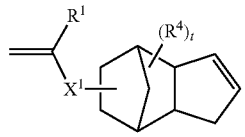

(A4)

In Formula (A3) and Formula (A4), $R^1$ denotes a hydrogen atom, a halogen atom, or an alkyl group having 1 to 4 carbons, $X^1$ denotes a divalent linking group, $R^3$ and $R^4$ independently denote a substituent, s and t independently denote an integer of 0 to 5, and the s $R^3$s and the t $R^4$s may be identical to or different from each other.

$R^1$ and $X^1$ in Formula (A3) or Formula (A4) have the same meanings as those of $R^1$ and $X^1$ in Formula (A2) and preferred ranges are also the same.

The vinyl moiety containing $R^1$ and $X^1$ in Formula (A3) or Formula (A4) may be bonded to any position on the alicyclic hydrocarbon structures in Formula (A3) and Formula (A4) below.

$R^3$ and $R^4$ in Formula (A3) and Formula (A4) independently denote a substituent, and it may be bonded to any position on the alicyclic hydrocarbon structures in Formula (A3) and Formula (A4). The substituent denoted by $R^3$ or $R^4$ has the same meaning as that of the substituent denoted by $R^2$ in Formula (A2), and a preferred range is also the same.

s and t in Formula (A3) or Formula (A4) independently denote an integer of 0 to 5, and the s $R^3$s and the t $R^4$s may be identical to or different from each other.

Preferred specific examples of monofunctional acrylates as the monomer represented by Formula (A2) are shown below.

In some of the compound examples below, a hydrocarbon chain is represented by a simplified structural formula in which symbols for carbon (C) and hydrogen (H) are omitted.

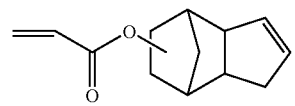

(M-10)

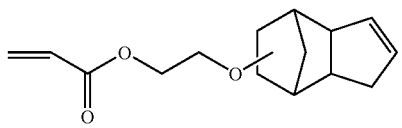

(M-11)

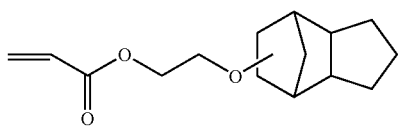

(M-12)

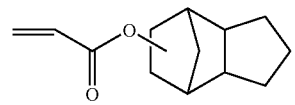

(M-13)

(M-14)
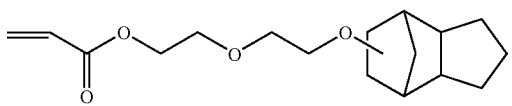

(M-20)
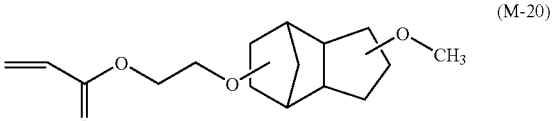

(M-22)
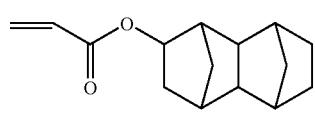

(M-23)
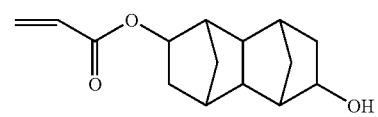

(M-25)
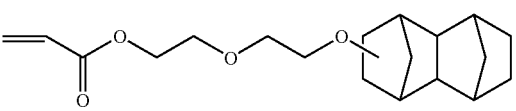

(M-29)
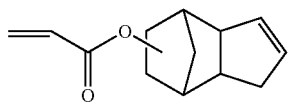

Preferred specific examples of monofunctional methacrylates as the monomer represented by Formula (A2) are shown below.

(M-16)
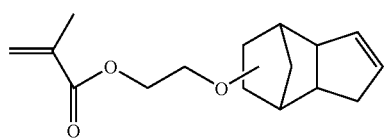

(M-17)
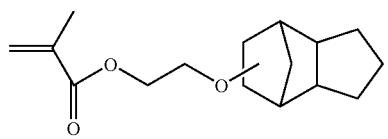

(M-18)
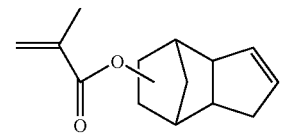

(M-19)
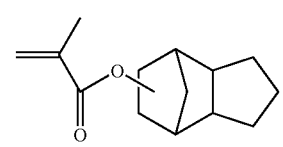

(M-21)
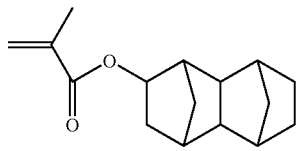

A preferred specific example of a monofunctional acrylamide as the monomer represented by Formula (A2) is shown below.

(M-15)
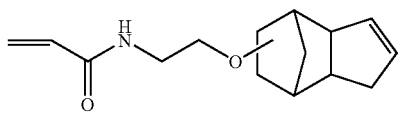

Aromatic Monofunctional Radically Polymerizable Monomer

The aromatic monofunctional radically polymerizable monomer is preferably a polymerizable monomer represented by Formula (A5) below, (A5)
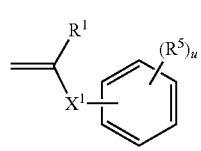

in Formula (A5), $R^1$ denotes preferably a hydrogen atom, a halogen atom, or an alkyl group having 1 to 4 carbons, $X^1$ denotes a divalent linking group, $R^5$ denotes a substituent, u denotes an integer of 0 to 5, the u $R^5$s may be identical to or different from each other, the plurality of $R^5$s may be bonded to each other to form a ring, and the ring may be an aromatic ring.

In Formula (A5), $R^1$ is preferably a hydrogen atom or an alkyl group having 1 to 4 carbons, more preferably a hydrogen atom or a methyl group, and yet more preferably a hydrogen atom.

$X^1$ has the same meaning as that of $X^1$ in Formula (A2), and a preferred range is also the same.

The u $R^5$s may independently be a monovalent or polyvalent substituent, and the monovalent substituent is preferably a hydroxy group, a substituted or unsubstituted amino group, thiol group, or siloxane group, or an optionally substituted hydrocarbon group or heterocyclic group having a total number of carbons of no greater than 30.

In Formula (A5), the plurality of $R^5$s preferably form an aromatic ring when they are bonded to each other to form a ring.

That is, in Formula (A5), the aromatic group is preferably a group (a phenyl group, a phenylene group, etc.) in which at least one hydrogen is removed from benzene, which is a monocyclic aromatic group, or a polycyclic aromatic group having 2 to 4 rings, but is not limited thereto. Specific examples thereof include a group in which at least one hydrogen atom is removed from naphthalene, anthracene, 1H-indene, 9H-fluorene, 1H-phenalene, phenanthrene, triphenylene, pyrene, naphthacene, tetraphenylene, biphenylene, as-indacene, s-indacene, acenaphthylene, fluoranthene, acephenanthrylene, aceanthrylene, chrysene, or pleiadene.

These aromatic groups may be aromatic heterocyclic groups containing a heteroatom such as O, N, or S. Specific examples thereof include a group in which at least one hydrogen atom is removed from a monocyclic aromatic heterocyclic compound such as furan, thiophene, 1H-pyrrole, 2H-pyrrole, 1H-pyrazole, 1H-imidazole, isoxazole, isothiazole, 2H-pyran, 2H-thiopyran, pyridine, pyridazine, pyrimidine, pyrazine, 1,2,3-triazole, or 1,2,4-triazole.

Furthermore, examples include a group in which at least one hydrogen atom is removed from a polycyclic aromatic heterocyclic compound such as thianthrene, isobenzofuran, isochromene, 4H-chromene, xanthene, phenoxathiine, indolizine, isoindole, indole, indazole, purine, 4H-quinolizine, isoquinoline, quinoline, phthalazine, naphthyridine, quinoxaline, quinazoline, cinnoline, pteridine, carbazole, β-carboline, phenanthridine, acridine, perimidine, phenanthroline, phenazine, phenothiazine, phenoxazine, or pyrrolidine.

These aromatic groups may have one or more halogen atom, hydroxy group, amino group, thiol group, siloxane group, or substituent having no greater than 30 carbons. A cyclic structure containing a heteroatom such as O, N, or S may be formed from two or more substituents possessed by the aromatic group as in, for example, phthalic anhydride or phthalimide anhydride.

In the present invention, the polycyclic aromatic group is more preferably a polycyclic aromatic group having 2 to 3 rings, and is particularly preferably a naphthyl group.

Preferred specific examples of the aromatic monofunctional radically polymerizable monomer include, but are not limited to, [L-1] to [L-69] below.

[L-1]

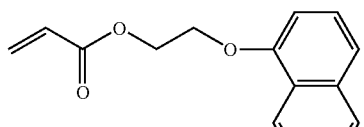

[L-2]

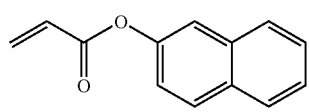

[L-3]

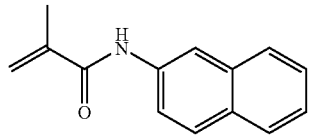

[L-4]

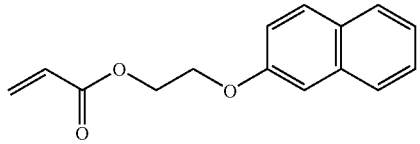

[L-5]

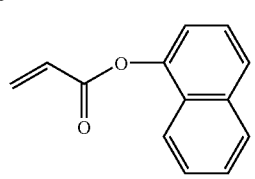

[L-6]

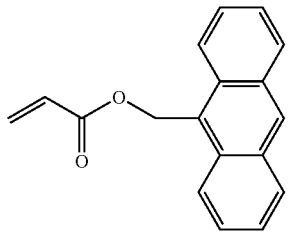

[L-7]

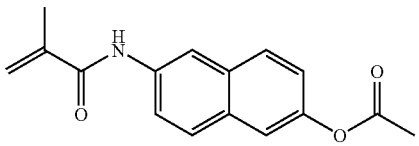

[L-8]

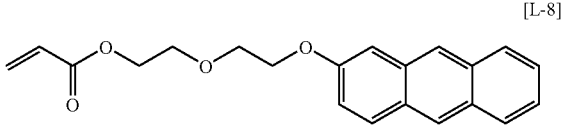

[L-9]

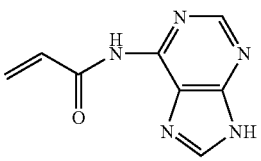

[L-10]

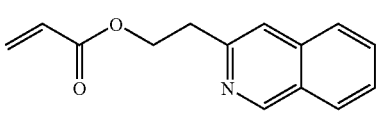

[L-11]

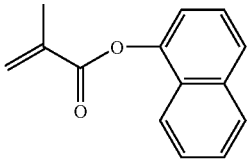

[L-12]

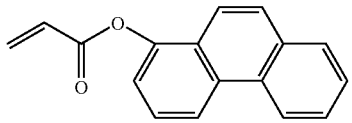

[L-13]

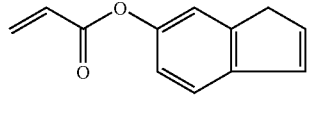

[L-14]

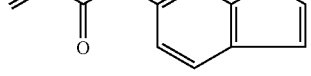

[L-15]

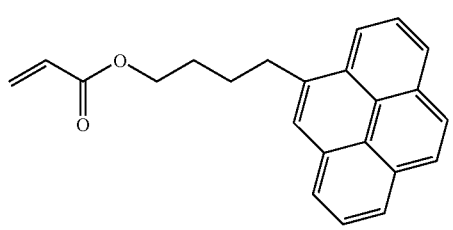

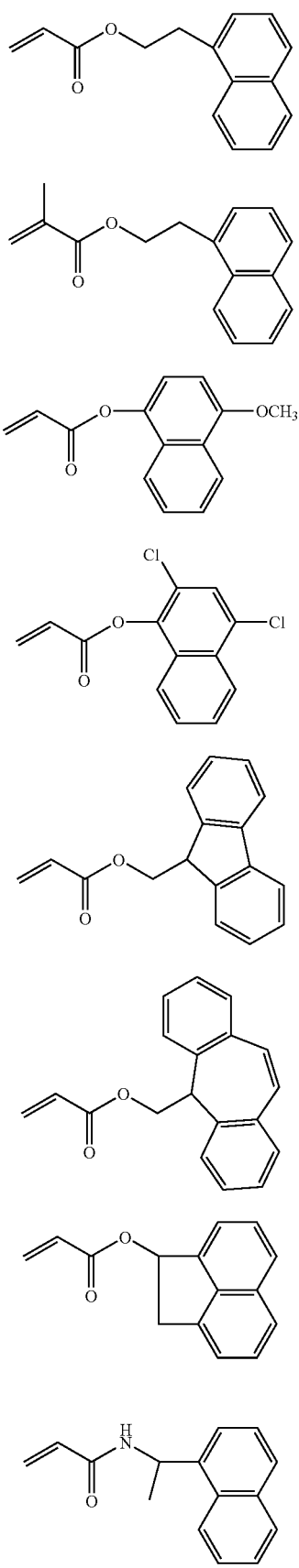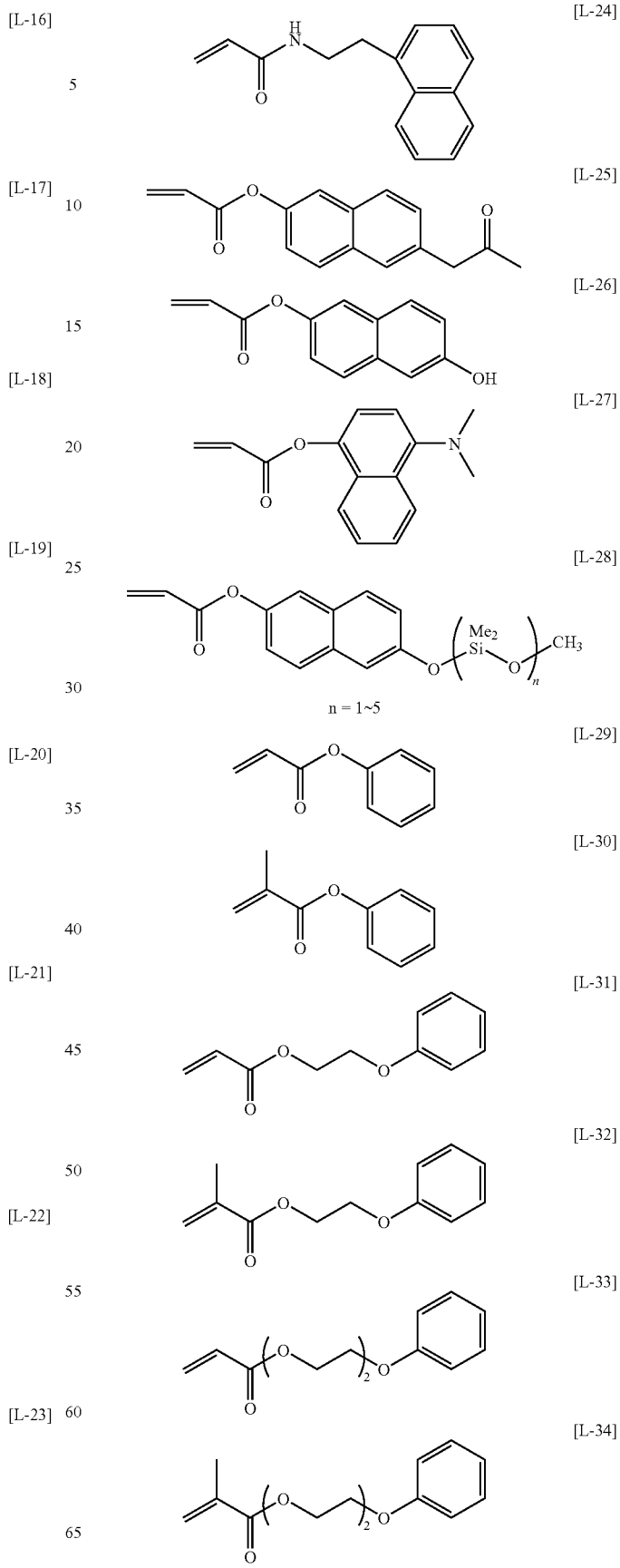

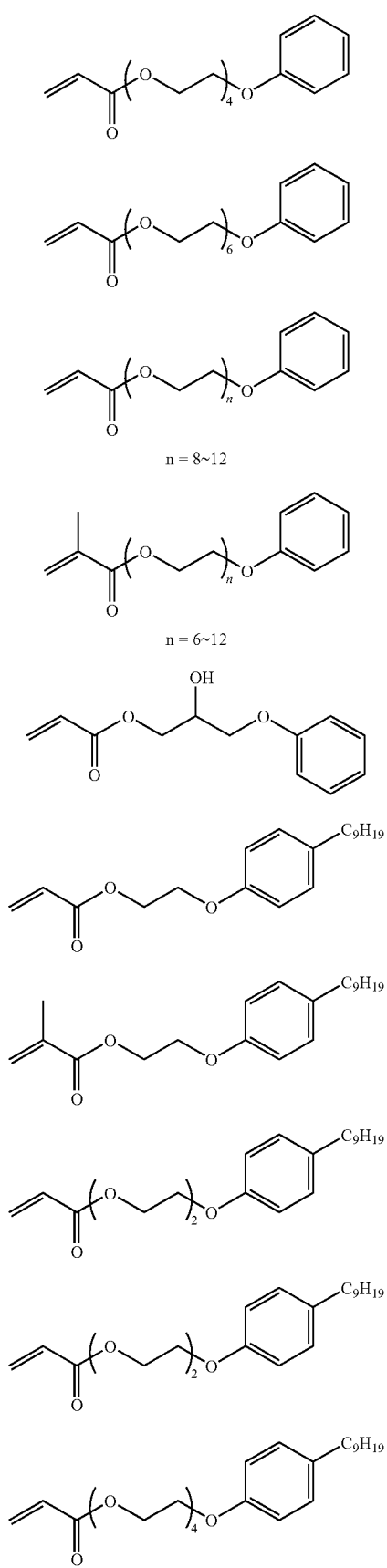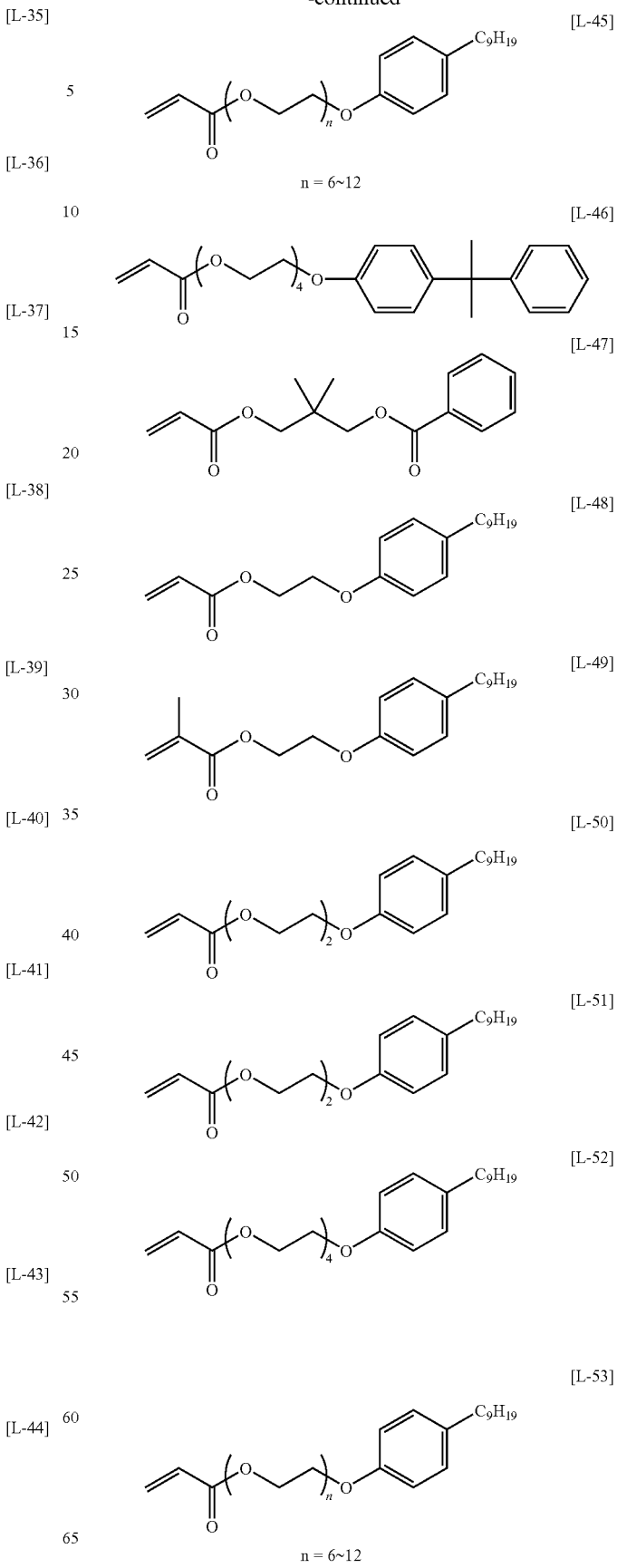

[L-54]
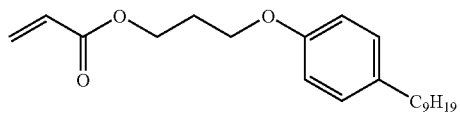

[L-55]
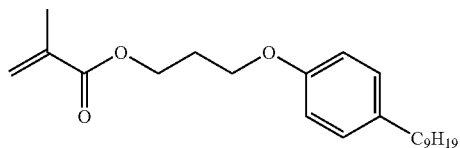

[L-56]
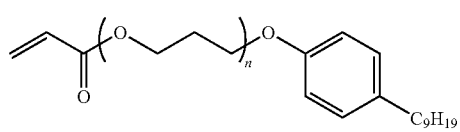
n = 2~12

[L-57]
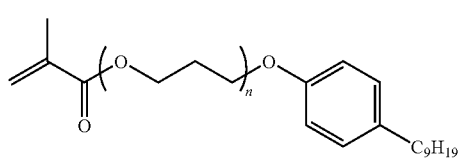
n = 2~12

[L-58]
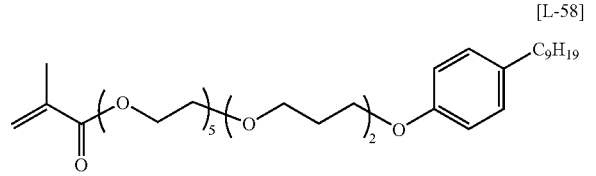

[L-59]
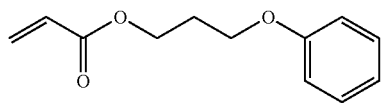

[L-60]
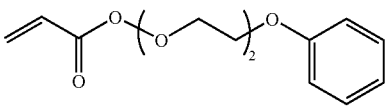

[L-61]
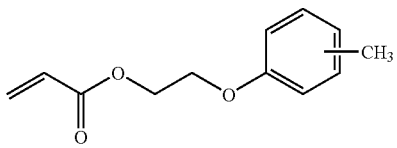

[L-62]
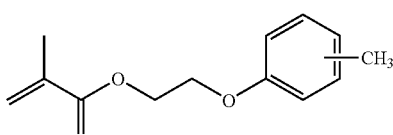

[L-63]
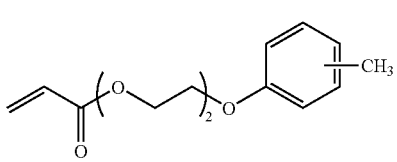

[L-64]
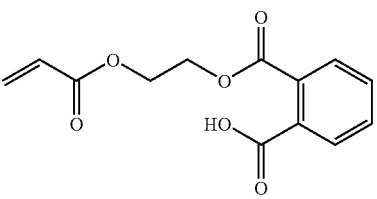

[L-65]
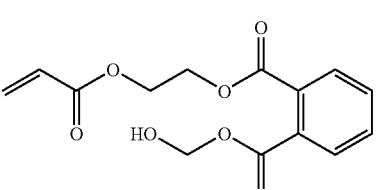

[L-66]
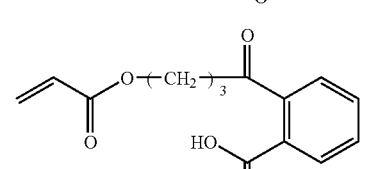

[L-67]
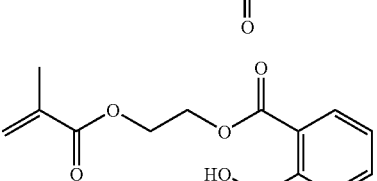

[L-68]
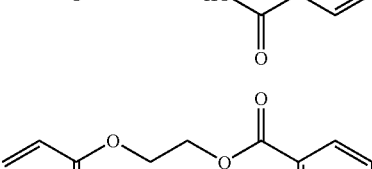

[L-69]
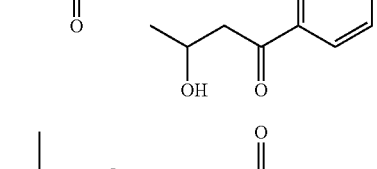

The content of the polymerizable compound is preferably 20.0 to 95.0 wt % of the photocurable composition, more preferably 40.0 to 90.0 wt %, and yet more preferably 60.0 to 85.0 wt %. When the content is in the above-mentioned range, good curability and flexibility of the cured film can be obtained.

(C) Photopolymerization Initiator

The photocurable composition of the present invention preferably comprises a photopolymerization initiator.

The photopolymerization initiator preferably comprises an acylphosphine oxide compound and/or an α-aminoacetophenone compound.

As the photopolymerization initiator, in addition to an acylphosphine oxide compound and an α-aminoacetophenone compound, a known radical polymerization initiator may be used in combination.

Furthermore, the ink composition of the present invention preferably comprises 3 or more types of photopolymerization initiators, more preferably comprises 3 to 5 types of photopolymerization initiators, and yet more preferably 3 or 4 types of photopolymerization initiators.

Moreover, the ink composition of the present invention preferably comprises 2 or more types of acylphosphine oxide compounds, more preferably comprises 2 to 4 types of acylphosphine oxide compounds, and yet more preferably comprises 2 types of acylphosphine oxide compounds.

The photopolymerization initiator that can be used in the present invention is a compound that generates a polymerization initiating species upon exposure to light. Examples of the light include γ rays, β rays, an electron beam, ultraviolet rays, visible light, and infrared light, and from the viewpoint of equipment cost and operational safety, ultraviolet rays and visible light are preferable.

At least one type of compound selected from the group consisting of an acylphosphine oxide compound and an α-aminoacetophenone compound is contained as the photopolymerization initiator. In accordance with the use of an acylphosphine oxide compound and/or an α-aminoacetophenone compound as the photopolymerization initiator, curability can be enhanced. In particular, the use of these photopolymerization initiators can enhance the curability in the interior of a coating.

Furthermore, in the present invention, it is preferable to use as the photopolymerization initiator at least one type of acylphosphine oxide compound and at least one type of α-aminoacetophenone compound in combination.

Examples of the acylphosphine oxide compound and the α-aminoacetophenone compound that can be used preferably are as follows.

Acylphosphine Oxide Compound

As the acylphosphine oxide compound, a compound represented by Formula (2) or Formula (3) below is preferable.

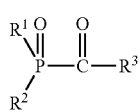

(2)

$R^1$ and $R^2$ in Formula (2) above independently denote an aliphatic group, an aromatic group, an aliphatic oxy group, an aromatic oxy group, or a heterocyclic group, and $R^3$ denotes an aliphatic group, an aromatic group, or a heterocyclic group. $R^1$ and $R^2$ above may be bonded to form a 5-membered to 9-membered ring. The ring structure may be a heterocycle having in the ring structure an oxygen atom, a nitrogen atom, a sulfur atom, etc.

Examples of the aliphatic group represented by $R^1$, $R^2$, or $R^3$ above include an alkyl group, a substituted alkyl group, an alkenyl group, a substituted alkenyl group, an alkynyl group, a substituted alkynyl group; among them, an alkyl group, a substituted alkyl group, an alkenyl group, a substituted alkenyl group are preferable, and an alkyl group and a substituted alkyl group are particularly preferable. Furthermore, the aliphatic group may be a cyclic aliphatic group or an open-chain aliphatic group. The open-chain aliphatic group may be branched.

Examples of the alkyl group include straight chain, branched, and cyclic alkyl groups, and the number of carbons in the alkyl group is preferably at least 1 but no greater than 30, and more preferably at least 1 but no greater than 20. A preferred range for the number of carbons in the alkyl moiety of the substituted alkyl group is the same as for the alkyl group above. Examples of the alkyl group include a methyl group, an ethyl group, a propyl group, a butyl group, a pentyl group, a hexyl group, an octyl group, a 2-ethylhexyl group, a decyl group, a dodecyl group, an octadecyl group, a cyclohexyl group, a cyclopentyl group, a neopentyl group, an isopropyl group, and an isobutyl group.

Examples of the substituent of the substituted alkyl group include —COOH (carboxy group), —SO₃H (sulfo group), —CN (cyano group), a halogen atom (e.g. a fluorine atom, a chlorine atom, a bromine atom), —OH (hydroxy group), an alkoxycarbonyl group having no greater than 30 carbons (e.g. a methoxycarbonyl group, an ethoxycarbonyl group, a benzyloxycarbonyl group), an alkylsulfonylaminocarbonyl group having no greater than 30 carbons, an arylsulfonylaminocarbonyl group having no greater than 30 carbons, an alkylsulfonyl group having no greater than 30 carbons, an arylsulfonyl group having no greater than 30 carbons, an acylaminosulfonyl group having no greater than 30 carbons, an alkoxy group having no greater than 30 carbons (e.g. a methoxy group, an ethoxy group, a benzyloxy group, a phenoxyethoxy group, a phenethyloxy group), an alkylthio group having no greater than 30 carbons (e.g. a methylthio group, an ethylthio group, a methylthioethylthioethyl group), an aryloxy group having no greater than 30 carbons (e.g. a phenoxy group, a p-tolyloxy group, a 1-naphthoxy group, a 2-naphthoxy group), a nitro group, an alkoxycarbonyloxy group having no greater than 30 carbons, an aryloxycarbonyloxy group having no greater than 30 carbons, an acyloxy group having no greater than 30 carbons (e.g. an acetyloxy group, a propionyloxy group), an acyl group having no greater than 30 carbons (e.g. an acetyl group, a propionyl group, a benzoyl group), a carbamoyl group (e.g. a carbamoyl group, an N,N-dimethylcarbamoyl group, a morpholinocarbonyl group, a piperidinocarbonyl group), a sulfamoyl group (e.g. a sulfamoyl group, an N,N-dimethylsulfamoyl group, a morpholinosulfonyl group, a piperidinosulfonyl group), an aryl group having no greater than 30 carbons (e.g. a phenyl group, a 4-chlorophenyl group, a 4-methylphenyl group, an α-naphthyl group), a substituted amino group (e.g. an amino group, an alkylamino group, a dialkylamino group, an arylamino group, a diarylamino group, an acylamino group), a substituted ureido group having no greater than 30 carbons, a substituted phosphono group having no greater than 30 carbons, and a heterocyclic group having no greater than 30 carbons. Here, the carboxy group, the sulfo group, the hydroxy group, and the phosphono group may be in the form of a salt. In this case, a cation forming the salt is a group that can form a positive ion, and is preferably an organic cationic compound, a transition metal coordination complex cation (a compound described in Japanese registered patent No. 2791143, etc.), or a metal cation (e.g. $Na^+$, $K^+$, $Li^+$, $Ag^+$, $Fe^{2+}$, $Fe^{3+}$, $Cu^+$, $Cu^{2+}$, $Zn^{2+}$, $Al^{3+}$).

Examples of the alkenyl group include straight chain, branched, and cyclic alkenyl groups, and the number of carbons of the alkenyl group is preferably at least 2 but no greater than 30, and more preferably at least 2 but no greater than 20. Furthermore, the alkenyl group may be an unsubstituted alkenyl group or a substituted alkenyl group having a substituent, and a preferred range for the number of carbons in the alkenyl moiety of the substituted alkenyl group is the same as for the alkenyl group above. Examples of the substituent of the substituted alkenyl group include the same substituents as for the above substituted alkyl group.

Examples of the alkynyl group include straight chain, branched, and cyclic alkynyl groups, and the number of carbons of the alkynyl group is preferably at least 2 but no greater than 30, and more preferably at least 2 but no greater than 20. Furthermore, the alkynyl group may be an unsubstituted alkynyl group or a substituted alkynyl group having a substituent, and a preferred range for the number of carbons in the alkynyl moiety of the substituted alkynyl group is the same as for the alkynyl group above. Examples of the substituent of the substituted alkynyl group include the same substituents as for the above substituted alkyl group.

Examples of the aromatic group represented by $R^1$, $R^2$, or $R^3$ include an aryl group and a substituted aryl group. The number of carbons of the aryl group is preferably at least 6 but no greater than 30, and more preferably at least 6 but no greater than 20. A preferred range for the number of carbons in the aryl moiety of the substituted aryl group is the same as for the aryl group above. Examples of the aryl group include a phenyl group, an α-naphthyl group, and a β-naphthyl group. Examples of the substituent of the substituted aryl group include the same substituents as for the above substituted alkyl group, and straight chain, branched, and cyclic alkyl groups having no greater than 30 carbons.

The aliphatic oxy group represented by $R^1$ or $R^2$ above is preferably an alkoxy group having at least 1 but no greater than 30 carbons, and examples thereof include a methoxy group, an ethoxy group, a butoxy group, an octyloxy group, and a phenoxyethoxy group. However, the examples are not limited thereto.

The aromatic oxy group represented by $R^1$ or $R^2$ above is preferably an aryloxy group having at least 6 but no greater than 30 carbons, and examples thereof include a phenoxy group, a methylphenyloxy group, a chlorophenyloxy group, a methoxyphenyloxy group, and an octyloxyphenyloxy group. However, the examples are not limited thereto.

The heterocyclic group represented by $R^1$, $R^2$, or $R^3$ above is preferably an N, O, or S atom-containing heterocyclic group, and examples thereof include a pyridyl group, a furyl group, a thienyl group, an imidazolyl group, and a pyrrolyl group.

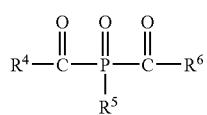

(3)

$R^4$ and $R^6$ in Formula (3) above independently denote an alkyl group, an aryl group, or a heterocyclic group, and $R^5$ denotes an alkyl group, an aryl group, an alkoxy group, an aryloxy group, or a heterocyclic group.

The alkyl group, aryl group, heterocyclic group, alkoxy group, and aryloxy group denoted by $R^4$, $R^5$, or $R^6$ may have a substituent, and examples of the substituent include the same substituents as in the case of Formula (2) above.

The alkyl group, aryl group, heterocyclic group, alkoxy group, and aryloxy group in Formula (3) above are the same as those in Formula (2) above.

The compound represented by Formula (2) above is preferably a compound represented by Formula (4) below.

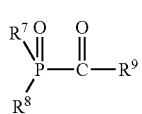

(4)

In Formula (4), $R^7$ and $R^8$ independently denote a phenyl group, a methoxy group, or an isopropoxy group, and $R^9$ denotes a 2,4,6-trimethylphenyl group, a 2,4-dimethylphenyl group, a 2-methylphenyl group (o-toluoyl group), an isobutyl group, or a t-butyl group.

The compound represented by Formula (3) above is preferably a compound represented by Formula (5) below,

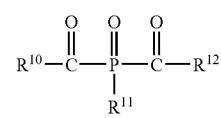

(5)

in Formula (5), $R^{10}$ and $R^{12}$ independently denote a 2,4,6-trimethylphenyl group, a 2,6-dimethylphenyl group, or a 2,6-dimethoxyphenyl group, and $R^{11}$ denotes a phenyl group or a 2,4,4-trimethylpentyl group.

Examples of the acylphosphine oxide compound represented by Formula (2) or (3) above include compounds described in JP-B-63-40799 (JP-B denotes a Japanese examined patent application publication), JP-B-5-29234, JP-A-10-95788, JP-A-10-29997, etc.

Specific examples of the acylphosphine oxide compound include the compounds shown below (compound examples (P-1) to (P-26)), but the present invention is not limited thereto.

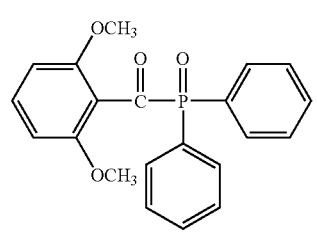

(P-1)

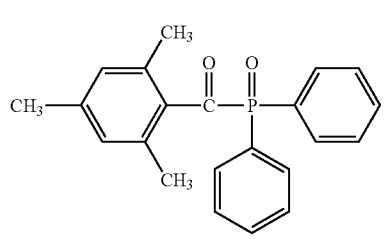

(P-2)

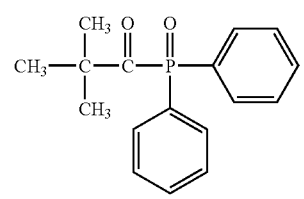

(P-3)

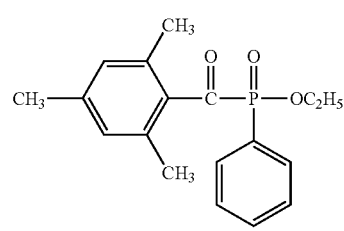

(P-4)

-continued
(P-5) 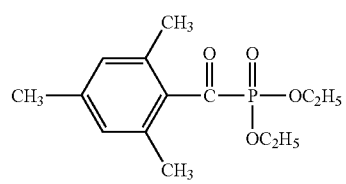
(P-6) 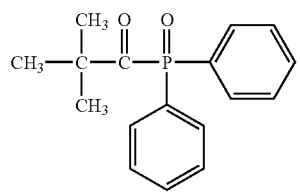
(P-7) 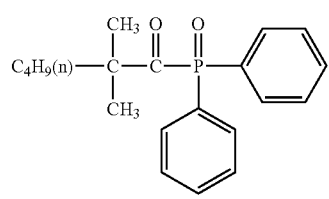
(P-8) 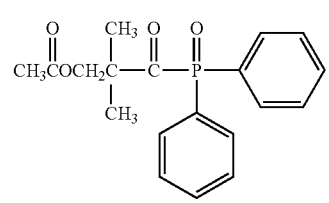
(P-9) 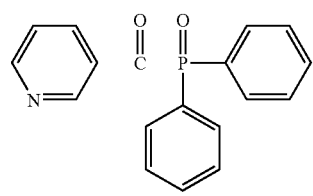
(P-10) 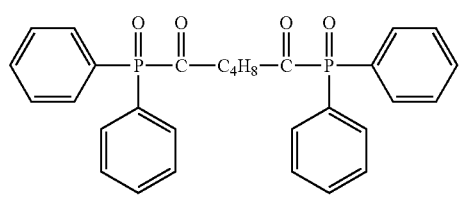
(P-11) 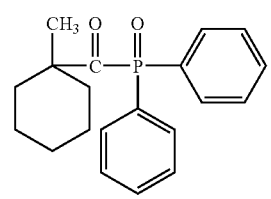
(P-12) 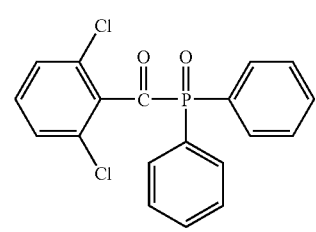
-continued
(P-13) 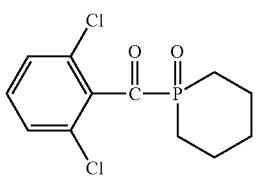
(P-14) 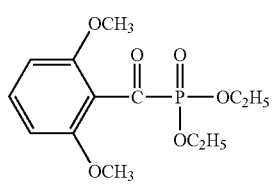
(P-15) 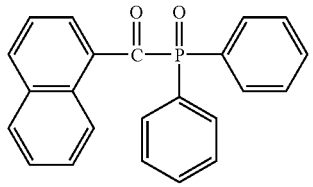
(P-16) 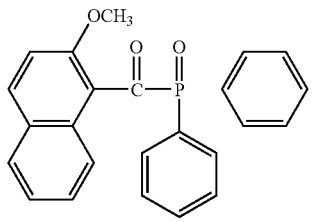
(P-17) 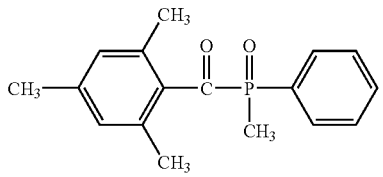
(P-18) 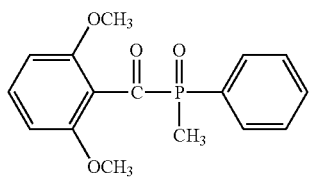
(P-19) 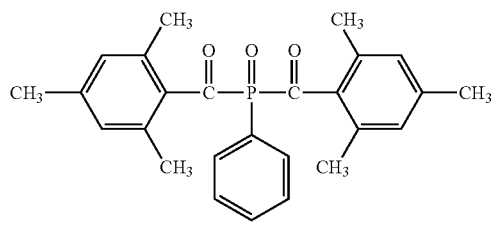
(P-20) 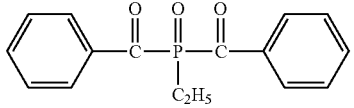

-continued

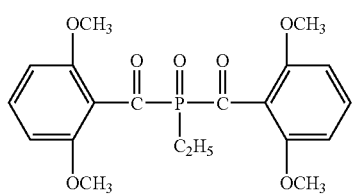
(P-21)

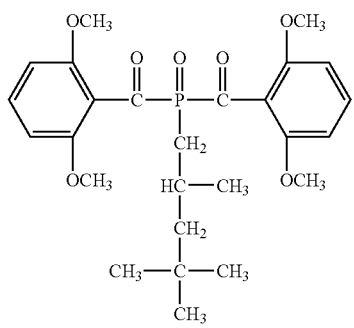
(P-22)

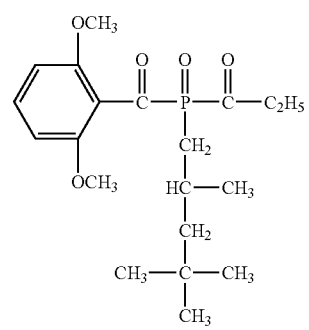
(P-23)

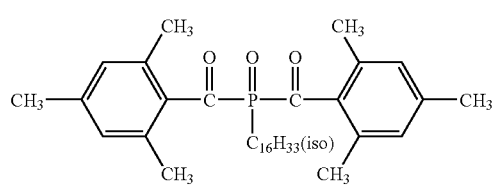
(P-24)

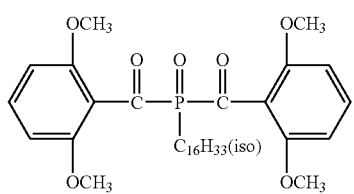
(P-25)

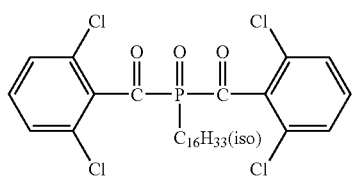
(P-26)

As the acylphosphine oxide compound, a monoacylphosphine oxide compound, a bisacylphosphine oxide compound, etc. may be used, and as the monoacylphosphine oxide compound a known monoacylphosphine oxide compound may be used. Examples thereof include monoacylphosphine oxide compounds described in JP-B-60-8047 and JP-B-63-40799.

Specific examples thereof include 2,4,6-trimethylbenzoyl-diphenylphosphine oxide, methyl isobutyrylmethylphosphinate, methyl isobutyrylphenylphosphinate, methyl pivaloylphenylphosphinate, methyl 2-ethylhexanoylphenylphosphinate, isopropyl pivaloylphenylphosphinate, methyl p-toluoylphenylphosphinate, methyl o-toluoylphenylphosphinate, methyl 2,4-dimethylbenzoyl phenyl phosphinate, isopropyl p-tert-butyl benzoylphenylphosphinate, methyl acryloylphenylphosphinate, isobutyryldiphenylphosphine oxide, 2-ethylhexanoyldiphenylphosphine oxide, o-toluoyldiphenylphosphine oxide, p-tert-butylbenzoyldiphenylphosphine oxide, 3-pyridylcarbonyldiphenylphosphine oxide, acryloyldiphenylphosphine oxide, benzoyldiphenylphosphine oxide, vinyl pivaloylphenylphosphinate, adipoylbis(diphenylphosphine oxide), pivaloyldiphenylphosphine oxide, p-toluoyldiphenylphosphine oxide, 4-(tert-butyl)benzoyldiphenylphosphine oxide, 2-methylbenzoyldiphenylphosphine oxide, 2-methyl-2-ethylhexanoyldiphenylphosphine oxide, 1-methylcyclohexanoyldiphenylphosphine oxide, methyl pivaloylphenylphosphinate, and isopropyl pivaloylphenylphosphinate.

As the bisacylphosphine oxide compound a known bisacylphosphine oxide compound may be used. Examples thereof include bisacylphosphine oxide compounds described in JP-A-3-101686, JP-A-5-345790, and JP-A-6-298818. Specific examples thereof include bis(2,6-dichlorobenzoyl)phenylphosphine oxide, bis(2,6-dichlorobenzoyl)-2,5-dimethylphenylphosphine oxide, bis(2,6-dichlorobenzoyl)-4-ethoxyphenylphosphine oxide, bis(2,6-dichlorobenzoyl)-4-propylphenylphosphine oxide, bis(2,6-dichlorobenzoyl)-2-naphthylphosphine oxide, bis(2,6-dichlorobenzoyl)-1-naphthylphosphine oxide, bis(2,6-dichlorobenzoyl)-4-chlorophenylphosphine oxide, bis(2,6-dichlorobenzoyl)-2,4-dimethoxyphenylphosphine oxide, bis(2,6-dichlorobenzoyl)decylphosphine oxide, bis(2,6-dichlorobenzoyl)-4-octylphenylphosphine oxide, bis(2,4,6-trimethylbenzoyl)phenylphosphine oxide, bis(2,4,6-trimethylbenzoyl)-2,5-dimethylphenylphosphine oxide, bis(2,6-dichloro-3,4,5-trimethoxybenzoyl)-2,5-dimethylphenylphosphine oxide, bis(2,6-dichloro-3,4,5-trimethoxybenzoyl)-4-ethoxyphenylphosphine oxide, bis(2-methyl-1-naphthoyl)-2,5-dimethylphenylphosphine oxide, bis(2-methyl-1-naphthoyl)-4-ethoxyphenylphosphine oxide, bis(2-methyl-1-naphthoyl)-2-naphthylphosphine oxide, bis(2-methyl-1-naphthoyl)-4-propylphenylphosphine oxide, bis(2-methyl-1-naphthoyl)-2,5-dimethylphenylphosphine oxide, bis(2-methoxy-1-naphthoyl)-4-ethoxyphenylphosphine oxide, bis(2-chloro-1-naphthoyl)-2,5-dimethylphenylphosphine oxide, and bis(2,6-dimethoxybenzoyl)-2,4,4-trimethylpentylphenylphosphine oxide.

Among them, as the acylphosphine oxide compound in the present invention, bis(2,4,6-trimethylbenzoyl)phenylphosphine oxide (IRGACURE 819: manufactured by Ciba Specialty Chemicals), bis(2,6-dimethoxybenzoyl)-2,4,4-trimethylpentylphenylphosphine oxide, 2,4,6-trimethylbenzoyldiphenylphosphine oxide (DAROCUR TPO: manufactured by Ciba Specialty Chemicals, LUCIRIN TPO: manufactured by BASF), etc. are preferable.

α-Aminoacetophenone Compound

One type of α-aminoacetophenone compound may be used on its own or two or more types thereof may be used.

As the α-aminoacetophenone compound, a compound represented by Formula (1) below may preferably be used.

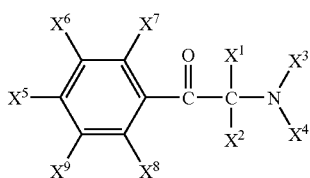
(1)

In the formula, $X^1$ denotes a group represented by (a), (b), or (c) below.

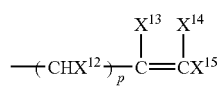
(a)

In the formula, p is 0 or 1.

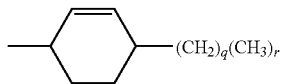
(b)

In the formula, q is an integer of 0 to 3 and r is 0 or 1.

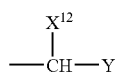
(c)

In the formula, Y denotes a hydrogen atom, a halogen atom, an OH group, an alkyl group having at least 1 but no greater than 12 carbons (unless otherwise specified, the alkyl group means a straight chain or branched alkyl group, the same applies below), an alkoxy group having at least 1 but no greater than 12 carbons, an aromatic group, or a heterocyclic group.

Preferred examples of the aromatic group include a phenyl group and a naphthyl group.

Preferred examples of the heterocyclic group include a furyl group, a thienyl group, and a pyridyl group.

The alkyl group, alkoxy group, aromatic group, and heterocyclic group denoted by Y may have a substituent.

Examples of the substituent that the alkyl group denoted by Y may have include an OH group, a halogen atom, —N$(X^{10})_2$ ($X^{10}$ denotes a hydrogen atom, an alkyl group having at least 1 but no greater than 8 carbons, an alkenyl group having at least 3 but no greater than 5 carbons, a phenylalkyl group having at least 7 but no greater than 9 carbons, a hydroxyalkyl group having at least 1 but no greater than 4 carbons, or a phenyl group, and the two $X^{10}$s may be identical to or different from each other), an alkoxy group having at least 1 but no greater than 12 carbons, —COOR (R denotes an alkyl group having at least 1 but no greater than 18 carbons), —CO(OCH$_2$OCH$_2$)$_n$OCH$_3$ (n denotes an integer of at least 1 but no greater than 20), and —OCOR (R denotes an alkyl group having at least 1 but no greater than 4 carbons).

Examples of the substituent that the alkoxy group denoted by Y may have include —COOR(R denotes an alkyl group having at least 1 but no greater than 18 carbons) and —CO(OCH$_2$CH$_2$)$_n$OCH$_3$ (n denotes an integer of at least 1 but no greater than 20).

Examples of the substituent that the aromatic group or heterocyclic group denoted by Y may have include —(OCH$_2$CH$_2$)$_n$OH (n denotes an integer of at least 1 but no greater than 20), —(OCH$_2$CH$_2$)$_n$OCH$_3$ (n denotes an integer of at least 1 but no greater than 20), an alkylthio group having at least 1 but no greater than 8 carbons, a phenoxy group, —COOR (R denotes an alkyl group having at least 1 but no greater than 18 carbons), —CO(OCH$_2$CH$_2$)$_n$OCH$_3$ (n denotes an integer of at least 1 but no greater than 20), a phenyl group, and a benzyl group.

Two or more such substituents may be present if this is possible, and the substituent may further be substituted if this is possible.

Furthermore, in the formula, $X^{12}$ denotes a hydrogen atom, an alkyl group having at least 1 but no greater than 8 carbons, or a phenyl group. $X^{13}$, $X^{14}$, and $X^{15}$ independently denote a hydrogen atom or an alkyl group having at least 1 but no greater than 4 carbons. $X^{13}$ and $X^{14}$ may be bridged to form an alkylene group having at least 3 but no greater than 7 carbons.

In the formula, $X^2$ denotes a group represented by (a), (b), or (c), a cycloalkyl group having 5 or 6 carbons, an alkyl group having at least 1 but no greater than 12 carbons, or a phenyl group.

The alkyl group and phenyl group denoted by $X^2$ may have a substituent.

Examples of the substituent that the alkyl group denoted by $X^2$ may have include an alkoxy group having at least 1 but no greater than 4 carbons, a phenoxy group, a halogen atom, and a phenyl group.

Examples of the substituent that the phenyl group denoted by $X^2$ may have include a halogen atom, an alkyl group having at least 1 but no greater than 12 carbons, and an alkoxy group having at least 1 but no greater than 4 carbons.

Two or more such substituents may be present if this is possible, and the substituent may further be substituted if this is possible.

Furthermore, in the formula, $X^1$ and $X^2$ may be bridged to form a group represented by the formulae below. m denotes an integer of 1 or 2.

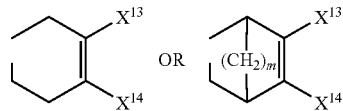

In the formula, $X^3$ denotes a hydrogen atom, an alkyl group having at least 1 but no greater than 12 carbons, an alkenyl group having at least 3 but no greater than 5 carbons, a cycloalkyl group having at least 5 but no greater than 12 carbons, or a phenylalkyl group having at least 7 but no greater than 9 carbons.

The alkyl group, alkenyl group, cycloalkyl group, and phenylalkyl group denoted by $X^3$ may have a substituent, and examples of the substituent include an OH group, an alkoxy group having at least 1 but no greater than 4 carbons, —CN, and —COOR(R denotes an alkyl group having at least 1 but no greater than 4 carbons).

In the formula, $X^4$ denotes an alkyl group having at least 1 but no greater than 12 carbons, an alkenyl group having at least 3 but no greater than 5 carbons, a cycloalkyl group having at least 5 but no greater than 12 carbons, a phenylalkyl group having at least 7 but no greater than 9 carbons, or a phenyl group.

The alkyl group, alkenyl group, cycloalkyl group, phenylalkyl group, and phenyl group denoted by $X^4$ may have a substituent.

Examples of the substituent that the alkyl group, alkenyl group, cycloalkyl group, and phenylalkyl group denoted by $X^4$ may have include an OH group, an alkoxy group having at least 1 but no greater than 4 carbons, —CN, and —COOR (R denotes an alkyl group having at least 1 but no greater than 4 carbons). When the alkyl group denoted by $X^4$ has a substituent, the number of carbons in the alkyl group that is substituted is preferably at least 2 but no greater than 4.

Examples of the substituent that the phenyl group denoted by $X^4$ may have include a halogen atom, an alkyl group having at least 1 but no greater than 12 carbons, an alkoxy group having at least 1 but no greater than 4 carbons, and —COOR (R denotes an alkyl group having at least 1 but no greater than 4 carbons).

Here, $X^2$ and $X^4$ may be bridged to form an alkylene group having at least 1 but no greater than 7 carbons, a phenylalkylene group having at least 7 but no greater than 10 carbons, an o-xylylene group, a 2-butenylene group, or an oxa- or aza-alkylene group having 2 or 3 carbons.

Furthermore, $X^3$ and $X^4$ may be bridged to form an alkylene group having at least 3 but no greater than 7 carbons.

The alkylene group formed by bridging $X^3$ and $X^4$ may have as a substituent an OH group, an alkoxy group having at least 1 but no greater than 4 carbons, or —COOR (R denotes alkyl having at least 1 but no greater than 4 carbons), or may contain in a bond —O—, —S—, —CO—, or —N($X^{16}$)— ($X^{16}$ denotes a hydrogen atom, an alkyl group having at least 1 but no greater than 12 carbons, or an alkyl group having at least 1 but no greater than 12 carbons and containing in a bonding chain one or more —O—, an alkenyl group having at least 3 but no greater than 5 carbons, a phenylalkyl group having at least 7 but no greater than 9 carbons, a hydroxyalkyl group having at least 1 but no greater than 4 carbons, —CH$_2$CH$_2$CN, —CH$_2$CH$_2$COOR (R denotes an alkyl group having at least 1 but no greater than 4 carbons), an alkanoyl group having at least 2 but no greater than 8 carbons, or an alkyl group having at least 2 but no greater than 12 carbons and containing in a bonding chain benzoyl group).

In the formula, $X^5$, $X^6$, $X^7$, $X^8$, and $X^9$ independently denote a hydrogen atom, a halogen atom, an alkyl group having at least 1 but no greater than 12 carbons, a cycloalkyl group having 5 or 6 carbons, a phenyl group, a benzyl group, a benzoyl group, an —O$X^{17}$ group, an —S$X^{18}$ group, an —SO—$X^{18}$ group, an —SO$_2$—$X^{18}$ group, an —N($X^{19}$)($X^{20}$) group, an —NH—SO$_2$—$X^{21}$ group, or a group represented by the formula below.

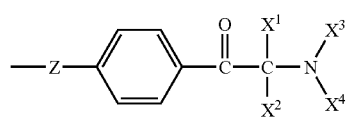

In the formula, Z denotes —O—, —S—, —N($X^{10}$)—$X^{11}$—N($X^{10}$), or a group represented by the formula below. $X^1$, $X^2$, $X^3$, and $X^4$ have the same meanings as defined for Formula (1).

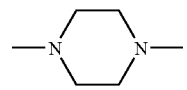

In the formula, $X^{10}$ is the same as described above, and $X^{11}$ denotes a straight chain or branched alkylene group having at least 2 but no greater than 16 carbons, or a straight chain or branched alkylene group having at least 2 but no greater than 16 carbons in which at least one —O—, —S—, or —N($X^{10}$)— is present in the chain ($X^{10}$ is the same as above).

$X^{17}$ denotes a hydrogen atom, an alkyl group having at least 1 but no greater than 12 carbons, —(CH$_2$CH$_2$O)$_n$H (n is an integer of at least 2 but no greater than 20), an alkanoyl group having at least 2 but no greater than 8 carbons, an alkenyl group having at least 3 but no greater than 12 carbons, a cyclohexyl group, a hydroxycyclohexyl group, a phenyl group, a phenylalkyl group having at least 7 but no greater than 9 carbons, or —Si($R^4$)$_r$($R^5$)$_{3-r}$ ($R^4$ is an alkyl group having at least 1 but no greater than 8 carbons, $R^5$ is a phenyl group, and r is 1, 2, or 3).

The alkyl group and phenyl group denoted by $X^{17}$ may have a substituent.

Examples of the substituent that the alkyl group denoted by $X^{17}$ may have include —CN, —OH, an alkoxy group having at least 1 but no greater than 4 carbons, an alkenyloxy group having at least 3 but no greater than 6 carbons, —OCH$_2$CH$_2$CN, —CH$_2$CH$_2$COOR(R denotes an alkyl group having at least 1 but no greater than 4 carbons), —COOH, or —COOR(R denotes an alkyl group having at least 1 but no greater than 4 carbons). Furthermore, when the alkyl group denoted by $X^{17}$ has a substituent, the number of carbons of the alkyl group that is substituted is preferably at least 1 but no greater than 6.

Examples of the substituent that the phenyl group denoted by $X^{17}$ may have include a halogen atom, an alkyl group having at least 1 but no greater than 12 carbons, or an alkoxy group having at least 1 but no greater than 4 carbons.

$X^{18}$ denotes a hydrogen atom, an alkyl group having at least 1 but no greater than 12 carbons, an alkenyl group having at least 3 but no greater than 12 carbons, a cyclohexyl group, a phenyl group, or a phenylalkyl group having at least 7 but no greater than 9 carbons.

The alkyl group and phenyl group denoted by $X^{18}$ may have a substituent.

Examples of the substituent that the alkyl group denoted by $X^{18}$ may have include —SH, —OH, —CN, —COOR(R denotes an alkyl group having at least 1 but no greater than 4 carbons), an alkoxy group having at least 1 but no greater than 4 carbons, —OCH$_2$CH$_2$CN, or —OCH$_2$CH$_2$COOR (R denotes alkyl having at least 1 but no greater than 4 carbons).

Examples of the substituent that the phenyl group denoted by $X^{18}$ may have include a halogen atom, an alkyl group having at least 1 but no greater than 12 carbons, or an alkoxy group having at least 1 but no greater than 4 carbons.

$X^{19}$ and $X^{20}$ independently denote a hydrogen atom; an alkyl group having at least 1 but no greater than 12 carbons; a hydroxyalkyl group having at least 2 but no greater than 4 carbons; an alkoxyalkyl group having at least 2 but no greater than 10 carbons; an alkenyl group having at least 3 but no greater than 5 carbons; a cycloalkyl group having at least 5 but no greater than 12 carbons; a phenylalkyl group having at least 7 but no greater than 9 carbons; a phenyl group; a phenyl group substituted with a halogen atom, an alkyl group having at least 1 but no greater than 12 carbons, or an alkoxy group having at least 1 but no greater than 4 carbons; an alkanoyl group having 2 or 3 carbons; or a benzoyl group. Furthermore, $X^{19}$ and $X^{20}$ may be bridged to form an alkylene group having at least 2 but no greater than 8 carbons, an alkylene group having at least 2 but no greater than 8 carbons that is substituted with an OH group, an alkoxy group having at least 1 but no greater than 4 carbons, or a —COOR (R is alkyl group having at least 1 but no greater than 4 carbons); or an alkylene group having at least 2 but no greater than 8 carbons that contains in the bonding chain —O—, —S—, or —N($X^{16}$)— ($X^{16}$ is the same as above).

$X^{21}$ denotes an alkyl group having at least 1 but no greater than 18 carbons; a phenyl group; a naphthyl group; or a phenyl group or naphthyl group substituted with a halogen atom, an alkyl group having at least 1 but no greater than 12 carbons, or an alkoxy group having at least 1 but no greater than 8 carbons.

Formula (1) is preferably represented by Formula (d),

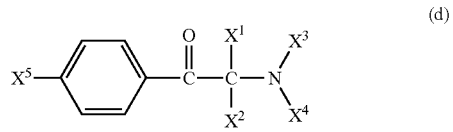

(d)

in Formula (d), $X^1$ and $X^2$ independently denote a methyl group, an ethyl group, or a benzyl group, —$NX^3X^4$ denotes a dimethylamino group, a diethylamino group, or a morpholino group, and $X^5$ denotes a hydrogen atom, an alkyl group having at least 1 but no greater than 8 carbons, an alkoxy group having at least 1 but no greater than 8 carbons, an alkylthio group having at least 1 but no greater than 8 carbons, a dimethylamino group, or a morpholino group. Among them, it is more preferable that —$NX^3X^4$ is a dimethylamino group or a morpholino group.

Furthermore, as the α-aminoacetophenone compound, an acid adduct salt of the compound represented by Formula (1) above may be used.

Moreover, examples of commercial α-aminoacetophenone compounds include polymerization initiators available under the product names IRGACURE 907, IRGACURE 369, and IRGACURE 379 from Ciba Specialty Chemicals, and they may be used suitably.

Specific examples of the α-aminoacetophenone compound include the compounds below.

That is, there are 2-dimethylamino-2-methyl-1-phenylpropan-1-one, 2-diethylamino-2-methyl-1-phenylpropan-1-one, 2-methyl-2-morpholino-1-phenylpropan-1-one, 2-dimethylamino-2-methyl-1-(4-methylphenyl)propan-1-one, 2-dimethylamino-1-(4-ethylphenyl)-2-methylpropan-1-one, 2-dimethylamino-1-(4-isopropylphenyl)-2-methylpropan-1-one, 1-(4-butylphenyl)-2-dimethylamino-2-methylpropan-1-one, 2-dimethylamino-1-(4-methoxyphenyl)-2-methylpropan-1-one, 2-dimethylamino-2-methyl-1-(4-methylthiophenyl)propan-1-one, 2-methyl-1-(4-methylthiophenyl)-2-morpholinopropan-1-one (IRGACURE 907), 2-benzyl-2-dimethylamino-1-(4-morpholinophenyl)butan-1-one (IRGACURE 369), 2-benzyl-2-dimethylamino-1-(4-dimethylaminophenyl)butan-1-one, and 2-dimethylamino-2-[(4-methylphenyl)methyl]-1-[4-(4-morpholinyl)phenyl]-1-butanone (IRGACURE 379).

Other Polymerization Initiator

The photocurable composition of the present invention may comprise an other photopolymerization initiator. The polymerization initiator preferably comprises a radical polymerization initiator.

A photopolymerization initiator known to a person skilled in the art may be used without limitation, and many specific examples thereof are described in Bruce M. Monroe et al., Chemical Reviews, 93, 435 (1993), R. S. Davidson, Journal of Photochemistry and Biology A: Chemistry, 73, 81 (1993), J. P. Faussier "Photoinitiated Polymerization-Theory and Applications": Rapra Review, Vol. 9, Report, Rapra Technology (1998), and M. Tsunooka et al., Prog. Polym. Sci., 21, 1 (1996). Furthermore, many compounds utilized in chemically amplified photoresists and cationic photopolymerization, etc. are described in 'Imejingu yo Yukizairyou' (Organic Materials for Imaging) Ed. Japanese Research Association for Organic Electronics Materials, Bunshin Publishing Co. (1993), pp. 187-192. Moreover, a group of compounds are known, as described in F. D. Saeva, Topics in Current Chemistry, 156, 59 (1990), G. G. Maslak, Topics in Current Chemistry, 168, 1 (1993), H. B. Shuster et al., JAGS, 112, 6329 (1990), I. D. F. Eaton et al., JAGS, 102, 3298 (1980), etc., that cause oxidative or reductive bond cleavage via interaction with an electronic excited state of a sensitizing dye.

(D) Colorant

The photocurable composition of the present invention preferably comprises a colorant. It preferably comprises a colorant especially when the photocurable composition is used as an ink composition.

Furthermore, the photocurable composition of the present invention more preferably comprises a dispersion of an organic pigment and a polymeric dispersant described later.

The colorant that can be used in the present invention is not particularly limited, and various known pigments and dyes may be selected appropriately according to an intended application. Among them, as a colorant, a pigment is preferable particularly from the viewpoint of excellent light fastness.

Pigments that are preferably used in the present invention are now described.

With regard to the pigments, there is no particular limitation, and any generally commercially available organic pigment and inorganic pigment, resin particles dyed with a dye, etc. may be used. Furthermore, a commercial pigment dispersion or a surface-treated pigment such as, for example, a dispersion of a pigment in an insoluble resin, etc. as a dispersion medium or a pigment having a resin grafted on the surface, etc. may be used as long as the effects of the present invention are not impaired.

Examples of these pigments include pigments described in, for example, 'Ganryo no Jiten (Pigment Dictionary)', Ed. by Seishiro Ito (2000), W. Herbst, K. Hunger, Industrial Organic Pigments, JP-A-2002-12607, JP-A-2002-188025, JP-A-2003-26978, and JP-A-2003-342503.

Specific examples of the organic pigment and the inorganic pigment that can be used in the present invention include, as those exhibiting a yellow color, monoazo pigments such as CI Pigment Yellow 1 (Fast Yellow G, etc.) and CI Pigment Yellow 74, disazo pigments such as CI Pigment Yellow 12 (Disazo Yellow AAA, etc.) and CI Pigment Yellow 17, benzidine-free azo pigments such as CI Pigment Yellow 180 and C.I. Pigment Yellow 200 (Novoperm Yellow 2HG), azo lake pigments such as CI Pigment Yellow 100 (Tartrazine Yellow Lake, etc.), condensed azo pigments such as CI Pigment Yellow 95 (Azo Condensation Yellow GR, etc.), acidic dye lake pigments such as CI Pigment Yellow 115 (Quinoline Yellow Lake, etc.), basic dye lake pigments such as CI Pigment Yellow 18 (Thioflavine Lake, etc.), anthraquinone pigments such as Flavanthrone Yellow (Y-24), isoindolinone pigments such as Isoindolinone Yellow 3RLT (Y-110), quinophthalone pigments such as Quinophthalone Yellow (Y-138), isoindoline pigments such as Isoindoline Yellow (Y-139), nitroso pigments such as CI Pigment Yellow 153 (Nickel Nitroso Yellow, etc.), and metal complex azomethine pigments such as CI Pigment Yellow 117 (Copper Azomethine Yellow, etc.).

Examples of pigments exhibiting a red or magenta color include monoazo pigments such as CI Pigment Red 3 (Toluidine Red, etc.), disazo pigments such as CI Pigment Red 38 (Pyrazolone Red B, etc.), azo lake pigments such as CI Pigment Red 53:1 (Lake Red C, etc.) and CI Pigment Red 57:1 (Brilliant Carmine 6B), condensed azo pigments such as CI Pigment Red 144 (Azo Condensation Red BR, etc.), acidic dye lake pigments such as CI Pigment Red 174 (Phloxine B Lake, etc.), basic dye lake pigments such as CI Pigment Red 81 (Rhodamine 6G' Lake, etc.), anthraquinone pigments such as CI Pigment Red 177 (Dianthraquinonyl Red, etc.), thioindigo pigments such as CI Pigment Red 88 (Thioindigo Bordeaux, etc.), perinone pigments such as CI Pigment Red 194 (Perinone Red, etc.), perylene pigments such as CI Pigment Red 149 (Perylene Scarlet, etc.), quinacridone pigments such as CI Pigment violet 19 (unsubstituted quinacridone, CINQUASIA Magenta RT-355T; manufactured by Ciba Specialty Chemicals) and CI Pigment Red 122 (Quinacridone Magenta, etc.), isoindolinone pigments such as CI Pigment Red 180 (Isoindolinone Red 2BLT, etc.), and alizarin lake pigments such as CI Pigment Red 83 (Madder Lake, etc.).

Examples of pigments exhibiting a blue or cyan color include disazo pigments such as CI Pigment Blue 25 (Dianisidine Blue, etc.), phthalocyanine pigments such as CI Pigment Blue 15 and CI Pigment Blue 15:3 (IRGALITE BLUE GLO; manufactured by Ciba Specialty Chemicals) (Phthalocyanine Blue, etc.), acidic dye lake pigments such as CI Pigment Blue 24 (Peacock Blue Lake, etc.), basic dye lake pigments such as CI Pigment Blue 1 (Victoria Pure Blue BO Lake, etc.), anthraquinone pigments such as CI Pigment Blue 60 (Indanthrone Blue, etc.), and alkali blue pigments such as CI Pigment Blue 18 (Alkali Blue V-5:1).

Examples of pigments exhibiting a green color include phthalocyanine pigments such as CI Pigment Green 7 (Phthalocyanine Green) and CI Pigment Green 36 (Phthalocyanine Green), and azo metal complex pigments such as CI Pigment Green 8 (Nitroso Green).

Examples of pigments exhibiting an orange color include isoindoline pigments such as CI Pigment Orange 66 (Isoindoline Orange) and anthraquinone pigments such as CI Pigment Orange 51 (Dichloropyranthrone Orange).

Examples of pigments exhibiting a black color include carbon black, titanium black, and aniline black. Examples of the carbon black include SPECIAL BLACK 250 (manufactured by Degussa).

Specific examples of white pigments that can be used include basic lead carbonate ($2PbCO_3Pb(OH)_2$, also known as silver white), zinc oxide (ZnO, also known as zinc white), titanium oxide ($TiO_2$, also known as titanium white), and strontium titanate ($SrTiO_3$, also known as titan strontium white).

Titanium oxide has, compared with other white pigments, a low specific gravity, a high refractive index, and is chemically and physically stable, and therefore has high hiding power and coloring power as a pigment and, furthermore, has excellent durability toward acids, alkalis, and other environments. It is therefore preferable to use titanium oxide as the white pigment. It is of course possible to use another white pigment (which can be any white pigment, in addition to the white pigments cited above) as necessary.

For dispersion of the colorant, for example, a dispersing machine such as a bead mill, a ball mill, a sand mill, an attritor, a roll mill, a jet mill, a homogenizer, a paint shaker, a kneader, an agitator, a Henschel mixer, a colloidal mill, an ultrasonic homogenizer, a pearl mill, or a wet type jet mill may be used.

For dispersion of the colorant, a dispersant such as a surfactant may be added.

Furthermore, when the colorant is added, as a dispersion adjuvant, it is also possible to use a synergist as necessary according to the various types of colorant. The dispersant and dispersion adjuvant are preferably used at least 1 part by weight but no greater than 50 parts by weight relative to 100 parts by weight of the colorant.

In the photocurable composition, a solvent may be added as a dispersion medium for various components such as the colorant, or the polymerizable compound, which is a low molecular weight component, may be used as a dispersion medium without using a solvent, and since the photocurable composition of the present invention and especially the ink composition of the present invention are preferably a light curing type liquid and the photocurable composition is cured after being applied on top of a recording medium, it is preferable for it to be solvent-free. This is because, if solvent remains in the cured object formed from the cured photocurable composition, the solvent resistance is degraded and the VOC (Volatile Organic Compound) problem of residual solvent occurs. From this viewpoint, it is preferable to use the polymerizable compound as a dispersion medium. Among them, it is more preferable to select a polymerizable compound having the lowest viscosity in terms of improvement of dispersion suitability and handling properties of the photocurable composition.

Since excellent coloration is achieved by finer particles, it is preferable for the weight-average particle size of the colorant used here to be at least 0.01 μm but no greater than 0.4 μm, and more preferably at least 0.02 μm but no greater than 0.2 μm. In order to make the maximum particle size be no greater than 3 μm, and preferably no greater than 1 μm, it is preferable for the colorant, the dispersant, and the dispersion medium to be selected, and dispersion conditions and filtration conditions to be set. By such control of particle size, clogging of a head nozzle can be suppressed, and the storage stability, the transparency and curing sensitivity of the photocurable composition can be maintained. In the present invention, by using a dispersant having excellent dispersibility and stability, even when a microparticulate colorant is used, a uniform and stable dispersion is obtained.

The particle size of the colorant in the photocurable compound and the ink composition may be measured by a known measurement method. Specifically, it may be measured by a centrifugal sedimentation light transmission method, an X-ray transmission method, a laser diffraction/scattering method, or a dynamic light scattering method. In the present invention, a value obtained by measurement using the laser diffraction/scattering method is employed.

(E) Surfactant

The photocurable composition of the present invention preferably comprises a surfactant. When using the photocurable composition of the present invention as the ink composition, it is particularly preferable that it comprises the surfactant.

Examples of the surfactant that can be used in the present invention include the surfactants below.

For example, those described in JP-A-62-173463 and JP-A-62-183457 can be cited. Specific examples thereof include anionic surfactants such as dialkylsulfosuccinic acid salts, alkylnaphthalenesulfonic acid salts, and fatty acid salts, nonionic surfactants such as polyoxyethylene alkyl ethers, polyoxyethylene alkyl allyl ethers, acetylene glycols, and polyoxyethylene/polyoxypropylene block copolymers, and cationic surfactants such as alkylamine salts and quaternary ammonium salts. As the above known surfactants, an organofluoro compound may be used. The organofluoro compound is preferably hydrophobic. Examples of the organofluoro compound include fluorine-based surfactants, oil-like fluorine-based compounds (e.g. fluorine oils), and solid fluorine compound resins (e.g. tetrafluoroethylene resin), and those described in JP-B-57-9053 (8th to 17th columns) and JP-A-62-135826.

The surfactant used in the present invention is not particularly limited to the surfactants described above, and it may be an additive that, for the concentration added, is capable of reducing the surface tension efficiently.

(F) Other Additives

The photocurable composition of the present invention may comprise, in addition to the above-mentioned components, various types of additives according to the intended purpose.

The photocurable composition of the present invention may contain a sensitizer in order to promote decomposition of the above-mentioned photopolymerization initiator by absorbing specific actinic radiation.

The sensitizer absorbs specific actinic radiation and attains an electronically excited state. The sensitizer in the electronically excited state causes actions such as electron transfer, energy transfer, or heat generation upon contact with the photopolymerization initiator. This causes the polymerization initiator to undergo a chemical change and decompose, thus forming the polymerization active species such as a radical, an acid or a cation.

Preferred examples of the sensitizing dye include those that belong to compounds below and have an adsorption wavelength in the region of 350 to 450 nm.

Polynuclear aromatic compounds (e.g. anthracene, 9,10-dialkoxyanthracene, pyrene, perylene, triphenylene), xanthenes (e.g. fluorescein, eosin, erythrosine, rhodamine B, rose bengal), thioxanthones (e.g. isopropyl thioxanthones), cyanines (e.g. thiacarbocyanine, oxacarbocyanine), merocyanines (e.g. merocyanine, carbomerocyanine), thiazines (e.g. thionine, methylene blue, toluidine blue), acridines (e.g. acridine orange, chloroflavin, acriflavine), anthraquinones (e.g. anthraquinone), squaryliums (e.g. squarylium), and coumarins (e.g. 7-diethylamino-4-methylcoumarin).

The content of the sensitizer in the photocurable composition of the present invention is appropriately selected according to the intended purpose, but it is preferably 0.05 to 4 wt % relative to the weight of the entire photocurable composition.

The photocurable composition of the present invention preferably comprises a co-sensitizer (the co-sensitizer is also called a 'supersensitizer'). In the present invention, the co-sensitizer has the function of further improving the sensitivity of the sensitizer to actinic radiation or the function of suppressing inhibition by oxygen of polymerization of the polymerizable compound, etc.

Examples of such a co-sensitizer include amines such as compounds described in M. R. Sander et al., 'Journal of Polymer Society', Vol. 10, p. 3173 (1972), JP-B-44-20189, JP-A-51-82102, JP-A-52-134692, JP-A-59-138205, JP-A-60-84305, JP-A-62-18537, JP-A-64-33104, and Research Disclosure No. 33825.

Specific examples thereof include triethanolamine, ethyl p-dimethylaminobenzoate, p-formyldimethylaniline, and p-methylthiodimethylaniline.

Other examples of the co-sensitizer include thiols and sulfides such as thiol compounds described in JP-A-53-702, JP-B-55-500806, and JP-A-5-142772, and disulfide compounds of JP-A-56-75643.

Specific examples thereof include 2-mercaptobenzothiazole, 2-mercaptobenzoxazole, 2-mercaptobenzimidazole, 2-mercapto-4(3H)-quinazoline, and β-mercaptonaphthalene.

Yet other examples of the co-sensitizer include amino acid compounds (e.g. N-phenylglycine, etc.), organometallic compounds described in JP-B-48-42965 (e.g. tributyltin acetate, etc.), hydrogen-donating compounds described in JP-B-55-34414, sulfur compounds described in JP-A-6-308727 (e.g. trithiane, etc.), phosphorus compounds described in JP-A-6-250387 (diethylphosphite, etc.), and Si—H, Ge—H compounds described in JP-A-8-54735.

The content of the co-sensitizer in the photocurable composition of the present invention is appropriately selected according to the intended purpose, but it is preferably 0.05 to 4 wt % relative to the weight of the entire photocurable composition.

Furthermore, the photocurable composition of the present invention may comprise a basic compound such as an amine compound.

The basic compound is preferably a tertiary amine compound (having a tertiary amine structure). Furthermore, from the viewpoint of long-term storage stability of the photocurable composition, prevention of discoloration, and prevention of exudation of a non-curing component from a cured coating, the basic compound is preferably a tertiary amine compound having a polymerizable group such as an ethylenically unsaturated bond, and is particularly preferably a tertiary amine compound having a polymerizable group and a cyclic amine structure.

Furthermore, for example, the photocurable composition of the present invention may comprises a UV absorber from the viewpoint of improving the weatherability. Furthermore, in order to improve the storage stability of the photocurable composition, an antioxidant may be added.

Moreover, it is possible to add various types of organic and metal complex antifading agents, a conductive salt such as potassium thiocyanate, lithium nitrate, ammonium thiocyanate, or dimethylamine hydrochloride for the purpose of controlling discharge physical properties, or a trace amount of an organic solvent in order to improve the adhesion to a substrate.

Furthermore, various types of high molecular weight compounds may be added in order to adjust coating physical properties.

Examples of the high molecular weight compounds include acrylic polymers, polyvinylbutyral resins, polyurethane resins, polyamide resins, polyester resins, epoxy resins, phenolic resins, polycarbonate resins, polyvinylbutyral resins, polyvinylformal resins, shellac, vinylic resins, acrylic resins, rubber-based resins, waxes, and other natural resins. They may be used in a combination of two or more types.

In addition to the above, the composition may contain as necessary, for example, a leveling additive, a matting agent, a wax for adjusting coating physical properties, or a tackifier (tackifying agent) that does not inhibit polymerization in order to improve the adhesion to a polyolefin, polyethylene terephthalate (PET) etc.

(2) Ink Composition

The photocurable composition of the present invention can suitably be used as an ink composition (hereinafter, the 'ink composition' is also called simply an 'ink').

Specifically, the ink composition comprises a compound represented by Formula (I) above.

In particular, it is preferably used as an inkjet recording ink composition or a UV-curing printing ink composition. Among them, the photocurable composition of the present invention is particularly suitable as an inkjet recording ink composition.

When the photocurable composition of the present invention is used as an ink composition, it is preferable for the ink composition to comprise a colorant.

When the photocurable composition of the present invention is used as an ink composition, the photocurable composition is preferably a liquid at room temperature, but from the viewpoint of suitability for firing droplets in inkjet, it is preferable that the viscosity at 25° C. is no greater than 100 mPa·s or the viscosity at 60° C. is no greater than 30 mPa·s, it is more preferable that the viscosity at 25° C. is no greater than 60 mPa·s or the viscosity at 60° C. is no greater than 20 mPa·s, and it is particularly preferable that the viscosity at 25° C. is no greater than 40 mPa·s or the viscosity at 60° C. is no greater than 15 mPa·s.

Similarly, when the photocurable composition of the present invention is used as an ink composition, from the viewpoint of suitability for firing droplets in inkjet, it is preferable that the surface tension at 25° C. of the photocurable composition is preferably at least 18 mN/m but no greater than 40 mN/m, more preferably at least 20 mN/m but no greater than 35 mN/m, and yet more preferably at least 22 mN/m but no greater than 32 mN/m.

The 'viscosity' referred to here is a viscosity determined using a model RE80 viscometer manufactured by Toki Sangyo Co., Ltd. The model RE80 viscometer is a conical rotor/flat plate system E-type viscometer, and measurement is carried out at a rotational speed of 10 rpm using a rotor code No. 1 rotor. For those having a viscosity of higher than 60 mPa·s, measurement was carried out by changing the rotational speed as necessary to 5 rpm, 2.5 rpm, 1 rpm, 0.5 rpm, etc.

The surface tension referred to above is a value obtained by measuring at a liquid temperature of 25° C. by the Wilhelmy method using a standard surface tensiometer (e.g. a CBVP-Z surface tensiometer manufactured by Kyowa Interface Science Co., Ltd.).

(3) Photocured Material and Process for Producing the Same, Photocuring Device, Inkjet Recording Method, Inkjet Recording Device, and Printed Material Photocured Material and Process for Producing the Same and Photocuring Device The photocured material of the present invention is a product obtained by curing the photocurable composition.

The process for producing the cured material comprises a step of irradiating the photocurable composition of the present invention with light, and preferably comprises a step of irradiating the photocurable composition of the present invention with light having a light emission peak wavelength in the range of at least 340 nm but no greater than 400 nm to thus cure the photocurable composition.

A photocuring device that can be used suitably in the above-mentioned process for producing a photocured material is a photocuring device having a light source and the photocurable composition of the present invention, and preferably comprises at least a light source having a peak wavelength of 340 nm to 400 nm.

Inkjet Recording Method, Inkjet Recording Device, and Printed Material

The photocurable composition of the present invention is used suitably as an ink composition, and is used particularly suitably as an inkjet recording ink composition.

The inkjet recording method of the present invention is a method in which the photocurable composition (ink composition) of the present invention is discharged onto a recording medium (support, recording material, etc.), and the photocurable composition (the ink composition) discharged onto the recording medium is irradiated with light to thus cure the photocurable composition (ink composition) and form an image.

More specifically, the inkjet recording method of the present invention preferably comprises ($a^1$) a step of discharging the photocurable composition of the present invention (ink composition) onto a recording medium, and ($b^1$) a step of curing the photocurable composition (ink composition) by irradiating the discharged photocurable composition with light.

Furthermore, the light preferably has a peak wavelength in the wavelength range of at least 340 nm but no greater than 400 nm.

Since the inkjet recording method of the present invention comprises steps ($a^1$) and ($b^1$) above, an image preferably is formed by the ink composition cured on the recording medium.

Moreover, the printed material of the present invention is a printed material in which printing is carried out by the inkjet recording method of the present invention.

The step ($a^1$) etc. of the inkjet recording method of the present invention may employ an inkjet recording device that will be described in detail below.

Inkjet Recording System

The inkjet recording system that can be used in the inkjet recording method of the present invention is not particularly limited, and a known inkjet recording system that can achieve a target resolution can be freely selected and used. That is, any known inkjet recording system, including a commercial system, may be used for discharging the photocurable composition (ink composition) onto a recording medium in step ($a^1$) of the inkjet recording method of the present invention.

Examples of the inkjet recording system that can be used in the present invention include a system that comprises an ink supply system, a temperature sensor, and a light source.

The ink supply system comprises, for example, a main tank containing the photocurable composition (the ink composition) of the present invention, a supply pipe, an ink supply tank immediately before an inkjet head, a filter, and a piezo type inkjet head. The piezo type inkjet head is driven so as to discharge multisize dots of preferably 1 to 100 pL, and more preferably 8 to 30 pL, at a resolution of preferably 320×320 to 4,000×4,000 dpi, more preferably 400×400 to 1,600×1,600 dpi, and particularly preferably 720×720 dpi. Here, dpi referred to in the present invention denotes the number of dots per 2.54 cm.

As described above, since for a radiation-curing ink composition, such as the photocuring composition (ink composition) of the present invention, the temperature of the discharged ink is desirably constant, the inkjet recording device is preferably equipped with means for stabilizing the temperature of the ink composition. The section for which the temperature is made constant includes the whole of a piping system and all of the members from an ink tank (middle tank where it is present) to a nozzle injection face. That is, a section from an ink supply tank to an inkjet head portion can be thermally insulated and heated.

A method for temperature control is not particularly limited, and it is preferable to provide, for example, a plurality of temperature sensors at each pipe section and control heating according to flow rate of the photocurable composition (ink composition) and environmental temperature. The temperature sensors may be provided at the ink supply tank and in the vicinity of an inkjet head nozzle. Furthermore, it is preferable that a head unit that is heated is thermally shielded or insulated so that the system main body is not affected by the outside temperature. In order to reduce the printer start-up time required for heating or suppress loss of thermal energy, it is preferable to thermally insulate the heating unit from other sections and decrease the overall thermal capacity thereof.

When the photocurable composition (ink composition) of the present invention is discharged using the above mentioned inkjet recording device, the photocurable composition (ink composition) is preferably discharged after being heated to preferably 25° C. to 80° C., and more preferably 25° C. to 50° C., so as to reduce the viscosity of the photocurable composition (ink composition) to preferably 3 to 15 mPa·s, and more preferably 3 to 13 mPa·s. In particular, it is preferable to use the photocurable composition (ink composition) having an ink viscosity at 25° C. of no more than 50 mPa·s since a good discharge stability can be obtained. By employing this method, high discharge stability can be realized.

The radiation curing type ink composition such as the photocurable composition (ink composition) of the present invention generally has a viscosity that is higher than that of a water-based ink composition used for a normal inkjet recording ink composition, and variation in viscosity due to a change in temperature at the time of discharge is large. Viscosity variation in the ink has a large effect on changes in liquid droplet size and changes in liquid droplet discharge speed and, consequently, causes the image quality to be degraded. It is therefore necessary to maintain the ink composition discharge temperature as constant as possible. Therefore, in the present invention, the temperature control range for the ink composition is desirably ±5° C. of a set temperature, preferably ±2° C. of the set temperature, and more preferably ±1° C. of the set temperature.

The step ($b^1$) of curing the photocurable composition (ink composition) by irradiating the discharged photocurable composition with light is described below.

The photocurable composition (ink composition) discharged onto the recording medium cures upon exposure to light. This is due to an initiating species such as a radical, an acid, or a base being generated by decomposition of the compound (I) and/or the photopolymerization initiator contained in the photocurable composition (ink composition) of the present invention by irradiation with light, the initiating species functioning so as to make a polymerization reaction of a radically polymerizable compound take place and to promote it. In this process, if a sensitizer is present together with the polymerization initiator in the photocurable composition (ink composition), the sensitizer in the system absorbs light, becomes excited, and promotes decomposition of the polymerization initiator by contact with the polymerization initiator, thus enabling a curing reaction with higher sensitivity to be achieved.

The light used in this process may include α rays, γ rays, an electron beam, X rays, UV rays, visible light, and IR rays. Although depending on the absorption characteristics of the sensitizer, the peak wavelength of the light is, for example, 200 to 600 nm, preferably 300 to 450 nm, and more preferably 320 to 420 nm and it is yet more preferable that the light is UV rays having the wavelength of 340 to 400 nm.

Furthermore, the polymerization initiation system of the photocurable composition (ink composition) of the present invention has sufficient sensitivity for low output light. Therefore, it is appropriate that the photocuring is carried out under the condition that the illumination intensity on the exposed surface is 10 to 4,000 mW/cm$^2$, and preferably 20 to 2,500 mW/cm$^2$.

As a light source, a mercury lamp, a gas/solid laser, etc. are mainly used, and for curing UV photocuring ink for inkjet recording, a mercury lamp and a metal halide lamp are widely known. However, from the viewpoint of protection of the environment, there has recently been a strong desire for mercury not to be used, and replacement by a GaN semiconductor UV light emitting device is very useful from industrial and environmental viewpoints. Furthermore, LEDs (UV-LED) and LDs (UV-LD) have small dimensions, long life, high efficiency, and low cost, and their use as a photocuring inkjet light source can be expected.

Furthermore, light-emitting diodes (LED) and laser diodes (LD) may be used as the light source. In particular, when a UV ray source is needed, a UV-LED or a UV-LD may be used. For example, Nichia Corporation has marketed a violet LED having a wavelength of the main emission spectrum of between 365 nm and 420 nm. Furthermore, when a shorter wavelength is needed, U.S. Pat. No. 6,084,250 discloses an LED that can emit light whose wavelength is centered between 300 nm and 370 nm. Furthermore, another violet LED is available, and irradiation can be carried out with radiation of a different UV bandwidth. The light source particularly preferable in the present invention is a UV-LED, and a UV-LED having a peak wavelength at 340 to 400 nm is particularly preferable.

The maximum illumination intensity of the LED on a recording medium is preferably 10 to 2,000 mW/cm$^2$, more preferably 20 to 1,000 mW/cm$^2$, and particularly preferably 50 to 800 mJ/cm$^2$.

The photocurable composition (ink composition) of the present invention is preferably exposed to such light for 0.01 to 120 sec., and more preferably 0.1 to 90 sec.

Light irradiation conditions and a basic method for the irradiation are disclosed in JP-A-60-132767. Specifically, a light source is provided on either side of a head unit that includes an ink discharge device, and the head unit and the light source are made to scan by a so-called shuttle system. Irradiation with light is carried out after a certain time (preferably 0.01 to 0.5 sec., more preferably 0.01 to 0.3 sec., and even more preferably 0.01 to 0.15 sec.) has elapsed from the time when the ink has landed. By controlling the time from landing of the photocurable composition (ink composition) to irradiation so as to be a minimum in this way, it becomes possible to prevent the photocurable composition (ink composition) that has landed on a recording medium from spreading before being cured. Furthermore, since the ink can be exposed before it reaches a deep area of a porous recording medium that the light source cannot reach, it is possible to prevent monomer from remaining unreacted.

Furthermore, curing may be completed using another light source that is not driven. WO99/54415 discloses, as an irradiation method, a method employing an optical fiber and a method in which a collimated light source is incident on a mirror surface provided on a head unit side face, and a recorded area is irradiated with UV light, and such a curing method can also be used as an inkjet recording method of the present invention.

By employing the above-mentioned inkjet recording method, it is possible to keep constant the diameter of landed photocurable composition (ink composition) dots even for various recording media having different surface wettability, thus improving the image quality. In order to obtain a color image, it is preferable to overlap in order from low lightness colors. By overlapping in order from a photocurable composition (ink composition) having low lightness, it becomes easy for light to reach the photocurable composition (ink composition) in a lower part, and good curing sensitivity, reduction of residual monomer, and improvement in adhesion can be expected. Although it is possible to carry out irradiation all at once after all colors are discharged, it is preferable, in terms of promoting curing, that exposure to light is carried out for each color.

In this way, the photocurable composition (ink composition) of the present invention cures with high sensitivity upon exposure to light, and an image is formed on the surface of a recording medium.

The inkjet recording method of the present invention may suitably employ the ink set comprising one or more types of the photocurable compositions (ink compositions) of the present invention. The order in which colored ink compositions are discharged is not particularly limited, but it is preferable to apply to a recording medium from a colored ink composition having a low lightness; when yellow, cyan, magenta, and black ink compositions are used, they are preferably applied on top of the recording medium in the order: yellow→cyan→magenta→black. Furthermore, when white is additionally used, they are preferably applied on top of the recording medium in the order: white→yellow→cyan→magenta→black. Moreover, the present invention is not limited thereto, and an ink set comprising a total of at least seven colors, that is, light cyan, and light magenta ink compositions and cyan, magenta, black, white, and yellow dark ink compositions may preferably be used, and in this case they are applied on top of the recording medium in the order: white→light cyan→light magenta→yellow→cyan→magenta→black.

In the present invention, the recording medium is not particularly limited, and a recording medium known as a support or a recording material may be used. Examples thereof include paper, paper laminated with a plastic (e.g. polyethylene, polypropylene, polystyrene, etc.), a metal plate (e.g. aluminum, zinc, copper, etc.), a plastic film (e.g. cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, polyvinylacetal, etc.), and paper or plastic film laminated or vapor-deposited with the above metal. In the present invention, as the recording medium, a non-absorbing recording medium may suitably be used.

Since it is desirable for the photocurable composition (ink composition) to be discharged at a constant temperature, a section from the ink supply tank to the inkjet head is thermally insulated and heated. A method of controlling temperature is not particularly limited, but it is preferable to provide, for example, temperature sensors at a plurality of pipe section positions, and control heating according to the ink flow rate and the temperature of the surroundings. The temperature sensors may be provided on the ink supply tank and in the vicinity of the inkjet head nozzle. Furthermore, the head unit that is to be heated is preferably thermally shielded or insulated so that the device main body is not influenced by the temperature of the outside air. In order to reduce the printer start-up time required for heating, or in order to reduce the thermal energy loss, it is preferable to thermally insulate the head unit from other sections and also to reduce the heat capacity of the entire heated unit.

As a light source emitting a light having a wave length of at least 340 nm to 400 nm, it is not limited, but a commercial UV light source can be used preferably. Examples of the commercial UV light source include a mercury lamp, a mercury lamp, a metal halide lamp, LEDs (UV-LED), LDs (UV-LD) and a UV cathode tube, and LEDs can be used preferably because it has small dimensions, long life, high efficiency, and low cost.

As an inkjet recording system that can be used in the present invention, for example, an inkjet recording system 10 shown in FIG. 1 can be cited.

FIG. 1 is a schematic diagram illustrating one example of an inkjet recording system that can be used in the present invention.

The inkjet recording system 10 comprises an inkjet recording head unit part 12 that can carry out discharge of a photocurable composition (ink composition) and irradiation with UV, a head maintenance/cleaning box 14 that enables maintenance or cleaning of an inkjet head to be carried out, a head reciprocation power part 16 equipped with a tube for supplying the photocurable composition (ink composition) and an electrical system cable for operating the inkjet head, a head fixing shaft 18 for fixing a distance between the inkjet head and a recording medium, a controlling personal computer 20 for controlling the overall operation of the inkjet recording system 10 such as operation of the inkjet head, supply of the photocurable composition (ink composition), and supply of a recording medium 26, a recording medium suction stage 22 for carrying out inkjet recording on the recording medium 26, an ink tank 24 for storing the ink composition, and a recording medium transport roller 28 and a recording medium wind-up roller 30 for carrying out in cooperation supply of recording medium to the recording medium suction stage 22, etc.

The controlling personal computer 20 and each part of the inkjet recording system 10 are connected via various types of cables (not illustrated), including the electrical system cable within the head reciprocation power part 16.

Furthermore, the ink tank 24 may store five types of ink compositions.

The recording medium 26 is supplied onto the recording medium suction stage 22 by means of the recording medium transport roller 28 and the recording medium wind-up roller 30, and inkjet recording is carried out on the recording medium suction stage 22 by means of the inkjet recording head unit part 12.

FIG. 2 is an enlarged schematic diagram of the inkjet recording head unit part 12 in the inkjet recording system 10 shown in FIG. 1.

The inkjet recording head unit part 12 comprises five inkjet heads for each of the colors (a white ink composition inkjet head W, a cyan ink composition inkjet head C, a magenta ink composition inkjet head M, a yellow ink composition inkjet head Y, and a black ink composition inkjet head K), and UV irradiation metal halide lamps 32 for opposite sides of the five inkjet heads, and the five inkjet heads (W, C, M, Y, K) for each of the colors and the two UV irradiation metal halide lamps 32 move on the head fixing shaft 18 as a unit.

Photocurable compositions (ink compositions) of each color are supplied from the ink tank 24 to the respective inkjet heads via tubes within the head reciprocation power part 16.

The photocurable compositions (ink compositions) discharged onto the recording medium 26 via the five inkjet heads (W, C, M, Y, K) for each color may be cured by the UV irradiation metal halide lamp 32 of either side.

Application of the photocurable composition of the present invention is not limited thereto, and it may be applied to paints, varnishes, powder coatings, printing plates, adhesives, dental compositions, gel coats, electronic photoresists (e.g. electroplating resists, etching resists), compositions for producing soldering resists, compositions for producing color filters for use in various types of display devices, compositions for forming structures in processes for producing plasma display panels, electroluminescent display devices, and LCDs, composite compositions, resists such as photoresists, color filter materials, black matrixes, compositions for sealing electric and electronic components, magnetic recording materials, micromechanical components, waveguides, optical switches, plating masks, etching masks, color test systems, glass fiber cable coatings, compositions for producing screen printing stencils, compositions for producing three-dimensional materials by stereolithography, image recording materials, in particular image recording materials for holographic recording, microelectronic circuits, compositions as decolorant materials for image recording materials employing microcapsules, and compositions for forming a dielectric layer in sequential lamination of printed circuit boards.

In accordance with the present invention, there can be provided a photocurable composition that has excellent storage stability under a high temperature environment and under a low temperature environment.

Furthermore, in accordance with the present invention, there can be provided a photocurable composition that achieves a balance between high curing sensitivity and stable discharge properties and that is particularly suitable as an ink composition for inkjet recording.

EXAMPLES

The present invention is explained in more detail below by reference to Examples, but the present invention is not limited thereto.

Synthesis of Compound (I)

Anthracene compound A ($15 \times 10^{-3}$ mol) was slowly added to a glacial acetic acid solution (50 mL). Following this, the above solution was heated to about 50° C. to 80° C., and benzoic acid compound A ($4 \times 10^{-3}$ mol) and conc. sulfuric acid (10 mL) were gradually added. Stirring was carried out for about 5 hours while maintaining the solution at 100° C. to 130° C., thus giving a reaction mixture. The reaction mixture was returned to room temperature and allowed to stand for 12 to 15 hours.

The reaction mixture (40 mL) thus allowed to stand was slowly added to boiling water (about 500 mL), and stirring was carried out for 5 to 10 minutes. After stirring, the liquid was cooled to room temperature and filtered, and the residue was recrystallized from dioxane-water, thus giving compound (I-12).

Furthermore, compounds (I-19), (I-21), (I-44), (I-51), and (I-53) and comparative compound A were obtained by the same procedure as above except that anthracene compound A and/or benzoic acid compound A were changed to compounds shown in Table 1.

Compounds and reagents used in these syntheses were obtained from Sigma-Aldrich Corporation, Tokyo Chemical Industry Co., Ltd., or Wako Pure Chemical Industries, Ltd.

TABLE 1

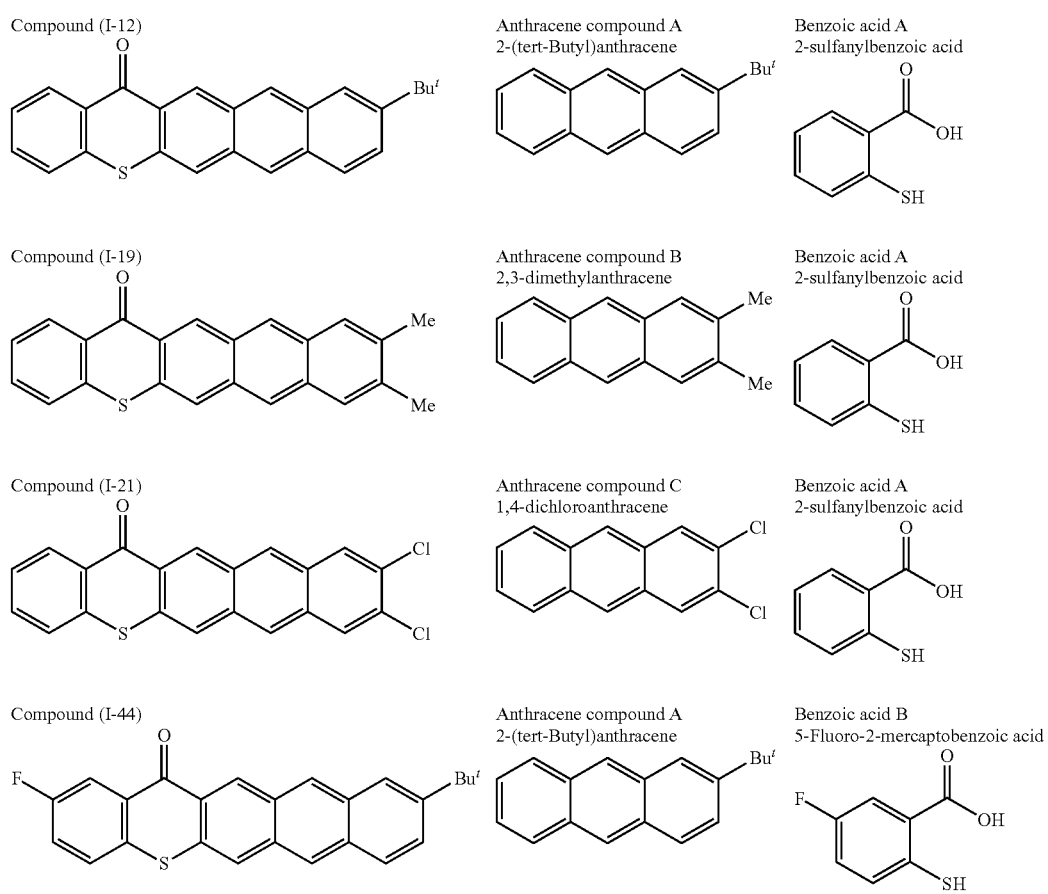

TABLE 1-continued

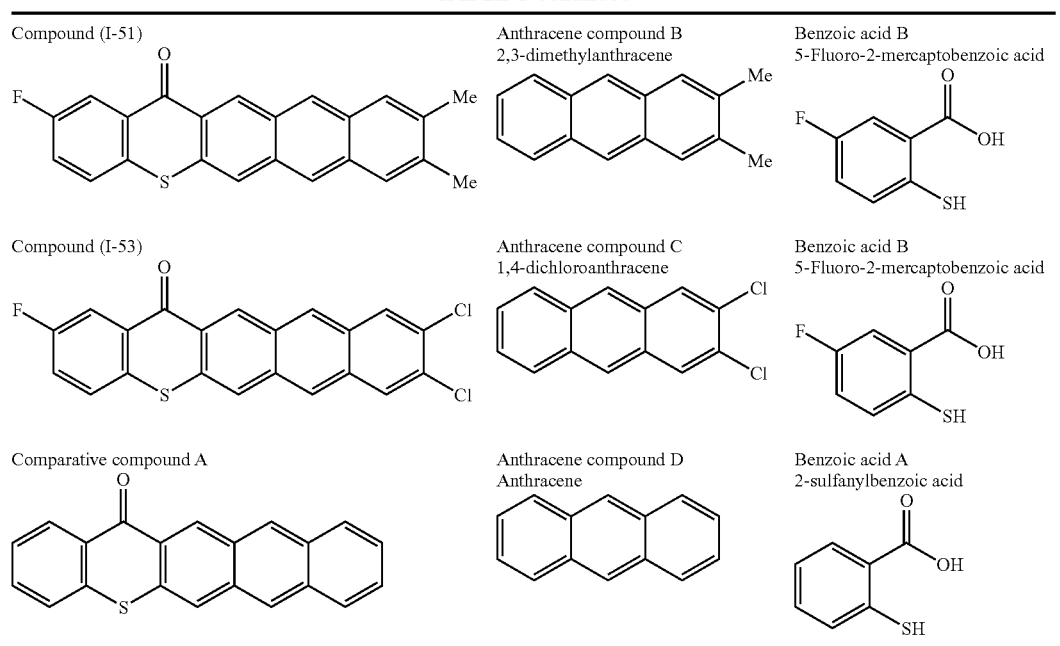

Preparation of Pigment Dispersion

The components shown in Table 2 were mixed, and stirred using a stirrer for 1 hour. After stirring, the mixture was dispersed by means of bead mill dispersion, thus giving a pigment dispersion. Dispersion was carried out under conditions of 0.65 mm diameter zirconia beads packed at a packing ratio of 70%, a peripheral speed of 9 m/s, and a dispersion time of 2 to 4 hours.

Preparation of Ink Composition

Components shown in Tables 3 to 13 (units: parts by weight) were stirred, mixed, and dissolved to give color ink compositions (Magenta ink compositions M1 to M11, Cyan ink compositions C1 to C11, Yellow ink compositions Y1 to Y11, White ink compositions W1 to W11, and black ink compositions Bk1 to Bk11), and Ink sets 1 to 11 using these ink compositions were obtained. The surface tensions of these ink compositions each were subjected to measurement at a liquid temperature of 25° C. by the Wilhelmy method using a surface tensiometer (e.g. a CBVP-Z surface tensiometer manufactured by Kyowa Interface Science Co., Ltd.), values measured for the surface tension of the ink compositions were all in the range of 23 to 25 mN/m.

TABLE 2

|  | Cyan pigment A (parts by weight) | Magenta pigment A (parts by weight) | Yellow pigment A (parts by weight) | Carbon Black (parts by weight) | Titanium dioxide (parts by weight) | Dispersant A (parts by weight) | Dispersant B (parts by weight) | Polymerizable compound A (parts by weight) |
|---|---|---|---|---|---|---|---|---|
| Cyan pigment dispersion A | 30 | — | — | — | — | 20 | — | 50 |
| Magenta pigment dispersion A | — | 30 | — | — | — | 20 | — | 50 |
| Yellow pigment dispersion A | — | — | 30 | — | — | 20 | — | 50 |
| Black pigment dispersion A | — | — | — | 40 | — | 25 | — | 35 |
| White pigment dispersion A | — | — | — | — | 60 | — | 5 | 35 |

Pigments, dispersants, and polymerizable compounds used in Table 2 are as follows.
Cyan pigment A: C.I. Pigment Blue 15:3 (PB15:3; IRGALITE BLUE GLO; manufactured by Ciba Specialty Chemicals Inc.)
Magenta pigment A: C.I. Pigment Violet 19 (PV19; CINQUASIA MAGENTA RT-355D; manufactured by Ciba Specialty Chemicals Inc.)
Yellow pigment A; C.I. Pigment Yellow 155 (PY155; NOVOPERM YELLOW 4G-01; manufactured by Clariant)
Carbon black: Special Black 250 (manufactured by Degussa)
Titanium oxide: CR 60-2 (manufactured by Ishihara Sangyo Kaisha Ltd.)
Dispersant A: BYK-168 (manufactured by BYK-Chemie)
Dispersant B: Solsperse 36000 (manufactured by Noveon)
Polymerizable compound A: PEA (phenoxyethyl acrylate; manufactured by Daiichi Kogyo Seiyaku Co., Ltd.)

TABLE 3

| Composition | Ink composition (Ink set 1) | | | | |
|---|---|---|---|---|---|
| (parts by weight) | M1 | C1 | Y1 | W1 | Bk1 |
| Magenta pigment dispersion A | 18.0 | — | — | — | — |
| Cyan pigment dispersion A | — | 7.0 | — | — | — |
| Yellow pigment dispersion A | — | — | 15.0 | — | — |
| White pigment dispersion A | — | — | — | 9.6 | — |
| Black pigment dispersion A | — | — | — | — | 9.0 |
| Polymerizable compound A | 24.3 | 35.3 | 27.3 | 32.7 | 33.3 |
| Polymerizable compound B | 30.0 | 30.0 | 30.0 | 30.0 | 30.0 |
| Polymerizable compound C | 1.0 | 1.0 | 1.0 | 1.0 | 1.0 |

TABLE 3-continued

| Composition | Ink composition (Ink set 1) | | | | |
|---|---|---|---|---|---|
| (parts by weight) | M1 | C1 | Y1 | W1 | Bk1 |
| Polymerizable compound D | 15.0 | 15.0 | 15.0 | 15.0 | 15.0 |
| Surfactant A | 0.1 | 0.1 | 0.1 | 0.1 | 0.1 |
| Polymerization inhibitor A | 0.1 | 0.1 | 0.1 | 0.1 | 0.1 |
| Photopolymerization initiator A | 4.5 | 4.5 | 4.5 | 4.5 | 4.5 |
| Photopolymerization initiator B | 4.0 | 4.0 | 4.0 | 4.0 | 4.0 |
| Photopolymerization initiator C | 2.0 | 2.0 | 2.0 | 2.0 | 2.0 |
| Compound (I-12) | 1.0 | 1.0 | 1.0 | 1.0 | 1.0 |

TABLE 4

| Composition | Ink composition (Ink set 2) | | | | |
|---|---|---|---|---|---|
| (parts by weight) | M2 | C2 | Y2 | W2 | Bk2 |
| Magenta pigment dispersion A | 18.0 | — | — | — | — |
| Cyan pigment dispersion A | — | 7.0 | — | — | — |
| Yellow pigment dispersion A | — | — | 15.0 | — | — |
| White pigment dispersion A | — | — | — | 9.6 | — |
| Black pigment dispersion A | — | — | — | — | 9.0 |
| Polymerizable compound A | 24.3 | 35.3 | 27.3 | 32.7 | 33.3 |
| Polymerizable compound B | 30.0 | 30.0 | 30.0 | 30.0 | 30.0 |
| Polymerizable compound C | 1.0 | 1.0 | 1.0 | 1.0 | 1.0 |
| Polymerizable compound D | 15.0 | 15.0 | 15.0 | 15.0 | 15.0 |
| Surfactant A | 0.1 | 0.1 | 0.1 | 0.1 | 0.1 |
| Polymerization inhibitor A | 0.1 | 0.1 | 0.1 | 0.1 | 0.1 |
| Photopolymerization initiator A | 4.5 | 4.5 | 4.5 | 4.5 | 4.5 |
| Photopolymerization initiator B | 4.0 | 4.0 | 4.0 | 4.0 | 4.0 |
| Photopolymerization initiator C | 2.0 | 2.0 | 2.0 | 2.0 | 2.0 |
| Compound (I-19) | 1.0 | 1.0 | 1.0 | 1.0 | 1.0 |

TABLE 5

| Composition | Ink composition (Ink set 3) | | | | |
|---|---|---|---|---|---|
| (parts by weight) | M3 | C3 | Y3 | W3 | Bk3 |
| Magenta pigment dispersion A | 18.0 | — | — | — | — |
| Cyan pigment dispersion A | — | 7.0 | — | — | — |
| Yellow pigment dispersion A | — | — | 15.0 | — | — |
| White pigment dispersion A | — | — | — | 9.6 | — |
| Black pigment dispersion A | — | — | — | — | 9.0 |
| Polymerizable compound A | 24.3 | 35.3 | 27.3 | 32.7 | 33.3 |
| Polymerizable compound B | 30.0 | 30.0 | 30.0 | 30.0 | 30.0 |
| Polymerizable compound C | 1.0 | 1.0 | 1.0 | 1.0 | 1.0 |
| Polymerizable compound D | 15.0 | 15.0 | 15.0 | 15.0 | 15.0 |
| Surfactant A | 0.1 | 0.1 | 0.1 | 0.1 | 0.1 |
| Polymerization inhibitor A | 0.1 | 0.1 | 0.1 | 0.1 | 0.1 |
| Photopolymerization initiator A | 4.5 | 4.5 | 4.5 | 4.5 | 4.5 |
| Photopolymerization initiator B | 4.0 | 4.0 | 4.0 | 4.0 | 4.0 |
| Photopolymerization initiator C | 2.0 | 2.0 | 2.0 | 2.0 | 2.0 |
| Compound (I-21) | 1.0 | 1.0 | 1.0 | 1.0 | 1.0 |

TABLE 6

| Composition | Ink composition (Ink set 4) | | | | |
|---|---|---|---|---|---|
| (parts by weight) | M4 | C4 | Y4 | W4 | Bk4 |
| Magenta pigment dispersion A | 18.0 | — | — | — | — |
| Cyan pigment dispersion A | — | 7.0 | — | — | — |
| Yellow pigment dispersion A | — | — | 15.0 | — | — |
| White pigment dispersion A | — | — | — | 9.6 | — |
| Black pigment dispersion A | — | — | — | — | 9.0 |
| Polymerizable compound A | 24.3 | 35.3 | 27.3 | 32.7 | 33.3 |
| Polymerizable compound B | 30.0 | 30.0 | 30.0 | 30.0 | 30.0 |
| Polymerizable compound C | 1.0 | 1.0 | 1.0 | 1.0 | 1.0 |
| Polymerizable compound D | 15.0 | 15.0 | 15.0 | 15.0 | 15.0 |
| Surfactant A | 0.1 | 0.1 | 0.1 | 0.1 | 0.1 |
| Polymerization inhibitor A | 0.1 | 0.1 | 0.1 | 0.1 | 0.1 |

TABLE 6-continued

| Composition | Ink composition (Ink set 4) | | | | |
|---|---|---|---|---|---|
| (parts by weight) | M4 | C4 | Y4 | W4 | Bk4 |
| Photopolymerization initiator A | 4.5 | 4.5 | 4.5 | 4.5 | 4.5 |
| Photopolymerization initiator B | 4.0 | 4.0 | 4.0 | 4.0 | 4.0 |
| Photopolymerization initiator C | 2.0 | 2.0 | 2.0 | 2.0 | 2.0 |
| Compound (I-44) | 1.0 | 1.0 | 1.0 | 1.0 | 1.0 |

TABLE 7

| Composition | Ink composition (Ink set 5) | | | | |
|---|---|---|---|---|---|
| (parts by weight) | M5 | C5 | Y5 | W5 | Bk5 |
| Magenta pigment dispersion A | 18.0 | — | — | — | — |
| Cyan pigment dispersion A | — | 7.0 | — | — | — |
| Yellow pigment dispersion A | — | — | 15.0 | — | — |
| White pigment dispersion A | — | — | — | 9.6 | — |
| Black pigment dispersion A | — | — | — | — | 9.0 |
| Polymerizable compound A | 24.3 | 35.3 | 27.3 | 32.7 | 33.3 |
| Polymerizable compound B | 30.0 | 30.0 | 30.0 | 30.0 | 30.0 |
| Polymerizable compound C | 1.0 | 1.0 | 1.0 | 1.0 | 1.0 |
| Polymerizable compound D | 15.0 | 15.0 | 15.0 | 15.0 | 15.0 |
| Surfactant A | 0.1 | 0.1 | 0.1 | 0.1 | 0.1 |
| Polymerization inhibitor A | 0.1 | 0.1 | 0.1 | 0.1 | 0.1 |
| Photopolymerization initiator A | 4.5 | 4.5 | 4.5 | 4.5 | 4.5 |
| Photopolymerization initiator B | 4.0 | 4.0 | 4.0 | 4.0 | 4.0 |
| Photopolymerization initiator C | 2.0 | 2.0 | 2.0 | 2.0 | 2.0 |
| Compound (I-51) | 1.0 | 1.0 | 1.0 | 1.0 | 1.0 |

TABLE 8

| Composition | Ink composition (Ink set 6) | | | | |
|---|---|---|---|---|---|
| (parts by weight) | M6 | C6 | Y6 | W6 | Bk6 |
| Magenta pigment dispersion A | 18.0 | — | — | — | — |
| Cyan pigment dispersion A | — | 7.0 | — | — | — |
| Yellow pigment dispersion A | — | — | 15.0 | — | — |
| White pigment dispersion A | — | — | — | 9.6 | — |
| Black pigment dispersion A | — | — | — | — | 9.0 |
| Polymerizable compound A | 24.3 | 35.3 | 27.3 | 32.7 | 33.3 |
| Polymerizable compound B | 30.0 | 30.0 | 30.0 | 30.0 | 30.0 |
| Polymerizable compound C | 1.0 | 1.0 | 1.0 | 1.0 | 1.0 |
| Polymerizable compound D | 15.0 | 15.0 | 15.0 | 15.0 | 15.0 |
| Surfactant A | 0.1 | 0.1 | 0.1 | 0.1 | 0.1 |
| Polymerization inhibitor A | 0.1 | 0.1 | 0.1 | 0.1 | 0.1 |
| Photopolymerization initiator A | 4.5 | 4.5 | 4.5 | 4.5 | 4.5 |
| Photopolymerization initiator B | 4.0 | 4.0 | 4.0 | 4.0 | 4.0 |
| Photopolymerization initiator C | 2.0 | 2.0 | 2.0 | 2.0 | 2.0 |
| Compound (I-53) | 1.0 | 1.0 | 1.0 | 1.0 | 1.0 |

TABLE 9

| Composition | Ink composition (Ink set 7) | | | | |
|---|---|---|---|---|---|
| (parts by weight) | M7 | C7 | Y7 | W7 | Bk7 |
| Magenta pigment dispersion A | 18.0 | — | — | — | — |
| Cyan pigment dispersion A | — | 7.0 | — | — | — |
| Yellow pigment dispersion A | — | — | 15.0 | — | — |
| White pigment dispersion A | — | — | — | 9.6 | — |
| Black pigment dispersion A | — | — | — | — | 9.0 |
| Polymerizable compound A | 24.3 | 35.3 | 27.3 | 32.7 | 33.3 |
| Polymerizable compound B | 30.0 | 30.0 | 30.0 | 30.0 | 30.0 |
| Polymerizable compound C | 1.0 | 1.0 | 1.0 | 1.0 | 1.0 |
| Polymerizable compound D | 15.0 | 15.0 | 15.0 | 15.0 | 15.0 |
| Surfactant A | 0.1 | 0.1 | 0.1 | 0.1 | 0.1 |
| Polymerization inhibitor A | 0.1 | 0.1 | 0.1 | 0.1 | 0.1 |
| Photopolymerization initiator A | 4.5 | 4.5 | 4.5 | 4.5 | 4.5 |
| Photopolymerization initiator B | 4.0 | 4.0 | 4.0 | 4.0 | 4.0 |

TABLE 9-continued

| Composition | Ink composition (Ink set 7) | | | | |
|---|---|---|---|---|---|
| (parts by weight) | M7 | C7 | Y7 | W7 | Bk7 |
| Photopolymerization initiator C | 2.0 | 2.0 | 2.0 | 2.0 | 2.0 |
| Comparative compound A | 1.0 | 1.0 | 1.0 | 1.0 | 1.0 |

TABLE 10

| Composition | Ink composition (Ink set 8) | | | | |
|---|---|---|---|---|---|
| (parts by weight) | M8 | C8 | Y8 | W8 | Bk8 |
| Magenta pigment dispersion A | 18.0 | — | — | — | — |
| Cyan pigment dispersion A | — | 7.0 | — | — | — |
| Yellow pigment dispersion A | — | — | 15.0 | — | — |
| White pigment dispersion A | — | — | — | 9.6 | — |
| Black pigment dispersion A | — | — | — | — | 9.0 |
| Polymerizable compound A | 28.3 | 39.3 | 31.3 | 36.7 | 37.3 |
| Polymerizable compound B | 30.0 | 30.0 | 30.0 | 30.0 | 30.0 |
| Polymerizable compound C | 1.0 | 1.0 | 1.0 | 1.0 | 1.0 |
| Polymerizable compound D | 15.0 | 15.0 | 15.0 | 15.0 | 15.0 |
| Surfactant A | 0.1 | 0.1 | 0.1 | 0.1 | 0.1 |
| Polymerization inhibitor A | 0.1 | 0.1 | 0.1 | 0.1 | 0.1 |
| Photopolymerization initiator D | 6.0 | 6.0 | 6.0 | 6.0 | 6.0 |
| Compound (I-12) | 1.0 | 1.0 | 1.0 | 1.0 | 1.0 |
| Compound (I-21) | 0.5 | 0.5 | 0.5 | 0.5 | 0.5 |

TABLE 11

| Composition | Ink composition (Ink set 9) | | | | |
|---|---|---|---|---|---|
| (parts by weight) | M9 | C9 | Y9 | W9 | Bk9 |
| Magenta pigment dispersion A | 18.0 | — | — | — | — |
| Cyan pigment dispersion A | — | 7.0 | — | — | — |
| Yellow pigment dispersion A | — | — | 15.0 | — | — |
| White pigment dispersion A | — | — | — | 9.6 | — |
| Black pigment dispersion A | — | — | — | — | 9.0 |
| Polymerizable compound A | 27.8 | 38.8 | 30.8 | 36.2 | 36.8 |
| Polymerizable compound B | 30.0 | 30.0 | 30.0 | 30.0 | 30.0 |
| Polymerizable compound C | 1.0 | 1.0 | 1.0 | 1.0 | 1.0 |
| Polymerizable compound D | 15.0 | 15.0 | 15.0 | 15.0 | 15.0 |
| Surfactant A | 0.1 | 0.1 | 0.1 | 0.1 | 0.1 |
| Polymerization inhibitor A | 0.1 | 0.1 | 0.1 | 0.1 | 0.1 |
| Photopolymerization initiator D | 6.0 | 6.0 | 6.0 | 6.0 | 6.0 |
| Photopolymerization initiator E | 2.0 | 2.0 | 2.0 | 2.0 | 2.0 |

TABLE 12

| Composition | Ink composition (Ink set 10) | | | | |
|---|---|---|---|---|---|
| (parts by weight) | M10 | C10 | Y10 | W10 | Bk10 |
| Magenta pigment dispersion A | 18.0 | — | — | — | — |
| Cyan pigment dispersion A | — | 7.0 | — | — | — |
| Yellow pigment dispersion A | — | — | 15.0 | — | — |
| White pigment dispersion A | — | — | — | 9.6 | — |
| Black pigment dispersion A | — | — | — | — | 9.0 |
| Polymerizable compound A | 25.8 | 36.8 | 28.8 | 34.2 | 34.8 |
| Polymerizable compound B | 30.0 | 30.0 | 30.0 | 30.0 | 30.0 |
| Polymerizable compound C | 1.0 | 1.0 | 1.0 | 1.0 | 1.0 |
| Polymerizable compound D | 15.0 | 15.0 | 15.0 | 15.0 | 15.0 |
| Surfactant A | 0.1 | 0.1 | 0.1 | 0.1 | 0.1 |
| Polymerization inhibitor A | 0.1 | 0.1 | 0.1 | 0.1 | 0.1 |
| Photopolymerization initiator D | 6.0 | 6.0 | 6.0 | 6.0 | 6.0 |
| Photopolymerization initiator E | 2.0 | 2.0 | 2.0 | 2.0 | 2.0 |
| Amine compound 1 | 2.0 | 2.0 | 2.0 | 2.0 | 2.0 |

TABLE 13

| Composition | Ink composition (Ink set 11) | | | | |
|---|---|---|---|---|---|
| (parts by weight) | M11 | C11 | Y11 | W11 | Bk11 |
| Magenta pigment dispersion A | 18.0 | — | — | — | — |
| Cyan pigment dispersion A | — | 7.0 | — | — | — |
| Yellow pigment dispersion A | — | — | 15.0 | — | — |
| White pigment dispersion A | — | — | — | 9.6 | — |
| Black pigment dispersion A | — | — | — | — | 9.0 |
| Polymerizable compound A | 23.8 | 34.8 | 26.8 | 32.2 | 32.8 |
| Polymerizable compound B | 30.0 | 30.0 | 30.0 | 30.0 | 30.0 |
| Polymerizable compound C | 1.0 | 1.0 | 1.0 | 1.0 | 1.0 |
| Polymerizable compound D | 15.0 | 15.0 | 15.0 | 15.0 | 15.0 |
| Surfactant A | 0.1 | 0.1 | 0.1 | 0.1 | 0.1 |
| Polymerization inhibitor A | 0.1 | 0.1 | 0.1 | 0.1 | 0.1 |
| Photopolymerization initiator A | 4.5 | 4.5 | 4.5 | 4.5 | 4.5 |
| Photopolymerization initiator B | 4.0 | 4.0 | 4.0 | 4.0 | 4.0 |
| Photopolymerization initiator C | 2.0 | 2.0 | 2.0 | 2.0 | 2.0 |
| Compound (I-12) | 1.0 | 1.0 | 1.0 | 1.0 | 1.0 |
| Compound (I-21) | 0.5 | 0.5 | 0.5 | 0.5 | 0.5 |

The materials used in Tables 3 to 13 are as follows.
Polymerizable compound A: PEA (phenoxyethyl acrylate; manufactured by Daiichi Kogyo Seiyaku Co., Ltd.)
Polymerizable compound B: DPGDA (dipropylene glycol diacrylate; manufactured by Daicel-Cytec Company Ltd.)
Polymerizable compound C: A-TMPT (trimethylolpropane triacrylate; manufactured by Shin-Nakamura Chemical Co., Ltd.)
Polymerizable compound D: FA-512A (dicyclopentenyloxyethyl acrylate; manufactured by Hitachi Chemical Co., Ltd.)
Surfactant A: BYK-307 (manufactured by BYK-Chemie, surfactant)
Polymerization inhibitor A: FIRSTCURE ST-1 (manufactured by Albemarle)
Photopolymerization initiator A: bis(2,4,6-trimethylbenzoyl) phenylphosphine oxide (acylphosphine oxide; IRGACURE 819, manufactured by Ciba Specialty Chemicals)
Photopolymerization initiator B: 2,4,6-trimethylbenzoyl-diphenylphosphine oxide (acylphosphine oxide; DAROCUR TPO, manufactured by Ciba Specialty Chemicals)
Photopolymerization initiator C: 2-methyl-1-(4-methylthiophenyl)-2-morpholinopropan-1-one (α-aminoacetophenone; IRGACURE 907, manufactured by Ciba Specialty Chemicals)
Photopolymerization initiator D: 1-hydroxycyclohexyl phenyl ketone α-hydroxyacetophenone; IRGACURE 184, manufactured by Ciba Specialty Chemicals)
Photopolymerization initiator E: Speedcure ITX (mixture of 2-isopropylthioxanthone and 4-isopropylthioxanthone, manufactured by Lambson)
Amine compound 1 (compound below)

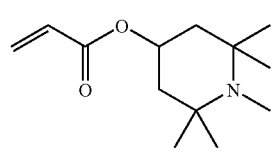 [SMILES: C=CC(=O)OC1CC(C)(C)N(C)C(C)(C)C1]

Image Recording System

A schematic diagram of an inkjet recording printer used in printing is shown in FIG. 1.

An inkjet recording head unit part was formed from ten groups of head sets, of which two commercial heads (CA4 head, Toshiba Tec Corporation) per color were arranged to give 600 npi, and two commercial UV-curing lamps (metal halide lamps). The inkjet recording head unit part was fixed by a long metal shaft, and was reciprocated at a variable speed by means of a power part that could carry out reciprocation. The power part that could carry out reciprocation was equipped with a tube for supplying an ink composition and electric wiring for controlling the head.

Opposite ends of the fixing shaft for the inkjet recording head unit part were equipped with a BOX for carrying out maintenance and cleaning of the head. Furthermore, disposed outside them were a personal computer (PC) for controlling the inkjet recording printer and an ink tank.

A recording medium suction stage that could fix a recording medium by suction was disposed immediately beneath the head. The recording medium was transported in a direction perpendicular to the reciprocating direction of the head by means of a plurality of recording medium transport rollers and a recording medium wind-up roller.

The discharge frequency of the head and the speed for reciprocation of the head were controlled so that an image was always printed at a fired droplet density of 600×600 dpi. The illumination intensity from the metal halide lamp was fixed at about 1,000 mW/cm$^2$ on the recording medium. The speed of reciprocation and an aperture width of a slit within the metal halide lamp were adjusted so that the illumination intensity could be varied between six levels (300 mJ/cm$^2$, 600 mJ/cm$^2$, 900 mJ/cm$^2$, 1,200 mJ/cm$^2$, 1,500 mJ/cm$^2$, 1,800 mJ/cm$^2$)

The recording medium employed a white polyvinyl chloride (PVC) sheet and a transparent PET sheet. When printing was carried out on a white PVC sheet, a white ink composition was not used. When printing was carried out on a transparent PET sheet, a white ink composition was used for a base, and an image was formed using other colors.

Examples 1 to 8 and Comparative Examples 1 to 3

In Example 1, the image recording system was charged with ink set 1, printed materials were obtained, and inkjet suitability (dischargeability) and curing sensitivity were evaluated. Furthermore, long-term stability of the ink composition was evaluated at constant temperature and constant humidity.

The evaluation procedure and evaluation criteria for inkjet suitability (dischargeability), curing sensitivity, and long-term storage stability of the ink composition were as shown below.

In Examples 2 to 8 and Comparative Examples 1 to 3, evaluation was carried out in the same manner as in Example 1 except that the ink set was replaced by an ink set shown in Table 14.

Evaluation results for Examples 1 to 8 and Comparative Examples 1 to 3 were as shown in Table 14.
Long-Term Storage Stability of Ink Composition (High Temperature)

A screw-cap glass bottle (100 cc (cm$^3$)) was charged with 50 cc of an ink composition and capped tightly, and stored in a constant temperature and constant humidity chamber set at a temperature of 60° C. and a humidity of 45% RH for 30 days, and the long-term stability of the ink composition was evaluated by changes in viscosity and average particle size.

Evaluation criteria for the long-term storage stability (high temperature) of an ink composition were as shown below; evaluations of Excellent, Good and Acceptable were in the required performance range.
Excellent: Change in both viscosity and average particle size were less than 10% for all the color ink compositions.
Good: Change in viscosity was less than 10% for all of the color ink compositions. Furthermore, change in average particle size was less than 10% for at least three color ink compositions, and less than 50% for the other color ink compositions having 10% or more change in the size.
Acceptable: Change in viscosity was less than 10% for all of the color ink compositions. Furthermore, change in average particle size was less than 10% for less than three color ink compositions, and less than 50% for the other color ink compositions having 10% or more change in the size.
Poor: Change in viscosity for any of color ink compositions was 10% or more, or change in average particle size was 50% or more.
Long-Term Storage Stability (Low Temperature) of Ink Composition A screw-cap glass bottle (100 cc) was charged with 50 cc of an ink composition and capped tightly, and stored in a constant temperature and constant humidity chamber set at a temperature of −15° C. for 7 days, and was visually checked for the presence/absence of a precipitate. Evaluation criteria for the long-term stability (low temperature) of an ink composition were as shown below; an evaluation of Excellent was in the required performance range.
Excellent: no precipitate observed for all colors of ink compositions.
Poor: precipitate observed for any color of ink composition.
Inkjet Suitability (Discharge Properties)

Printing was carried out continuously for 30 min using the image recording system at a discharge frequency of 6.2 kHz and a fired droplet density of 600×600 dpi, and inkjet suitability (discharge properties) was evaluated by the presence or absence of misfiring. The drive voltage was set so that the droplet size per pixel was about 42 picoliter (7 drop setting).

Evaluation criteria for inkjet suitability (discharge properties) were as shown below; evaluations of Excellent, Good, and Acceptable were in the required performance range.
Excellent: there were no nozzles for which misfiring occurred for any color of ink composition.
Good: misfiring occurred for 1 to 2 colors of ink compositions, but there were no greater than 3 misfiring nozzles per color.
Acceptable: misfiring occurred for 3 or more colors of ink compositions, but there were no greater than 3 misfiring nozzles per color.
Poor: misfiring occurred for any color of ink composition, and there were 4 or more misfiring nozzles per color.
Curability Test Curability is defined as the exposure energy at which there is no tackiness on the printed surface and there is no film peeled by scratching with a fingernail.

The presence or absence of tackiness of a printed surface was determined by pressing plain paper (Photocopy paper C2, manufactured by Fuji Xerox Co., Ltd.) thereagainst immediately after printing; when the ink composition transferred tackiness was present, and when there was no transfer tackiness was absent.

Whether or not film was peeled by scratching with a fingernail after printing was determined by scratching an ink cured film with a fingernail with a fixed load immediately after printing; when the film was peeled, there was peeling by fingernail, and when no film peeled, there was no peeling by fingernail.

Exposure energy was varied between 300 mJ/cm$^2$, 600 mJ/cm$^2$, 900 mJ/cm$^2$, 1,200 mJ/cm$^2$, 1,500 mJ/cm$^2$, 1,800 mJ/cm$^2$, and evaluation was carried out in accordance with the criteria below. Here, 6 to 3 (1,200 mJ/cm$^2$) were in the required performance range.

6: no tackiness and no peeling by fingernail with exposure at 300 mJ/cm$^2$.
5: no tackiness and no peeling by fingernail with exposure at 600 mJ/cm$^2$.
4: no tackiness and no peeling by fingernail with exposure at 900 mJ/cm$^2$.
3: no tackiness and no peeling by fingernail with exposure at 1,200 mJ/cm$^2$.
2: no tackiness and no peeling by fingernail with exposure at 1,500 mJ/cm$^2$.
1: no tackiness and no peeling by fingernail with exposure at 1,500 mJ/cm$^2$.

TABLE 14

| | | Main components of ink compositions | | Evaluation results | | | |
|---|---|---|---|---|---|---|---|
| | | Photopolymerization initiator used | Compound (I) used | High temperature storage stability | low temperature storage stability | inkjet suitability (dischargeability) | Curability |
| Ex. 1 | Ink set 1 | acylphosphine oxide(photopolymerization initiator A, B) α-aminoacetophenone (photopolymerization initiator C) | Compound (I-12) | Excellent | Excellent | Excellent | 5 |
| Ex. 2 | Ink set 2 | acylphosphine oxide(photopolymerization initiator A, B) α-aminoacetophenone (photopolymerization initiator C) | Compound (I-19) | Excellent | Excellent | Excellent | 5 |
| Ex. 3 | Ink set 3 | acylphosphine oxide(photopolymerization initiator A, B) α-aminoacetophenone (photopolymerization initiator C) | Compound (I-21) | Excellent | Excellent | Excellent | 5 |
| Ex. 4 | Ink set 4 | acylphosphine oxide(photopolymerization initiator A, B) α-aminoacetophenone (photopolymerization initiator C) | Compound (I-44) | Excellent | Excellent | Excellent | 5 |
| Ex. 5 | Ink set 5 | acylphosphine oxide(photopolymerization initiator A, B) α-aminoacetophenone (photopolymerization initiator C) | Compound (I-51) | Excellent | Excellent | Excellent | 5 |
| Ex. 6 | Ink set 6 | acylphosphine oxide(photopolymerization initiator A, B) α-aminoacetophenone (photopolymerization initiator C) | Compound (I-53) | Excellent | Excellent | Excellent | 5 |
| Comp. Ex. 1 | Ink set 7 | acylphosphine oxide(photopolymerization initiator A, B) α-aminoacetophenone (photopolymerization initiator C) | None (Comparative compound A) | Excellent | Poor | Poor | 4 |
| Ex. 7 | Ink set 8 | a-aminoacetophenone (photopolymerization initiator D) | Compound (I-12) Compound (I-21) | Excellent | Excellent | Excellent | 3 |
| Comp. Ex. 2 | Ink set 9 | a-aminoacetophenone (photopolymerization initiator D) thioxanthone(polymerization initiator E) | None | Excellent | Excellent | Excellent | 1 |
| Comp. Ex. 3 | Ink set 10 | a-aminoacetophenone (photopolymerization initiator D) thioxanthone(polymerization initiator E) | None | Poor | Excellent | Excellent | 3 |
| Ex. 8 | Ink set 11 | acylphosphine oxide(photopolymerization initiator A, B) α-aminoacetophenone (photopolymerization initiator C) | Compound (I-12) Compound (I-21) | Excellent | Excellent | Excellent | 6 |

The invention claimed is:

1. A photocurable composition comprising a polymerizable compound, a photopolymerization initiator and a compound represented by Formula (II) below,

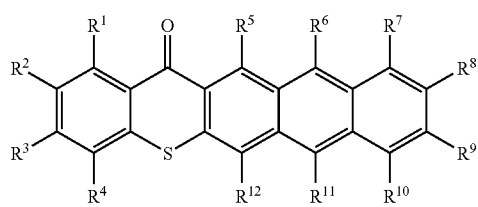

wherein $R^1$ to $R^{12}$ independently denote a hydrogen atom, a halogen atom, or a monovalent substituent, at least one of $R^1$ to $R^{12}$ not being a hydrogen atom,
wherein among $R^1$ to $R^{12}$ in Formula (II), the position of a group that is not a hydrogen atom is one or more positions selected from the group consisting of $R^1$ to $R^4$ and $R^7$ to $R^{10}$.

2. The photocurable composition according to claim 1, wherein the photocurable composition comprises two or more types of compounds represented by Formula (II) above.

3. The photocurable composition according to claim 1, wherein the compound represented by Formula (II) above has a content of 0.1 to 15.0 wt %.

4. The photocurable composition according to claim 1, wherein the photopolymerization initiator comprises at least an acylphosphine oxide compound or an α-aminoacetophenone compound.

5. The photocurable composition according to claim 1, wherein the photopolymerization initiator comprises at least one type of acylphosphine oxide compound and at least one type of α-aminoacetophenone compound.

6. The photocurable composition according to claim 1, wherein the photocurable composition comprises a colorant.

7. The photocurable composition according to claim 1, wherein the photocurable composition comprises a dispersion of an organic pigment and a polymeric dispersant.

8. The photocurable composition according to claim 1, wherein the photocurable composition comprises a (meth) acrylate compound.

9. The photocurable composition according to claim 1, wherein the polymerizable compound comprises a monofunctional radically polymerizable monomer having an alicyclic structure and/or an aromatic monofunctional radically polymerizable monomer.

10. The photocurable composition according to claim 9, wherein the monofunctional radically polymerizable monomer having an alicyclic structure is a compound represented by Formula (A2), (A2)

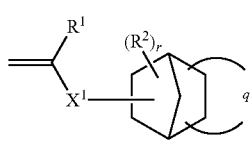

in Formula (A2), R¹ denotes a hydrogen atom, a halogen atom, or an alkyl group having 1 to 4 carbon atoms, X¹ denotes a divalent linking group, R² denotes a substituent, r denotes an integer of 0 to 5, and q denotes a cyclic hydrocarbon structure.

11. The photocurable composition according to claim 9, wherein the aromatic monofunctional radically polymerizable monomer is a compound represented by Formula (A5), (A5)

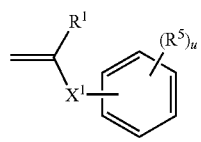

in Formula (A5), R¹ denotes a hydrogen atom, a halogen atom, or an alkyl group having 1 to 4 carbon atoms, X¹ denotes a divalent linking group, R⁵ denotes a substituent, u denotes an integer of 0 to 5, the u R⁵s may be identical to or different from each other, the plurality of R⁵s may be bonded to each other to form a ring, and the ring may be an aromatic ring.

12. An inkjet recording method comprising:
(a¹) step of discharging the photocurable composition according to claim 1 onto a recording medium; and
(b¹) a step of curing the photocurable composition by irradiating the discharged photocurable composition with light.

13. The photocurable composition according to claim 1, wherein the photopolymerization initiator comprises at least two types of acylphosphine oxide compound and at least one type of α-aminoacetophenone compound.

14. The photocurable composition according to claim 1, wherein the monovalent substituent is a group selected from the group consisting of an aliphatic group, an aromatic group, a heterocyclic group, a cyano group, a hydroxy group, a nitro group, an amino group, an alkylamino group, a dialkylamino group, an alkoxy group, an aryloxy group, an amide group, an arylamino group, an ureido group, a sulfamoylamino group, an alkylthio group an arylthio group, an alkoxycarbonylamino group, a sulfonamide group, a carbamoyl group, a sulfamoyl group, a sulfonyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a sulfinyl group, a phosphonyl group, an acyl group, a carboxyl group, and a sulfo group.

15. The photocurable composition according to claim 1, wherein the compound represented by Formula (II) is a compound selected from the group consisting of compounds (I-1) to (I-90):

(I-1)
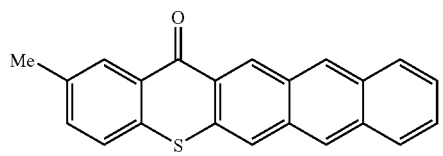

(I-2)
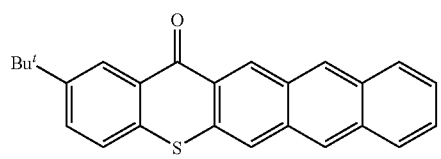

(I-3)
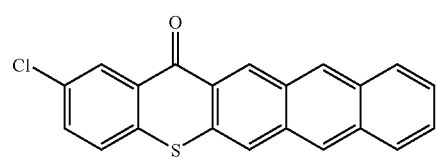

(I-4)
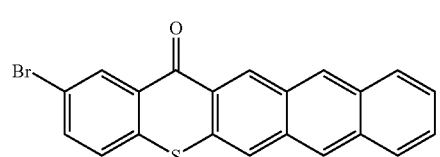

(I-5)
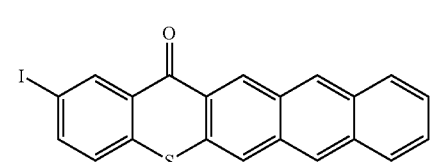

(I-6)
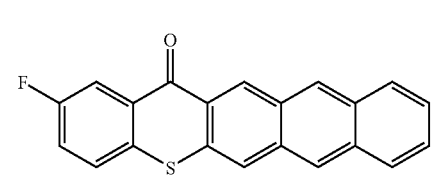

(I-7)
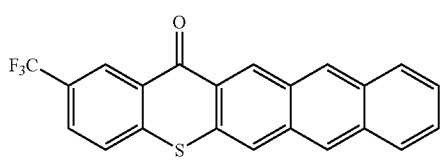

(I-8)
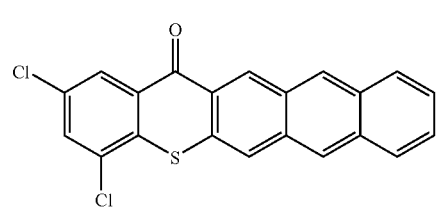

(I-9)
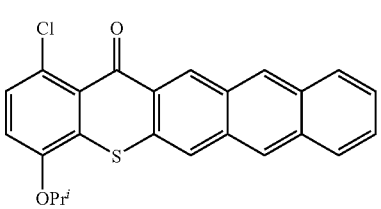

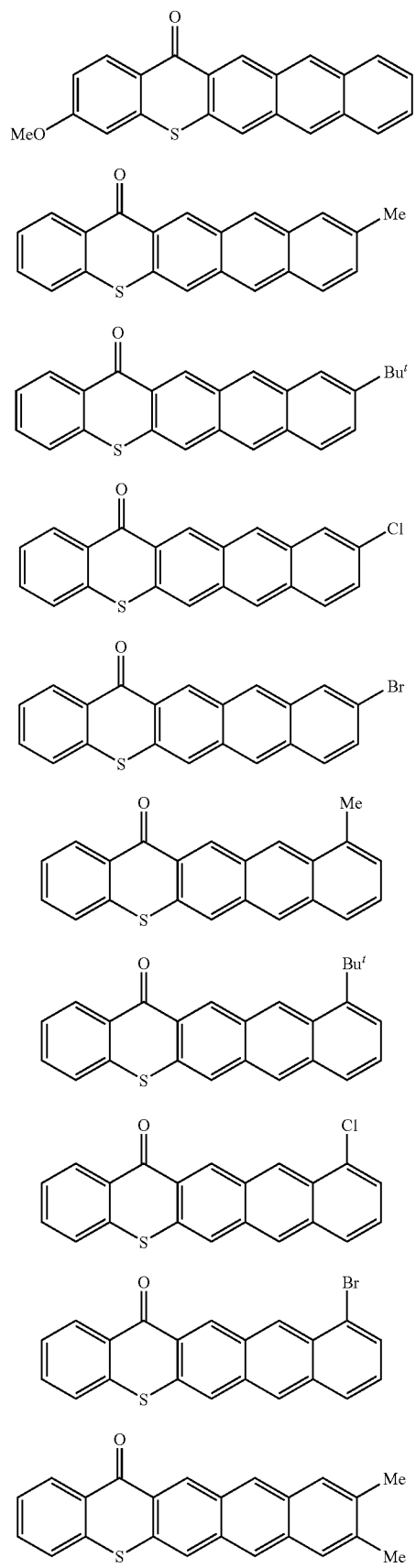
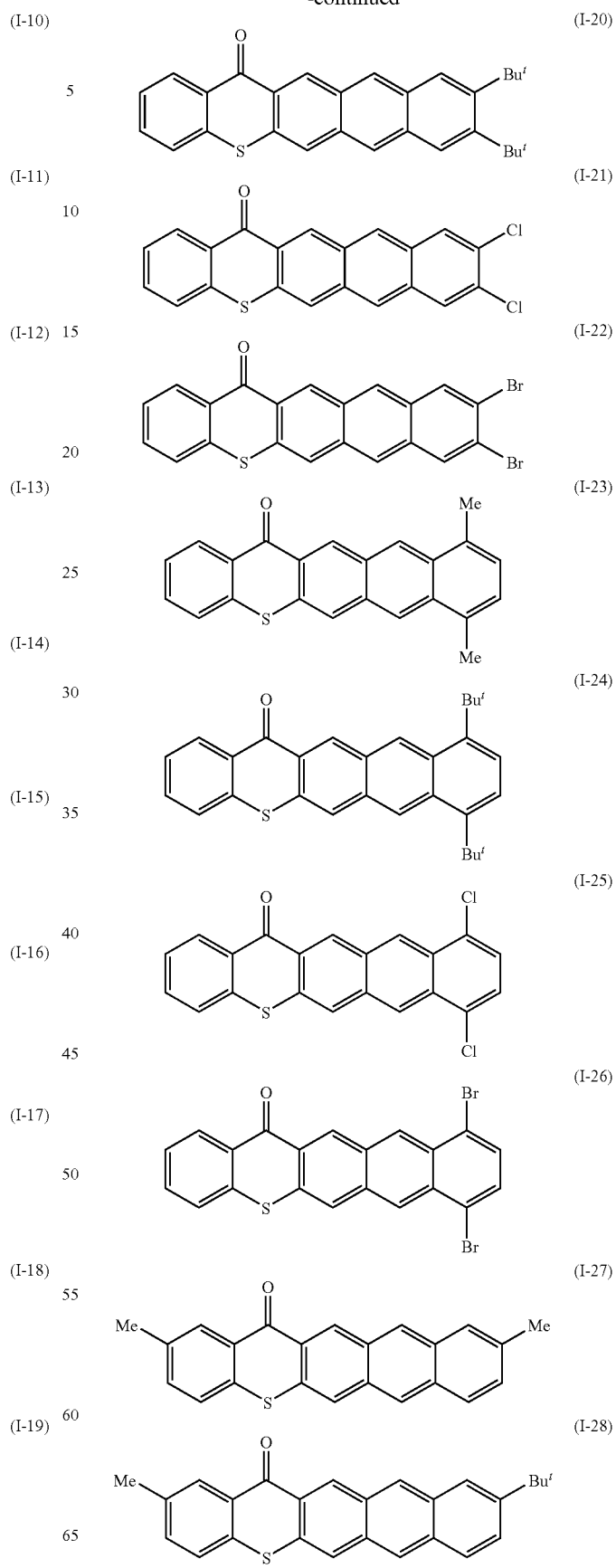

(I-29) 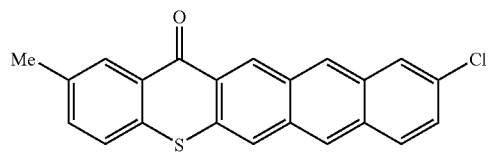
(I-30) 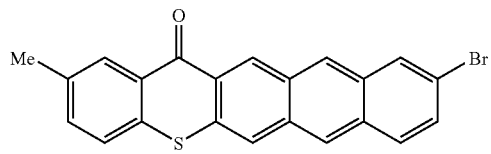
(I-31) 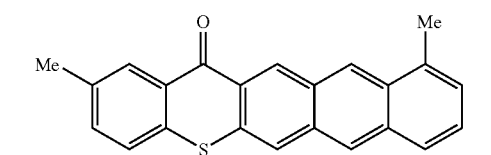
(I-32) 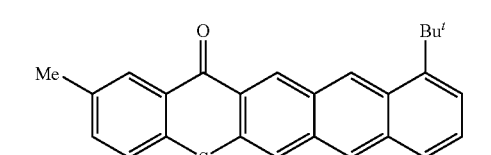
(I-33) 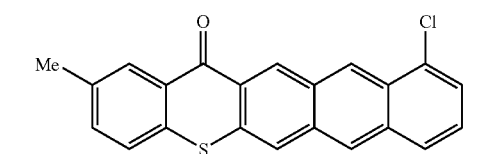
(I-34) 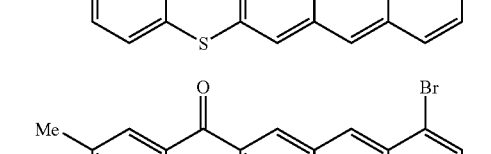
(I-35) 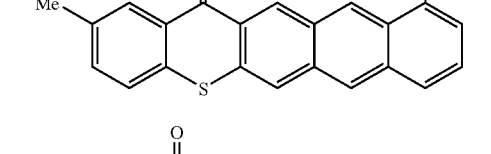
(I-36) 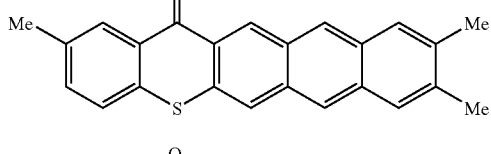
(I-37) 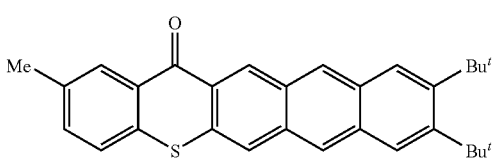
(I-38) 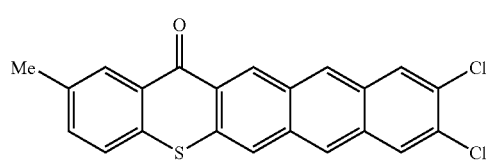
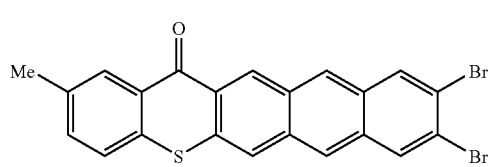
(I-39) 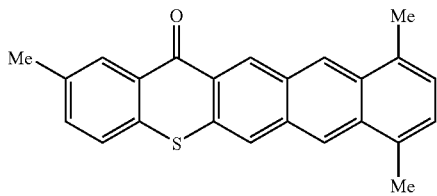
(I-40) 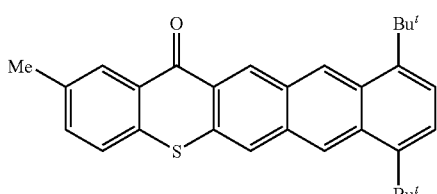
(I-41) 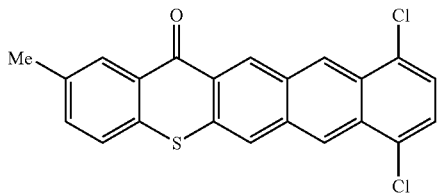
(I-42) 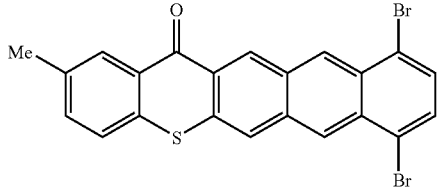
(I-43) 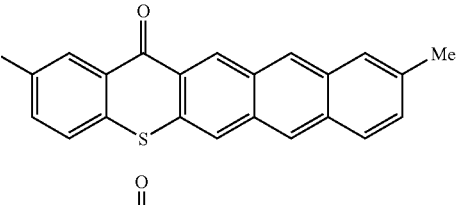
(I-44) 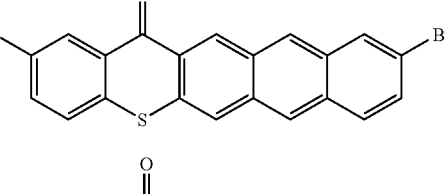
(I-45) 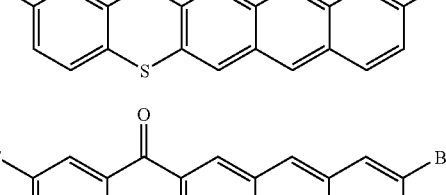
(I-46) 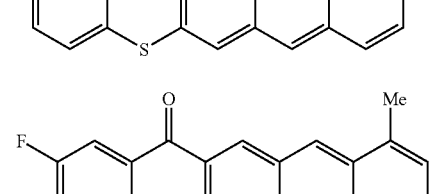
(I-47) 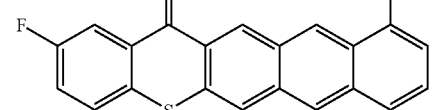

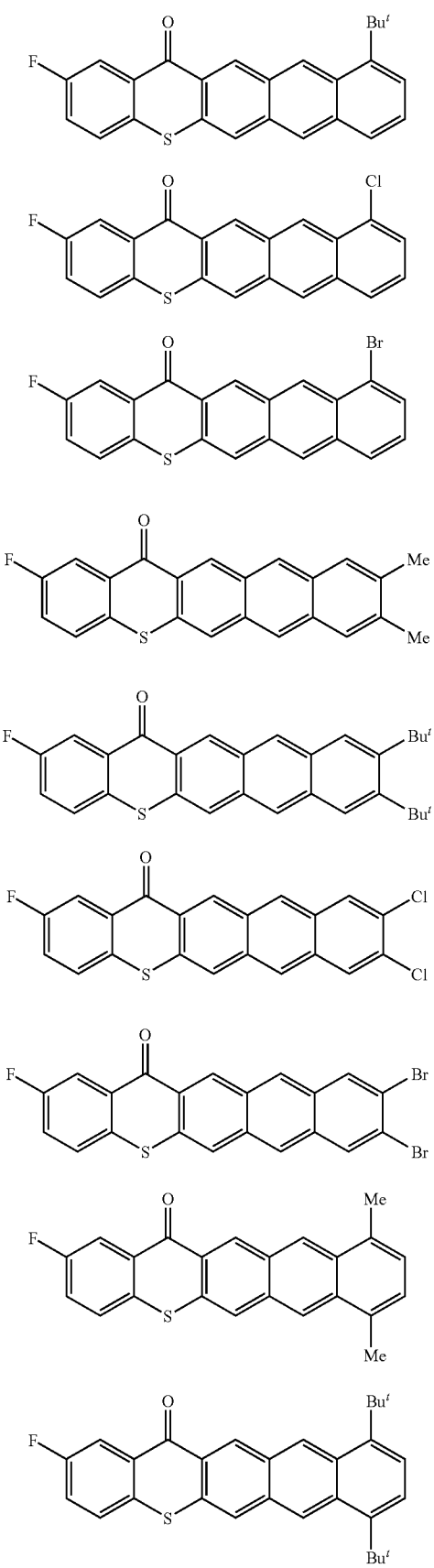
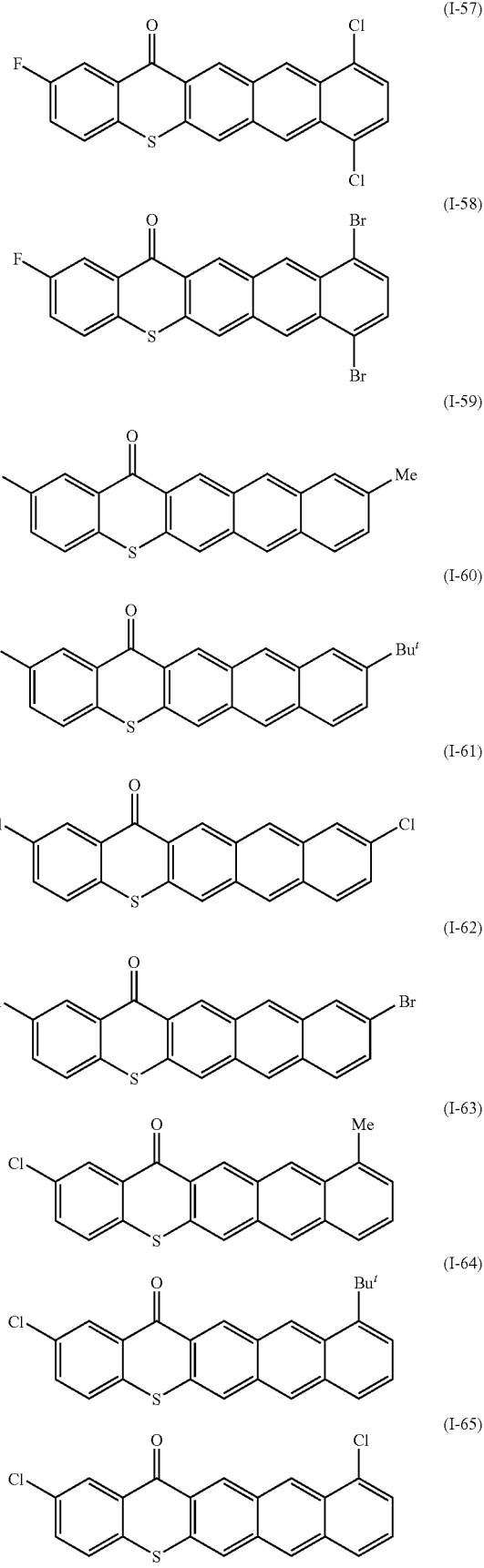

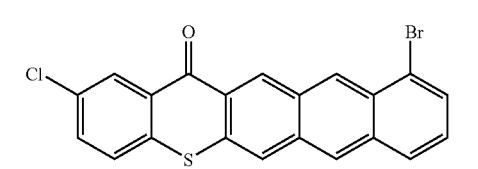
(I-66)
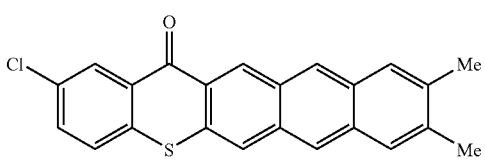
(I-67)
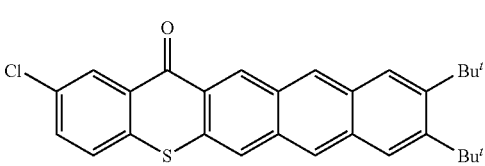
(I-68)
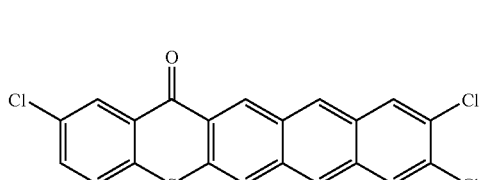
(I-69)
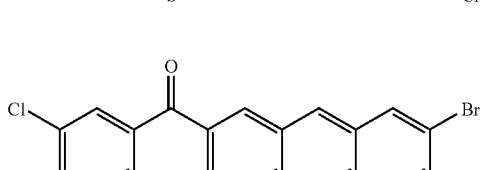
(I-70)
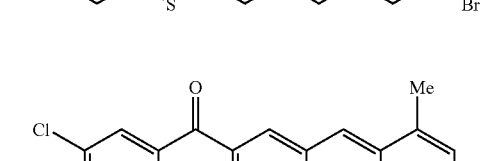
(I-71)
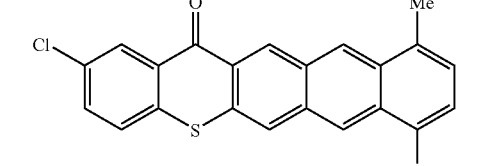
(I-72)
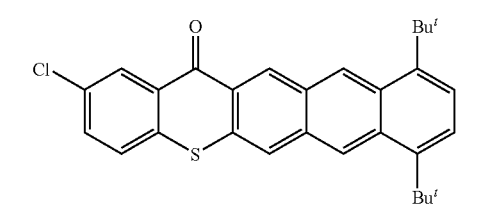
(I-73)
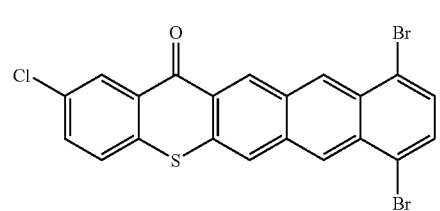
(I-74)
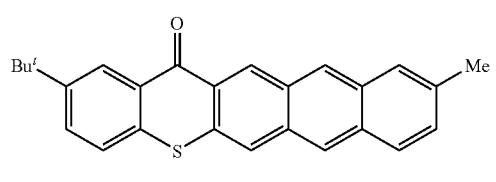
(I-75)
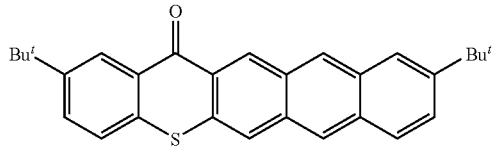
(I-76)
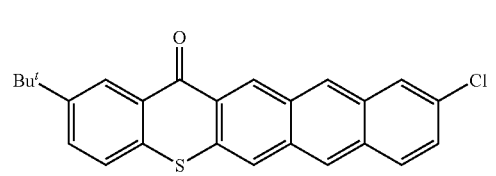
(I-77)
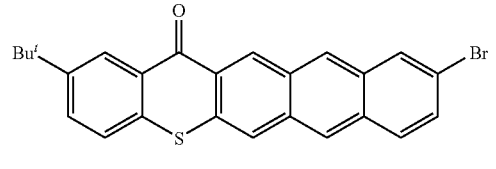
(I-78)
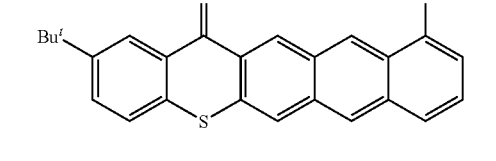
(I-79)
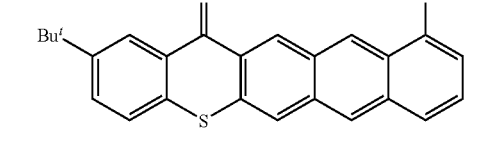
(I-80)
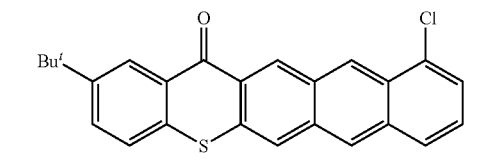
(I-81)
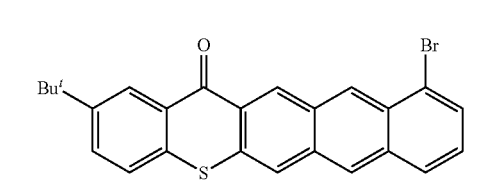
(I-82)

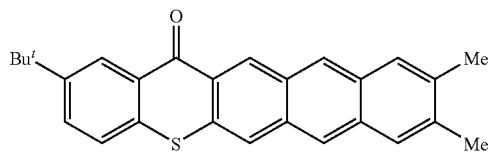
(I-83)
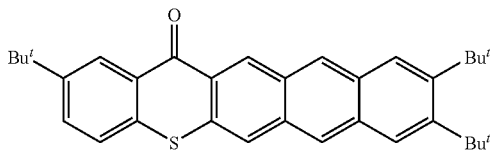
(I-84)
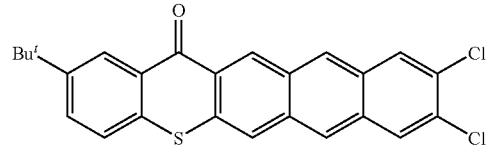
(I-85)
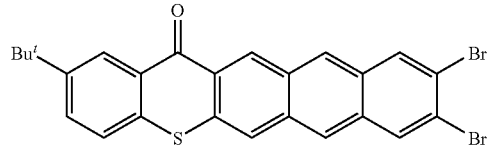
(I-86)
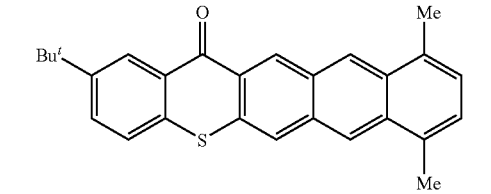
(I-87)
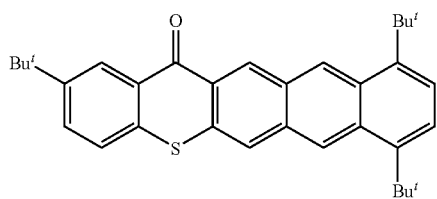
(I-88)
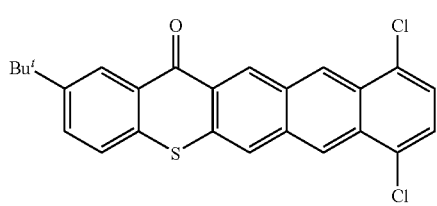
(I-89)
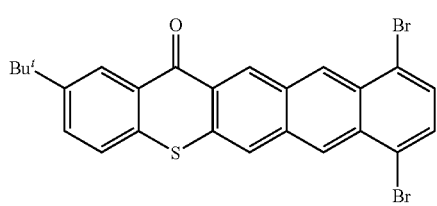
(I-90)
wherein Me denotes a methyl group, Bu$^t$ denotes a tert-butyl group, and Pr$^i$ denotes an isopropyl group.
* * * * *